United States Patent
Sundarrajan et al.

(10) Patent No.: US 8,495,305 B2
(45) Date of Patent: Jul. 23, 2013

(54) METHOD AND DEVICE FOR PERFORMING CACHING OF DYNAMICALLY GENERATED OBJECTS IN A DATA COMMUNICATION NETWORK

(75) Inventors: Prabakar Sundarrajan, Saratoga, CA (US); Prakash Khemani, San Jose, CA (US); Kailash Kailash, San Jose, CA (US); Ajay Soni, San Jose, CA (US); Rajiv Sinha, San Jose, CA (US); Saravana Annamalaisami, Santa Clara, CA (US); Bharath Bhushan K.R., Bangalore (IN); Anil Kumar, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 889 days.

(21) Appl. No.: 11/324,131

(22) Filed: Dec. 30, 2005

(65) Prior Publication Data

US 2007/0156965 A1     Jul. 5, 2007

Related U.S. Application Data

(63) Continuation-in-part of application No. 11/169,002, filed on Jun. 29, 2005, which is a continuation-in-part of application No. 11/039,946, filed on Jan. 24, 2005, now Pat. No. 7,757,074.

(60) Provisional application No. 60/583,784, filed on Jun. 30, 2004, provisional application No. 60/583,785, filed on Jun. 30, 2004.

(51) Int. Cl.
*G06F 12/00* (2006.01)
(52) U.S. Cl.
USPC ............ 711/135; 711/E12.037; 711/118; 711/141; 711/144; 711/133; 711/E12.017; 709/203; 709/217; 709/219; 709/223

(58) Field of Classification Search
USPC ............ 711/133, 145, 144, 118, 135, 141, 711/E12.001, E12.017, E12.037; 707/202, 707/203; 709/217, 203, 219, 223
See application file for complete search history.

(56) References Cited

U.S. PATENT DOCUMENTS 4,479,195 A    10/1984   Herr et al.
4,701,844 A  * 10/1987   Thompson et al. ........... 711/119

(Continued)

FOREIGN PATENT DOCUMENTS

CN    1394042         1/2003
CN    1410905 A       4/2003

(Continued)

OTHER PUBLICATIONS

Krishnamurthy B.C. et al., "Key differences between HTTP/1.0 and HTTP/1.1," Computer Networks, Elsevier Science Publishers B.V., vol. 31, No. 11-16, pp. 1737-1751, May 1999.

(Continued)

*Primary Examiner* — Jasmine Song
(74) *Attorney, Agent, or Firm* — Foley and Lardner LLP; Christopher J. McKenna

(57) ABSTRACT

A method for maintaining a cache of dynamically generated objects. The method includes storing in the cache dynamically generated objects previously served from an originating server to a client. A communication between the client and server is intercepted by the cache. The cache parses the communication to identify an object determinant and to determine whether the object determinant indicates whether a change has occurred or will occur in an object at the originating server. The cache marks the object stored in the cache as invalid if the object determinant so indicates. If the object has been marked as invalid, the cache retrieves the object from the originating server.

60 Claims, 14 Drawing Sheets

U.S. PATENT DOCUMENTS

| | | | |
|---|---|---|---|
| 4,885,680 A * | 12/1989 | Anthony et al. | 711/144 |
| 4,935,870 A | 6/1990 | Burk, Jr. et al. | |
| 5,301,270 A | 4/1994 | Steinberg et al. | |
| 5,307,413 A | 4/1994 | Denzer | |
| 5,329,619 A | 7/1994 | Page et al. | |
| 5,359,712 A | 10/1994 | Cohen et al. | |
| 5,511,208 A | 4/1996 | Boyles et al. | |
| 5,519,699 A | 5/1996 | Ohsawa | |
| 5,521,940 A | 5/1996 | Lane et al. | |
| 5,561,769 A | 10/1996 | Kumar et al. | |
| 5,623,492 A | 4/1997 | Teraslinna | |
| 5,625,793 A | 4/1997 | Mirza | |
| 5,657,390 A | 8/1997 | Elgamal et al. | |
| 5,671,226 A | 9/1997 | Murakami et al. | |
| 5,708,656 A | 1/1998 | Noneman et al. | |
| 5,742,829 A | 4/1998 | Davis et al. | |
| 5,758,085 A | 5/1998 | Kouoheris et al. | |
| 5,758,110 A | 5/1998 | Boss et al. | |
| 5,761,431 A | 6/1998 | Gross et al. | |
| 5,787,470 A * | 7/1998 | DeSimone et al. | 711/124 |
| 5,812,668 A | 9/1998 | Weber | |
| 5,815,462 A | 9/1998 | Konishi et al. | |
| 5,819,020 A | 10/1998 | Beeler, Jr. | |
| 5,822,524 A | 10/1998 | Chen et al. | |
| 5,828,840 A | 10/1998 | Cowan et al. | |
| 5,835,726 A | 11/1998 | Shwed et al. | |
| 5,838,920 A | 11/1998 | Rosborough | |
| 5,850,446 A | 12/1998 | Berger et al. | |
| 5,852,717 A | 12/1998 | Bhide et al. | |
| 5,864,837 A | 1/1999 | Maimone | |
| 5,881,229 A | 3/1999 | Singh et al. | |
| 5,889,863 A | 3/1999 | Weber | |
| 5,893,150 A | 4/1999 | Hagersten et al. | |
| 5,911,051 A | 6/1999 | Carson et al. | |
| 5,918,244 A | 6/1999 | Percival | |
| 5,925,100 A | 7/1999 | Drewry et al. | |
| 5,931,917 A | 8/1999 | Nguyen et al. | |
| 5,933,605 A | 8/1999 | Kawano et al. | |
| 5,940,074 A | 8/1999 | Britt et al. | |
| 5,943,424 A | 8/1999 | Berger et al. | |
| 5,956,483 A | 9/1999 | Grate et al. | |
| 5,958,016 A | 9/1999 | Chang et al. | |
| 5,978,840 A | 11/1999 | Nguyen et al. | |
| 5,983,208 A | 11/1999 | Haller et al. | |
| 5,987,132 A | 11/1999 | Rowney | |
| 5,987,482 A | 11/1999 | Bates et al. | |
| 5,987,611 A | 11/1999 | Freund | |
| 5,995,999 A | 11/1999 | Bharadhwaj | |
| 5,996,076 A | 11/1999 | Rowney et al. | |
| 5,999,179 A | 12/1999 | Kekic et al. | |
| 5,999,525 A | 12/1999 | Krishnaswamy et al. | |
| 6,002,767 A | 12/1999 | Kramer | |
| 6,021,470 A | 2/2000 | Frank et al. | |
| 6,023,724 A | 2/2000 | Bhatia et al. | |
| 6,026,379 A | 2/2000 | Haller et al. | |
| 6,026,413 A | 2/2000 | Challenger et al. | |
| 6,026,440 A | 2/2000 | Shrader et al. | |
| 6,029,175 A | 2/2000 | Chow et al. | |
| 6,058,250 A | 5/2000 | Harwood et al. | |
| 6,061,715 A | 5/2000 | Hawes | |
| 6,061,769 A | 5/2000 | Kapulka et al. | |
| 6,061,796 A | 5/2000 | Chen et al. | |
| 6,067,569 A | 5/2000 | Khaki et al. | |
| 6,072,870 A | 6/2000 | Nguyen et al. | |
| 6,092,155 A | 7/2000 | Olnowich | |
| 6,101,543 A | 8/2000 | Alden et al. | |
| 6,112,085 A | 8/2000 | Garner et al. | |
| 6,119,105 A | 9/2000 | Williams | |
| 6,119,151 A | 9/2000 | Cantrell et al. | |
| 6,122,403 A | 9/2000 | Rhoads | |
| 6,128,627 A * | 10/2000 | Mattis et al. | 707/202 |
| 6,131,120 A | 10/2000 | Reid | |
| 6,141,686 A | 10/2000 | Jackowski et al. | |
| 6,144,775 A | 11/2000 | Williams et al. | |
| 6,157,955 A | 12/2000 | Narad et al. | |
| 6,161,123 A | 12/2000 | Renouard et al. | |
| 6,163,772 A | 12/2000 | Kramer et al. | |
| 6,170,017 B1 | 1/2001 | Dias et al. | |
| 6,173,325 B1 | 1/2001 | Kukreja | |
| 6,175,869 B1 | 1/2001 | Ahuja et al. | |
| 6,178,409 B1 | 1/2001 | Weber et al. | |
| 6,182,139 B1 | 1/2001 | Brendel | |
| 6,192,408 B1 | 2/2001 | Vahalia et al. | |
| 6,219,669 B1 | 4/2001 | Haff et al. | |
| 6,233,249 B1 | 5/2001 | Katseff et al. | |
| 6,233,606 B1 | 5/2001 | Dujari | |
| 6,233,619 B1 | 5/2001 | Narisi et al. | |
| 6,236,652 B1 | 5/2001 | Preston et al. | |
| 6,253,027 B1 | 6/2001 | Weber et al. | |
| 6,253,188 B1 | 6/2001 | Witek et al. | |
| 6,253,327 B1 | 6/2001 | Zhang et al. | |
| 6,256,773 B1 | 7/2001 | Bowman-Amuah | |
| 6,272,146 B1 | 8/2001 | Bowater et al. | |
| 6,272,148 B1 | 8/2001 | Takagi et al. | |
| 6,272,556 B1 | 8/2001 | Gish | |
| 6,282,172 B1 | 8/2001 | Robles et al. | |
| 6,289,382 B1 | 9/2001 | Bowman-Amuah | |
| 6,289,450 B1 | 9/2001 | Pensak et al. | |
| 6,301,249 B1 | 10/2001 | Mansfield et al. | |
| 6,304,915 B1 | 10/2001 | Nguyen et al. | |
| 6,308,273 B1 | 10/2001 | Goertzel et al. | |
| 6,321,235 B1 | 11/2001 | Bird et al. | |
| 6,321,337 B1 | 11/2001 | Reshef et al. | |
| 6,324,525 B1 | 11/2001 | Kramer et al. | |
| 6,324,582 B1 | 11/2001 | Sridhar et al. | |
| 6,324,647 B1 | 11/2001 | Bowman-Amuah | |
| 6,324,648 B1 | 11/2001 | Grantges, Jr. | |
| 6,327,242 B1 | 12/2001 | Amicangioli et al. | |
| 6,332,163 B1 | 12/2001 | Bowman-Amuah | |
| 6,333,931 B1 | 12/2001 | LaPier et al. | |
| 6,334,664 B1 | 1/2002 | Silverbrook | |
| 6,339,832 B1 | 1/2002 | Bowman-Amuah | |
| 6,345,239 B1 | 2/2002 | Bowman-Amuah | |
| 6,363,363 B1 | 3/2002 | Haller et al. | |
| 6,363,478 B1 | 3/2002 | Lambert et al. | |
| 6,370,573 B1 | 4/2002 | Bowman-Amuah | |
| 6,370,599 B1 | 4/2002 | Anand et al. | |
| 6,373,950 B1 | 4/2002 | Rowney | |
| 6,383,478 B1 | 5/2002 | Prokop et al. | |
| 6,389,462 B1 | 5/2002 | Cohen et al. | |
| 6,389,505 B1 | 5/2002 | Emma et al. | |
| 6,398,359 B1 | 6/2002 | Silverbrook et al. | |
| 6,405,364 B1 | 6/2002 | Bowman-Amuah | |
| 6,412,000 B1 | 6/2002 | Riddle et al. | |
| 6,415,329 B1 | 7/2002 | Gelman et al. | |
| 6,427,132 B1 | 7/2002 | Bowman-Amuah | |
| 6,431,777 B1 | 8/2002 | Silverbrook | |
| 6,434,568 B1 | 8/2002 | Bowman-Amuah | |
| 6,434,618 B1 | 8/2002 | Cohen et al. | |
| 6,434,628 B1 | 8/2002 | Bowman-Amuah | |
| 6,438,127 B1 | 8/2002 | Le Goff et al. | |
| 6,438,594 B1 | 8/2002 | Bowman-Amuah | |
| 6,442,571 B1 | 8/2002 | Haff et al. | |
| 6,442,682 B1 | 8/2002 | Pothapragada et al. | |
| 6,442,748 B1 | 8/2002 | Bowman-Amuah | |
| 6,447,113 B1 | 9/2002 | Silverbrook et al. | |
| 6,449,658 B1 | 9/2002 | Lafe et al. | |
| 6,449,695 B1 | 9/2002 | Bereznyi et al. | |
| 6,452,915 B1 | 9/2002 | Jorgensen | |
| 6,452,923 B1 | 9/2002 | Gerszberg et al. | |
| 6,457,103 B1 | 9/2002 | Challenger et al. | |
| 6,473,794 B1 | 10/2002 | Guheen et al. | |
| 6,473,802 B2 | 10/2002 | Masters | |
| 6,477,580 B1 | 11/2002 | Bowman-Amuah | |
| 6,477,665 B1 | 11/2002 | Bowman-Amuah | |
| 6,484,143 B1 | 11/2002 | Swildens et al. | |
| 6,484,206 B2 | 11/2002 | Crump et al. | |
| 6,487,641 B1 | 11/2002 | Cusson et al. | |
| 6,496,481 B1 | 12/2002 | Wu et al. | |
| 6,496,776 B1 | 12/2002 | Blumberg et al. | |
| 6,496,850 B1 | 12/2002 | Bowman-Amuah | |
| 6,496,935 B1 | 12/2002 | Fink et al. | |
| 6,502,102 B1 | 12/2002 | Haswell et al. | |
| 6,502,192 B1 | 12/2002 | Nguyen | |
| 6,502,213 B1 | 12/2002 | Bowman-Amuah | |
| 6,507,891 B1 | 1/2003 | Challenger et al. | |
| 6,519,571 B1 | 2/2003 | Guheen et al. | |

| | | |
|---|---|---|
| 6,523,027 B1 | 2/2003 | Underwood |
| 6,529,909 B1 | 3/2003 | Bowman-Amuah |
| 6,529,948 B1 | 3/2003 | Bowman-Amuah |
| 6,536,037 B1 | 3/2003 | Guheen et al. |
| 6,539,396 B1 | 3/2003 | Bowman-Amuah |
| 6,549,949 B1 | 4/2003 | Bowman-Amuah |
| 6,550,012 B1 | 4/2003 | Villa et al. |
| 6,550,057 B1 | 4/2003 | Bowman-Amuah |
| 6,553,129 B1 | 4/2003 | Rhoads |
| 6,553,377 B1 | 4/2003 | Eschelbeck et al. |
| 6,553,409 B1 | 4/2003 | Zhang et al. |
| 6,571,282 B1 | 5/2003 | Bowman-Amuah |
| 6,574,668 B1 | 6/2003 | Gubbi et al. |
| 6,574,688 B1 | 6/2003 | Dale et al. |
| 6,578,068 B1 | 6/2003 | Bowman-Amuah |
| 6,578,073 B1 | 6/2003 | Starnes et al. |
| 6,584,569 B2 | 6/2003 | Reshef et al. |
| 6,590,588 B2 | 7/2003 | Lincke et al. |
| 6,591,266 B1 * | 7/2003 | Li et al. ............... 707/10 |
| 6,594,690 B2 | 7/2003 | Cantwell |
| 6,598,075 B1 | 7/2003 | Ogdon et al. |
| 6,601,057 B1 | 7/2003 | Underwood et al. |
| 6,601,192 B1 | 7/2003 | Bowman-Amuah |
| 6,601,233 B1 | 7/2003 | Underwood |
| 6,601,234 B1 | 7/2003 | Bowman-Amuah |
| 6,606,660 B1 | 8/2003 | Bowman-Amuah |
| 6,606,663 B1 * | 8/2003 | Liao et al. ............ 709/229 |
| 6,606,744 B1 | 8/2003 | Mikurak |
| 6,609,128 B1 | 8/2003 | Underwood |
| 6,611,262 B1 | 8/2003 | Suzuki et al. |
| 6,611,522 B1 | 8/2003 | Zheng et al. |
| 6,611,822 B1 | 8/2003 | Beams et al. |
| 6,611,867 B1 | 8/2003 | Bowman-Amuah |
| 6,614,800 B1 | 9/2003 | Genty et al. |
| 6,615,166 B1 | 9/2003 | Guheen et al. |
| 6,615,199 B1 | 9/2003 | Bowman-Amuah |
| 6,615,253 B1 | 9/2003 | Bowman-Amuah |
| 6,618,359 B1 | 9/2003 | Chen et al. |
| 6,629,081 B1 | 9/2003 | Cornelius et al. |
| 6,631,986 B2 | 10/2003 | Silverbrook |
| 6,633,574 B1 | 10/2003 | Koch et al. |
| 6,633,878 B1 | 10/2003 | Underwood |
| 6,636,242 B2 | 10/2003 | Bowman-Amuah |
| 6,640,238 B1 | 10/2003 | Bowman-Amuah |
| 6,640,240 B1 | 10/2003 | Hoffman et al. |
| 6,640,244 B1 | 10/2003 | Bowman-Amuah |
| 6,640,248 B1 | 10/2003 | Jorgensen |
| 6,640,249 B1 | 10/2003 | Bowman-Amuah |
| 6,647,130 B2 | 11/2003 | Rhoads |
| 6,650,640 B1 | 11/2003 | Muller et al. |
| 6,652,089 B2 | 11/2003 | Silverbrook |
| 6,652,090 B2 | 11/2003 | Silverbrook |
| 6,662,221 B1 | 12/2003 | Gonda et al. |
| 6,662,357 B1 | 12/2003 | Bowman-Amuah |
| 6,664,978 B1 | 12/2003 | Kekic et al. |
| 6,671,818 B1 | 12/2003 | Mikurak |
| 6,678,734 B1 | 1/2004 | Haatainen et al. |
| 6,681,029 B1 | 1/2004 | Rhoads |
| 6,687,732 B1 | 2/2004 | Bector et al. |
| 6,691,227 B1 | 2/2004 | Neves et al. |
| 6,697,824 B1 | 2/2004 | Bowman-Amuah |
| 6,697,844 B1 | 2/2004 | Chan et al. |
| 6,697,849 B1 | 2/2004 | Carlson |
| 6,700,902 B1 | 3/2004 | Meyer |
| 6,701,345 B1 | 3/2004 | Carley et al. |
| 6,701,514 B1 | 3/2004 | Haswell et al. |
| 6,704,873 B1 | 3/2004 | Underwood |
| 6,715,145 B1 | 3/2004 | Bowman-Amuah |
| 6,718,535 B1 | 4/2004 | Underwood |
| 6,721,713 B1 | 4/2004 | Guheen et al. |
| 6,728,787 B1 | 4/2004 | Leigh |
| 6,732,269 B1 | 5/2004 | Baskey et al. |
| 6,732,314 B1 | 5/2004 | Borella et al. |
| 6,735,601 B1 | 5/2004 | Subrahmanyam |
| 6,735,691 B1 | 5/2004 | Capps et al. |
| 6,742,015 B1 | 5/2004 | Bowman-Amuah |
| 6,744,774 B2 | 6/2004 | Sharma |
| 6,754,699 B2 | 6/2004 | Swildens et al. |
| 6,760,748 B1 | 7/2004 | Hakim |
| 6,766,373 B1 | 7/2004 | Beadle et al. |
| 6,775,392 B1 | 8/2004 | Rhoads |
| 6,785,719 B1 | 8/2004 | Jacobson et al. |
| 6,788,315 B1 | 9/2004 | Kekic et al. |
| 6,789,170 B1 | 9/2004 | Jacobs et al. |
| 6,792,615 B1 | 9/2004 | Rowe et al. |
| 6,801,927 B1 | 10/2004 | Smith et al. |
| 6,802,020 B1 | 10/2004 | Smith |
| 6,807,607 B1 | 10/2004 | Lamparter |
| 6,820,125 B1 | 11/2004 | Dias et al. |
| 6,820,133 B1 | 11/2004 | Grove et al. |
| 6,820,974 B2 | 11/2004 | Silverbrook |
| 6,823,374 B2 | 11/2004 | Kausik et al. |
| 6,826,626 B1 | 11/2004 | McManus |
| 6,826,627 B2 | 11/2004 | Sjollema et al. |
| 6,831,898 B1 | 12/2004 | Edsall et al. |
| 6,842,906 B1 | 1/2005 | Bowman-Amuah |
| 6,847,892 B2 | 1/2005 | Zhou et al. |
| 6,850,252 B1 | 2/2005 | Hoffberg |
| 6,870,921 B1 | 3/2005 | Elsey et al. |
| 6,873,988 B2 | 3/2005 | Herrmann et al. |
| 6,880,086 B2 | 4/2005 | Kidder et al. |
| 6,883,068 B2 | 4/2005 | Tsirigotis et al. |
| 6,888,927 B1 | 5/2005 | Cruickshank et al. |
| 6,894,981 B1 | 5/2005 | Coile et al. |
| 6,899,420 B2 | 5/2005 | Silverbrook |
| 6,901,072 B1 | 5/2005 | Wong |
| 6,904,449 B1 | 6/2005 | Quinones |
| 6,904,519 B2 | 6/2005 | Anand et al. |
| 6,907,546 B1 | 6/2005 | Haswell et al. |
| 6,910,074 B1 | 6/2005 | Amin et al. |
| 6,912,522 B2 | 6/2005 | Edgar |
| 6,918,113 B2 | 7/2005 | Patel et al. |
| 6,918,665 B2 | 7/2005 | Silverbrook |
| 6,920,502 B2 | 7/2005 | Araujo et al. |
| 6,925,495 B2 | 8/2005 | Hegde et al. |
| 6,934,288 B2 | 8/2005 | Dempo |
| 6,935,736 B2 | 8/2005 | Silverbrook |
| 6,944,279 B2 | 9/2005 | Elsey et al. |
| 6,954,736 B2 | 10/2005 | Menninger et al. |
| 6,954,877 B2 | 10/2005 | Earl et al. |
| 6,957,186 B1 | 10/2005 | Guheen et al. |
| 6,959,320 B2 | 10/2005 | Shah et al. |
| 6,974,928 B2 | 12/2005 | Bloom |
| 6,976,090 B2 | 12/2005 | Ben-Shaul et al. |
| 6,980,962 B1 | 12/2005 | Arganbright et al. |
| 6,990,070 B1 | 1/2006 | Aweya et al. |
| 6,990,480 B1 | 1/2006 | Burt |
| 6,993,016 B1 | 1/2006 | Liva et al. |
| 6,996,628 B2 | 2/2006 | Keane et al. |
| 6,996,631 B1 | 2/2006 | Aiken, Jr. et al. |
| 7,000,012 B2 | 2/2006 | Moore et al. |
| 7,007,092 B2 | 2/2006 | Peiffer |
| 7,007,103 B2 | 2/2006 | Pinkerton et al. |
| 7,010,300 B1 | 3/2006 | Jones et al. |
| 7,013,290 B2 | 3/2006 | Ananian et al. |
| 7,016,055 B2 | 3/2006 | Dodge et al. |
| 7,020,719 B1 | 3/2006 | Grove et al. |
| 7,023,979 B1 | 4/2006 | Wu et al. |
| 7,024,452 B1 | 4/2006 | O'Connell et al. |
| 7,026,954 B2 | 4/2006 | Slemmer et al. |
| 7,027,055 B2 | 4/2006 | Anderson et al. |
| 7,028,083 B2 | 4/2006 | Levine et al. |
| 7,028,333 B2 | 4/2006 | Tuomenoksa et al. |
| 7,028,334 B2 | 4/2006 | Tuomenoksa |
| 7,031,314 B2 | 4/2006 | Craig et al. |
| 7,034,691 B1 | 4/2006 | Rapaport et al. |
| 7,035,427 B2 | 4/2006 | Rhoads |
| 7,036,142 B1 | 4/2006 | Zhang et al. |
| 7,039,606 B2 | 5/2006 | Hoffman et al. |
| 7,039,708 B1 | 5/2006 | Knobl et al. |
| 7,042,879 B2 | 5/2006 | Eschbach et al. |
| 7,043,529 B1 | 5/2006 | Simonoff |
| 7,047,279 B1 | 5/2006 | Beams et al. |
| 7,047,424 B2 | 5/2006 | Bendinelli et al. |
| 7,051,161 B2 | 5/2006 | Dixit et al. |
| 7,051,316 B2 | 5/2006 | Charisius et al. |
| 7,054,837 B2 | 5/2006 | Hoffman et al. |
| 7,054,944 B2 | 5/2006 | Tang et al. |

| Patent No. | Date | Name |
|---|---|---|
| 7,055,028 B2 | 5/2006 | Peiffer et al. |
| 7,055,169 B2 | 5/2006 | Delpuch et al. |
| 7,055,947 B2 | 6/2006 | Silverbrook |
| 7,057,759 B2 | 6/2006 | Lapstun et al. |
| 7,069,234 B1 | 6/2006 | Cornelius et al. |
| 7,070,110 B2 | 7/2006 | Lapstun et al. |
| 7,072,665 B1 | 7/2006 | Blumberg et al. |
| 7,072,843 B2 | 7/2006 | Menninger et al. |
| 7,072,965 B2 | 7/2006 | Ryuutou et al. |
| 7,080,041 B2 | 7/2006 | Nagel |
| 7,082,409 B1 | 7/2006 | Cherry |
| 7,085,683 B2 | 8/2006 | Anderson et al. |
| 7,085,834 B2 | 8/2006 | Delany et al. |
| 7,085,854 B2 | 8/2006 | Keane et al. |
| 7,086,728 B2 | 8/2006 | Silverbrook |
| 7,092,370 B2 | 8/2006 | Jiang et al. |
| 7,096,009 B2 | 8/2006 | Mousseau et al. |
| 7,096,418 B1 | 8/2006 | Singhal et al. |
| 7,096,495 B1 | 8/2006 | Warrier et al. |
| 7,097,106 B2 | 8/2006 | Silverbrook et al. |
| 7,100,195 B1 | 8/2006 | Underwood |
| 7,103,068 B1 | 9/2006 | Gardner et al. |
| 7,107,285 B2 | 9/2006 | von Kaenel et al. |
| 7,113,779 B1 | 9/2006 | Fujisaki et al. |
| 7,113,962 B1 | 9/2006 | Kee et al. |
| 7,114,180 B1 | 9/2006 | DeCaprio |
| 7,117,504 B2 | 10/2006 | Smith et al. |
| 7,117,530 B1 | 10/2006 | Lin |
| 7,120,596 B2 | 10/2006 | Hoffman et al. |
| 7,120,666 B2 | 10/2006 | McCanne et al. |
| 7,120,690 B1 | 10/2006 | Krishnan et al. |
| 7,120,852 B2 | 10/2006 | Terry et al. |
| 7,124,101 B1 | 10/2006 | Mikurak |
| 7,124,442 B2 | 10/2006 | Nash-Putnam |
| 7,126,955 B2 | 10/2006 | Nabhan et al. |
| 7,128,265 B2 | 10/2006 | Silverbrook et al. |
| 7,128,270 B2 | 10/2006 | Silverbrook et al. |
| 7,130,792 B2 | 10/2006 | Tokieda et al. |
| 7,130,807 B1 | 10/2006 | Mikurak |
| 7,131,596 B2 | 11/2006 | Lapstun et al. |
| 7,134,131 B1 | 11/2006 | Hendricks et al. |
| 7,135,991 B2 | 11/2006 | Slemmer et al. |
| 7,136,645 B2 | 11/2006 | Hanson et al. |
| 7,137,566 B2 | 11/2006 | Silverbrook et al. |
| 7,139,999 B2 | 11/2006 | Bowman-Amuah |
| 7,140,044 B2 | 11/2006 | Redlich et al. |
| 7,143,153 B1 | 11/2006 | Black et al. |
| 7,144,095 B2 | 12/2006 | Silverbrook |
| 7,146,384 B2 | 12/2006 | Sawafta |
| 7,146,644 B2 | 12/2006 | Redlich et al. |
| 7,149,698 B2 | 12/2006 | Guheen et al. |
| 7,149,897 B2 | 12/2006 | Chincheck et al. |
| 7,149,959 B1 | 12/2006 | Jones et al. |
| 7,150,398 B2 | 12/2006 | Silverbrook et al. |
| 7,152,047 B1 | 12/2006 | Nagel |
| 7,152,092 B2 | 12/2006 | Beams et al. |
| 7,152,207 B1 | 12/2006 | Underwood et al. |
| 7,155,518 B2 | 12/2006 | Forslow |
| 7,155,676 B2 | 12/2006 | Land et al. |
| 7,159,014 B2 | 1/2007 | Kausik et al. |
| 7,159,777 B2 | 1/2007 | Silverbrook et al. |
| 7,164,680 B2 | 1/2007 | Loguinov |
| 7,165,041 B1 | 1/2007 | Guheen et al. |
| 7,167,844 B1 | 1/2007 | Leong et al. |
| 7,171,379 B2 | 1/2007 | Menninger et al. |
| 7,175,089 B2 | 2/2007 | Silverbrook et al. |
| 7,178,106 B2 | 2/2007 | Lamkin et al. |
| 7,178,719 B2 | 2/2007 | Silverbrook et al. |
| 7,181,766 B2 | 2/2007 | Bendinelli et al. |
| 7,184,445 B2 | 2/2007 | Gupta et al. |
| 7,187,470 B2 | 3/2007 | Lapstun et al. |
| 7,188,273 B2 | 3/2007 | Allen et al. |
| 7,188,769 B2 | 3/2007 | Silverbrook et al. |
| 7,191,252 B2 | 3/2007 | Redlich et al. |
| 7,194,761 B1 | 3/2007 | Champagne |
| 7,197,374 B2 | 3/2007 | Silverbrook et al. |
| 7,197,502 B2 | 3/2007 | Feinsmith |
| 7,197,570 B2 | 3/2007 | Eylon et al. |
| 7,197,751 B2 | 3/2007 | Fedotov et al. |
| 7,199,885 B2 | 4/2007 | Dodge |
| 7,200,804 B1 | 4/2007 | Khavari et al. |
| 7,206,811 B2 | 4/2007 | Skurikhin et al. |
| 7,207,483 B2 | 4/2007 | Silverbrook et al. |
| 7,207,485 B2 | 4/2007 | Silverbrook et al. |
| 7,212,296 B2 | 5/2007 | Dodge et al. |
| 7,216,173 B2 | 5/2007 | Clayton et al. |
| 7,219,127 B2 | 5/2007 | Huck et al. |
| 7,221,660 B1 | 5/2007 | Simonson et al. |
| 7,222,152 B1 | 5/2007 | Thompson et al. |
| 7,222,305 B2 | 5/2007 | Teplov et al. |
| 7,225,040 B2 | 5/2007 | Eller et al. |
| 7,225,244 B2 | 5/2007 | Reynolds et al. |
| 7,225,382 B2 | 5/2007 | Ramech et al. |
| 7,228,459 B2 | 6/2007 | Jiang et al. |
| 7,246,233 B2 | 7/2007 | Brabson et al. |
| 7,260,617 B2 | 8/2007 | Bazinet et al. |
| 7,260,840 B2 | 8/2007 | Swander et al. |
| 7,263,071 B2 | 8/2007 | Yim |
| 7,272,853 B2 | 9/2007 | Goodman et al. |
| 7,284,044 B2 | 10/2007 | Teraoaka et al. |
| 7,318,100 B2 | 1/2008 | Demmer et al. |
| 7,321,906 B2 | 1/2008 | Green |
| 7,328,267 B1 | 2/2008 | Bashyam et al. |
| 7,340,772 B2 | 3/2008 | Panasyuk et al. |
| 7,353,533 B2 | 4/2008 | Wright et al. |
| 7,363,347 B2 | 4/2008 | Thomas |
| 7,363,378 B2 | 4/2008 | Holmes et al. |
| 7,386,631 B1 | 6/2008 | Sibal et al. |
| 7,389,462 B1 | 6/2008 | Wang et al. |
| 7,392,348 B2 | 6/2008 | Dumont |
| 7,398,320 B1 | 7/2008 | Minakuchi et al. |
| 7,398,552 B2 | 7/2008 | Pardee et al. |
| 7,401,116 B1 | 7/2008 | Chalfin et al. |
| 7,404,003 B1 | 7/2008 | Noble |
| 7,406,533 B2 | 7/2008 | Li et al. |
| 7,409,708 B2 | 8/2008 | Goodman et al. |
| 7,415,723 B2 | 8/2008 | Pandya |
| 7,420,992 B1 | 9/2008 | Fang et al. |
| 7,433,314 B2 | 10/2008 | Sharma et al. |
| 7,441,119 B2 | 10/2008 | Brabson et al. |
| 7,458,095 B2 | 11/2008 | Forsberg |
| 7,464,264 B2 | 12/2008 | Goodman et al. |
| 7,480,312 B2 | 1/2009 | Ossman |
| 7,496,659 B1 | 2/2009 | Coverdill et al. |
| 7,512,702 B1 | 3/2009 | Srivastava et al. |
| 7,522,581 B2 | 4/2009 | Acharya et al. |
| 7,536,715 B2 | 5/2009 | Markham |
| 7,606,902 B2 | 10/2009 | Rao et al. |
| 7,609,721 B2 | 10/2009 | Rao et al. |
| 7,644,188 B2 | 1/2010 | Vlodavsky et al. |
| 7,673,048 B1 | 3/2010 | O'Toole et al. |
| 7,757,074 B2 | 7/2010 | Sundarrajan et al. |
| 7,979,694 B2 | 7/2011 | Touitou et al. |
| 2001/0030970 A1 | 10/2001 | Wiryaman et al. |
| 2001/0037387 A1 | 11/2001 | Gilde et al. |
| 2001/0043600 A1 | 11/2001 | Chatterjee et al. |
| 2001/0046212 A1 | 11/2001 | Nakajima |
| 2001/0047406 A1 | 11/2001 | Araujo et al. |
| 2001/0049717 A1 | 12/2001 | Freeman et al. |
| 2001/0049741 A1 | 12/2001 | Skene et al. |
| 2001/0052016 A1 | 12/2001 | Skene et al. |
| 2002/0004834 A1 | 1/2002 | Guenther et al. |
| 2002/0004902 A1 | 1/2002 | Toh et al. |
| 2002/0007402 A1 | 1/2002 | Huston et al. |
| 2002/0007404 A1* | 1/2002 | Vange et al. .................. 709/217 |
| 2002/0016827 A1 | 2/2002 | McCabe et al. |
| 2002/0023210 A1 | 2/2002 | Tuomenoksa et al. |
| 2002/0026478 A1 | 2/2002 | Rodgers et al. |
| 2002/0026531 A1 | 2/2002 | Keane et al. |
| 2002/0029285 A1 | 3/2002 | Collins |
| 2002/0032725 A1 | 3/2002 | Araujo et al. |
| 2002/0032798 A1 | 3/2002 | Xu |
| 2002/0035451 A1 | 3/2002 | Rothermel |
| 2002/0035596 A1 | 3/2002 | Yang et al. |
| 2002/0038339 A1 | 3/2002 | Xu |
| 2002/0042875 A1 | 4/2002 | Shukla |
| 2002/0049608 A1 | 4/2002 | Hartsell et al. |
| 2002/0049841 A1 | 4/2002 | Johnson et al. |

| | | | | | |
|---|---|---|---|---|---|
| 2002/0055966 A1* | 5/2002 | Border et al. .......... 709/200 | 2003/0093566 A1 | 5/2003 | Jardin |
| 2002/0057717 A1 | 5/2002 | Mallory | 2003/0105604 A1 | 6/2003 | Ash et al. |
| 2002/0059274 A1 | 5/2002 | Hartsell et al. | 2003/0105977 A1 | 6/2003 | Brabson et al. |
| 2002/0059429 A1 | 5/2002 | Carpenter et al. | 2003/0110296 A1 | 6/2003 | Kirsch et al. |
| 2002/0059435 A1 | 5/2002 | Border et al. | 2003/0112809 A1 | 6/2003 | Bharali et al. |
| 2002/0065864 A1 | 5/2002 | Hartsell et al. | 2003/0112823 A1 | 6/2003 | Collins et al. |
| 2002/0065919 A1 | 5/2002 | Taylor et al. | 2003/0115421 A1 | 6/2003 | McHenry et al. |
| 2002/0069278 A1 | 6/2002 | Forslow | 2003/0123394 A1 | 7/2003 | Neale et al. |
| 2002/0071438 A1 | 6/2002 | Singh | 2003/0123481 A1 | 7/2003 | Neale et al. |
| 2002/0073061 A1 | 6/2002 | Collins | 2003/0131079 A1 | 7/2003 | Neale et al. |
| 2002/0073298 A1 | 6/2002 | Geiger et al. | 2003/0131263 A1 | 7/2003 | Keane et al. |
| 2002/0081971 A1 | 6/2002 | Travostino | 2003/0140121 A1 | 7/2003 | Adams |
| 2002/0083175 A1 | 6/2002 | Afek et al. | 2003/0149899 A1 | 8/2003 | Boden et al. |
| 2002/0083183 A1 | 6/2002 | Pujare et al. | 2003/0152028 A1 | 8/2003 | Raisanen et al. |
| 2002/0087729 A1 | 7/2002 | Edgar | 2003/0154110 A1 | 8/2003 | Walter et al. |
| 2002/0091788 A1 | 7/2002 | Chlan et al. | 2003/0154239 A1 | 8/2003 | Davis et al. |
| 2002/0095400 A1 | 7/2002 | Johnson et al. | 2003/0165138 A1 | 9/2003 | Swonk et al. |
| 2002/0095498 A1 | 7/2002 | Chanda et al. | 2003/0167403 A1 | 9/2003 | McCurley et al. |
| 2002/0098840 A1 | 7/2002 | Hanson et al. | 2003/0174718 A1 | 9/2003 | Sampath et al. |
| 2002/0099940 A1 | 7/2002 | Wang | 2003/0177389 A1 | 9/2003 | Albert et al. |
| 2002/0101848 A1 | 8/2002 | Lee et al. | 2003/0177395 A1 | 9/2003 | Pardee et al. |
| 2002/0101860 A1 | 8/2002 | Thornton et al. | 2003/0182423 A1 | 9/2003 | Shafir et al. |
| 2002/0105972 A1 | 8/2002 | Richter et al. | 2003/0182431 A1 | 9/2003 | Sturniolo et al. |
| 2002/0107903 A1 | 8/2002 | Richter et al. | 2003/0182437 A1 | 9/2003 | Kobayashi et al. |
| 2002/0107962 A1 | 8/2002 | Richter et al. | 2003/0188001 A1 | 10/2003 | Eisenberg et al. |
| 2002/0107971 A1 | 8/2002 | Bailey et al. | 2003/0191799 A1 | 10/2003 | Araujo et al. |
| 2002/0107989 A1 | 8/2002 | Johnson et al. | 2003/0191812 A1 | 10/2003 | Agarwalla et al. |
| 2002/0107990 A1 | 8/2002 | Johnson et al. | 2003/0198189 A1 | 10/2003 | Roberts et al. |
| 2002/0108059 A1 | 8/2002 | Canion et al. | 2003/0200295 A1 | 10/2003 | Roberts et al. |
| 2002/0116452 A1 | 8/2002 | Johnson et al. | 2003/0200353 A1 | 10/2003 | Dogra et al. |
| 2002/0116582 A1 | 8/2002 | Copeland et al. | 2003/0208602 A1 | 11/2003 | Bhalla et al. |
| 2002/0120743 A1 | 8/2002 | Shabtay et al. | 2003/0212760 A1 | 11/2003 | Chen et al. |
| 2002/0126675 A1 | 9/2002 | Yoshimura et al. | 2003/0212776 A1 | 11/2003 | Roberts et al. |
| 2002/0133593 A1 | 9/2002 | Johnson et al. | 2003/0217105 A1 | 11/2003 | Zircher et al. |
| 2002/0138511 A1 | 9/2002 | Psounis et al. | 2003/0217126 A1 | 11/2003 | Polcha et al. |
| 2002/0138572 A1 | 9/2002 | Delany et al. | 2003/0217149 A1 | 11/2003 | Crichton et al. |
| 2002/0138618 A1 | 9/2002 | Szabo | 2003/0223361 A1 | 12/2003 | Hussain et al. |
| 2002/0138640 A1* | 9/2002 | Raz et al. .......... 709/231 | 2003/0223418 A1 | 12/2003 | Desai et al. |
| 2002/0147795 A1 | 10/2002 | Cantwell | 2003/0223433 A1 | 12/2003 | Lee et al. |
| 2002/0147822 A1 | 10/2002 | Susai et al. | 2003/0226018 A1 | 12/2003 | Tardo et al. |
| 2002/0150064 A1 | 10/2002 | Lucidarme | 2003/0229718 A1 | 12/2003 | Tock et al. |
| 2002/0152373 A1 | 10/2002 | Sun et al. | 2003/0229761 A1 | 12/2003 | Basu et al. |
| 2002/0152423 A1 | 10/2002 | McCabe | 2003/0233423 A1 | 12/2003 | Dilley et al. |
| 2002/0156927 A1 | 10/2002 | Boucher et al. | 2003/0236831 A1 | 12/2003 | Ortiz et al. |
| 2002/0161908 A1 | 10/2002 | Benitez et al. | 2003/0236837 A1 | 12/2003 | Johnson et al. |
| 2002/0163882 A1 | 11/2002 | Bornstein et al. | 2003/0236861 A1 | 12/2003 | Johnson et al. |
| 2002/0174227 A1 | 11/2002 | Hartsell et al. | 2003/0236919 A1 | 12/2003 | Johnson et al. |
| 2002/0174255 A1 | 11/2002 | Hayter et al. | 2004/0003101 A1 | 1/2004 | Roth et al. |
| 2002/0176532 A1 | 11/2002 | McClelland et al. | 2004/0006708 A1 | 1/2004 | Mukherjee et al. |
| 2002/0184224 A1 | 12/2002 | Haff et al. | 2004/0008693 A1 | 1/2004 | Grove et al. |
| 2002/0194382 A1 | 12/2002 | Kausik et al. | 2004/0010601 A1 | 1/2004 | Afergan et al. |
| 2002/0199007 A1 | 12/2002 | Clayton et al. | 2004/0010604 A1 | 1/2004 | Tanaka et al. |
| 2003/0009538 A1 | 1/2003 | Shah et al. | 2004/0010621 A1 | 1/2004 | Afergan et al. |
| 2003/0014623 A1 | 1/2003 | Freed et al. | 2004/0031058 A1 | 2/2004 | Reisman |
| 2003/0014624 A1 | 1/2003 | Maturana et al. | 2004/0034744 A1 | 2/2004 | Karlsson et al. |
| 2003/0014625 A1 | 1/2003 | Freed et al. | 2004/0034794 A1 | 2/2004 | Mayer et al. |
| 2003/0014628 A1 | 1/2003 | Freed et al. | 2004/0039827 A1 | 2/2004 | Thomas et al. |
| 2003/0014650 A1 | 1/2003 | Freed et al. | 2004/0042487 A1 | 3/2004 | Ossman |
| 2003/0018891 A1 | 1/2003 | Hall et al. | 2004/0044521 A1 | 3/2004 | Chen et al. |
| 2003/0023767 A1 | 1/2003 | Brabson et al. | 2004/0044731 A1 | 3/2004 | Chen et al. |
| 2003/0026241 A1 | 2/2003 | Ono et al. | 2004/0049515 A1 | 3/2004 | Haff et al. |
| 2003/0033520 A1 | 2/2003 | Peiffer et al. | 2004/0073716 A1 | 4/2004 | Boom et al. |
| 2003/0037108 A1 | 2/2003 | Peiffer et al. | 2004/0078621 A1 | 4/2004 | Talaugon et al. |
| 2003/0039354 A1 | 2/2003 | Kimble et al. | 2004/0078772 A1 | 4/2004 | Balay et al. |
| 2003/0046586 A1 | 3/2003 | Bheemarasetti et al. | 2004/0087304 A1 | 5/2004 | Buddhikot et al. |
| 2003/0046587 A1 | 3/2003 | Bheemarasetti et al. | 2004/0098486 A1 | 5/2004 | Gu et al. |
| 2003/0051100 A1 | 3/2003 | Patel | 2004/0100976 A1 | 5/2004 | Chang et al. |
| 2003/0051102 A1* | 3/2003 | Jacobs et al. .......... 711/145 | 2004/0103150 A1 | 5/2004 | Ogdon et al. |
| 2003/0055883 A1 | 3/2003 | Wiles, Jr. | 2004/0103225 A1 | 5/2004 | McAlpine et al. |
| 2003/0055962 A1 | 3/2003 | Freund et al. | 2004/0103438 A1 | 5/2004 | Yan et al. |
| 2003/0061505 A1 | 3/2003 | Sperry et al. | 2004/0107360 A1 | 6/2004 | Herrmann et al. |
| 2003/0065763 A1 | 4/2003 | Swildens et al. | 2004/0111519 A1 | 6/2004 | Fu et al. |
| 2003/0067874 A1 | 4/2003 | See et al. | 2004/0128252 A1 | 7/2004 | Shirai et al. |
| 2003/0069941 A1 | 4/2003 | Peiffer | 2004/0141525 A1 | 7/2004 | Bhushan et al. |
| 2003/0079031 A1 | 4/2003 | Nagano | 2004/0143655 A1 | 7/2004 | Narad et al. |
| 2003/0084162 A1 | 5/2003 | Johnson et al. | 2004/0143734 A1 | 7/2004 | Buer et al. |
| 2003/0084165 A1 | 5/2003 | Kjellberg et al. | 2004/0146053 A1 | 7/2004 | Nabhan et al. |
| 2003/0088698 A1 | 5/2003 | Singh et al. | 2004/0162876 A1 | 8/2004 | Kohavi |
| 2003/0088788 A1 | 5/2003 | Yang | 2004/0177158 A1 | 9/2004 | Bauch et al. |

| | | |
|---|---|---|
| 2004/0177359 A1 | 9/2004 | Bauch et al. |
| 2004/0190092 A1 | 9/2004 | Silverbrook et al. |
| 2004/0202171 A1 | 10/2004 | Hama |
| 2004/0203296 A1 | 10/2004 | Moreton et al. |
| 2004/0205439 A1 | 10/2004 | Carmeli et al. |
| 2004/0210320 A1 | 10/2004 | Pandya |
| 2004/0213248 A1 | 10/2004 | Okuda et al. |
| 2004/0215665 A1 | 10/2004 | Edgar et al. |
| 2004/0215746 A1 | 10/2004 | McCanne et al. |
| 2004/0221031 A1 | 11/2004 | Desai |
| 2004/0225898 A1 | 11/2004 | Frost et al. |
| 2004/0225911 A1 | 11/2004 | Smith |
| 2004/0249975 A1 | 12/2004 | Tuck et al. |
| 2004/0258003 A1 | 12/2004 | Kokot et al. |
| 2004/0260922 A1 | 12/2004 | Goodman et al. |
| 2004/0268357 A1 | 12/2004 | Joy et al. |
| 2004/0268358 A1 | 12/2004 | Darling et al. |
| 2005/0005014 A1 | 1/2005 | Holmes et al. |
| 2005/0005107 A1 | 1/2005 | Touboul |
| 2005/0013280 A1 | 1/2005 | Buddhikot et al. |
| 2005/0021762 A1 | 1/2005 | Gbadegesin |
| 2005/0022011 A1 | 1/2005 | Swander et al. |
| 2005/0022012 A1 | 1/2005 | Bluestone et al. |
| 2005/0022031 A1 | 1/2005 | Goodman et al. |
| 2005/0025150 A1 | 2/2005 | Helmy et al. |
| 2005/0027788 A1 | 2/2005 | Koopmans et al. |
| 2005/0031058 A1 | 2/2005 | Soong et al. |
| 2005/0033858 A1 | 2/2005 | Swildens et al. |
| 2005/0033926 A1 | 2/2005 | Dumont |
| 2005/0044350 A1 | 2/2005 | White et al. |
| 2005/0050317 A1 | 3/2005 | Kramer et al. |
| 2005/0055690 A1 | 3/2005 | Cornillon et al. |
| 2005/0058112 A1 | 3/2005 | Lahey et al. |
| 2005/0080850 A1 | 4/2005 | Salesky et al. |
| 2005/0080907 A1 | 4/2005 | Panasyuk et al. |
| 2005/0086386 A1 | 4/2005 | Shen et al. |
| 2005/0102529 A1 | 5/2005 | Buddhikot et al. |
| 2005/0108412 A1 | 5/2005 | Sjollema et al. |
| 2005/0108517 A1 | 5/2005 | Dillon et al. |
| 2005/0122980 A1 | 6/2005 | Anand et al. |
| 2005/0125663 A1 | 6/2005 | Funk |
| 2005/0132030 A1 | 6/2005 | Hopen et al. |
| 2005/0132060 A1 | 6/2005 | Mo et al. |
| 2005/0135250 A1 | 6/2005 | Singh et al. |
| 2005/0144186 A1 | 6/2005 | Hesselink et al. |
| 2005/0144481 A1 | 6/2005 | Hopen et al. |
| 2005/0147126 A1 | 7/2005 | Qiu et al. |
| 2005/0149481 A1 | 7/2005 | Hesselink et al. |
| 2005/0149726 A1 | 7/2005 | Joshi et al. |
| 2005/0165928 A1 | 7/2005 | Shu et al. |
| 2005/0177866 A1 | 8/2005 | Kirsch |
| 2005/0185647 A1 | 8/2005 | Rao et al. |
| 2005/0193075 A1 | 9/2005 | Haff et al. |
| 2005/0195780 A1 | 9/2005 | Haverinen et al. |
| 2005/0198380 A1 | 9/2005 | Panasyuk et al. |
| 2005/0198532 A1 | 9/2005 | Comlekoglu et al. |
| 2005/0210150 A1 | 9/2005 | Bahl |
| 2005/0223412 A1 | 10/2005 | Nadalin et al. |
| 2005/0232161 A1 | 10/2005 | Maufer et al. |
| 2005/0232298 A1 | 10/2005 | Beverly et al. |
| 2005/0246346 A1 | 11/2005 | Gerdes et al. |
| 2005/0246445 A1 | 11/2005 | Panasyuk et al. |
| 2005/0256923 A1 | 11/2005 | Adachi |
| 2005/0259634 A1 | 11/2005 | Ross |
| 2005/0262357 A1 | 11/2005 | Araujo et al. |
| 2005/0265315 A1 | 12/2005 | Edgar |
| 2005/0265353 A1 | 12/2005 | Sengupta et al. |
| 2005/0267974 A1 | 12/2005 | Panasyuk et al. |
| 2005/0286466 A1 | 12/2005 | Tagg et al. |
| 2006/0005240 A1 | 1/2006 | Sundarrajan et al. |
| 2006/0015570 A1 | 1/2006 | Khemani et al. |
| 2006/0018332 A1 | 1/2006 | Kakani et al. |
| 2006/0031547 A1 | 2/2006 | Tsui et al. |
| 2006/0034283 A1 | 2/2006 | Ko et al. |
| 2006/0041635 A1 | 2/2006 | Alexander et al. |
| 2006/0053164 A1 | 3/2006 | Ewing et al. |
| 2006/0053253 A1 | 3/2006 | Roth et al. |
| 2006/0059370 A1 | 3/2006 | Asnis et al. |
| 2006/0064500 A1 | 3/2006 | Roth et al. |
| 2006/0069719 A1 | 3/2006 | McCanne et al. |
| 2006/0089996 A1 | 4/2006 | Peiffer |
| 2006/0112185 A1 | 5/2006 | van Bemmel |
| 2006/0123477 A1 | 6/2006 | Raghavan et al. |
| 2006/0129689 A1 | 6/2006 | Ho et al. |
| 2006/0133405 A1 | 6/2006 | Fee |
| 2006/0142878 A1 | 6/2006 | Banik et al. |
| 2006/0185010 A1 | 8/2006 | Sultan |
| 2006/0225130 A1 | 10/2006 | Chen et al. |
| 2006/0245414 A1 | 11/2006 | Susai et al. |
| 2006/0271652 A1 | 11/2006 | Stavrakos et al. |
| 2006/0274828 A1 | 12/2006 | Siemens et al. |
| 2007/0008883 A1 | 1/2007 | Kobayashi |
| 2007/0061067 A1 | 3/2007 | Zeinstra et al. |
| 2007/0067366 A1 | 3/2007 | Landis |
| 2007/0110046 A1 | 5/2007 | Farrell et al. |
| 2007/0130324 A1 | 6/2007 | Wang |
| 2007/0130334 A1 | 6/2007 | Carley |
| 2007/0156852 A1 | 7/2007 | Sundarrajan et al. |
| 2007/0169179 A1 | 7/2007 | Narad |
| 2007/0179955 A1 | 8/2007 | Croft et al. |
| 2007/0192827 A1 | 8/2007 | Maxted et al. |
| 2007/0206621 A1 | 9/2007 | Plamondon et al. |
| 2007/0233910 A1 | 10/2007 | Paley et al. |
| 2007/0245409 A1 | 10/2007 | Harris et al. |
| 2008/0034416 A1 | 2/2008 | Kumar et al. |
| 2008/0046616 A1 | 2/2008 | Verzunov et al. |
| 2008/0049786 A1 | 2/2008 | Ram et al. |
| 2008/0071915 A1 | 3/2008 | Gbadegesin |
| 2008/0225720 A1 | 9/2008 | Khemani et al. |
| 2008/0225748 A1 | 9/2008 | Khemani et al. |
| 2008/0225753 A1 | 9/2008 | Khemani et al. |
| 2008/0229381 A1 | 9/2008 | Sikka et al. |
| 2008/0320151 A1 | 12/2008 | McCanne et al. |
| 2009/0133015 A1 | 5/2009 | Nagashima |
| 2010/0241846 A1 | 9/2010 | Sundarrajan et al. |

FOREIGN PATENT DOCUMENTS

| | | |
|---|---|---|
| EP | 0 436 365 | 7/1991 |
| EP | 0618708 | 10/1994 |
| EP | 1 045 553 | 10/2000 |
| EP | 1045553 | 10/2000 |
| EP | 1134942 | 9/2001 |
| EP | 1427133 | 6/2004 |
| EP | 1432209 | 6/2004 |
| JP | 07302237 A | 11/1995 |
| JP | 08-006910 A | 1/1996 |
| JP | 10-178450 | 6/1998 |
| JP | 2002-532784 | 2/2002 |
| JP | 2002-084289 | 3/2002 |
| JP | 2004078783 | 3/2004 |
| WO | WO-99/04343 | 1/1999 |
| WO | WO-00/34885 | 6/2000 |
| WO | WO-01/47185 A2 | 6/2001 |
| WO | WO-02/13037 | 2/2002 |
| WO | WO-02/23362 A1 | 3/2002 |
| WO | WO-02/39301 A2 | 5/2002 |
| WO | WO-02/069604 A2 | 9/2002 |
| WO | WO-03/019876 | 3/2003 |
| WO | WO-03/026244 | 3/2003 |
| WO | WO-03/048936 A1 | 6/2003 |
| WO | WO-03/083692 | 10/2003 |
| WO | WO-2004/088933 | 10/2004 |
| WO | WO-2004/114529 A2 | 12/2004 |
| WO | WO-2005/013534 | 2/2005 |
| WO | WO-2005/024567 A2 | 3/2005 |
| WO | WO-2005048106 | 5/2005 |
| WO | WO-2005/088476 | 9/2005 |
| WO | WO-2006005078 | 1/2006 |
| WO | WO-2006/012612 | 2/2006 |
| WO | WO-2006/020823 | 2/2006 |
| WO | WO-2006012612 | 2/2006 |
| WO | WO-2006/075219 A2 | 7/2006 |
| WO | WO-2006074072 | 7/2006 |
| WO | WO-2008/112691 A2 | 9/2008 |
| WO | WO-2008112698 A2 | 9/2008 |

OTHER PUBLICATIONS

International Search Report for PCT/US2005/047435. mailing date Sep. 8, 2006. 5 pages.
International Search Report for PCT/US2005/023914, mailing date May 7, 2007. 2 pages.
Office Action for U.S. Appl. No. 11/169,002, Mailing Date Jun. 22, 2007.
Non Final Office Action dated Nov. 21, 2007 for U.S. Appl. No. 11/323,196. 14 pages.
Non Final Office Action dated Jan. 8, 2008 for U.S. Appl. No. 11/324,146. 12 pages.
International Search Report, PCT/US05/23914, mailed on May 7, 2007. 3 pages.
Final Office Action dated Mar. 17, 2008 for U.S. Appl. No. 11/169,002. 28 pages.
Non Final Office Action, U.S. Appl. No. 11/323,196. dated May 14, 2008.
Office Action from Sep. 25, 2008 for U.S. Appl. No. 11/323,196, 19 pages.
Office Action from Oct. 3, 2008 for U.S. Appl. No. 11/324,131, pp. 22.
Office Action from Nov. 12, 2008 for U.S. Appl. No. 11/324,146, pp. 17.
Office Action from Dec. 30, 2008 for U.S. Appl. No. 11/323,353, pp. 22.
Office Action from Feb. 13, 2009 for U.S. Appl. No. 11/323,196, pp. 13.
Office Action from Feb. 27, 2009 for U.S. Appl. No. 11/324,141, pp. 10.
U.S. Appl. No. 11/323,196 US Office Action Feb. 13, 2009.
U.S. Appl. No. 11/323,196 US Office Action Aug. 3, 2009.
International Search Report for PCT/US2005/026300, Mailing date: Dec. 16, 2005. 3 pages.
Non Final Office Action dated Jan. 24, 2008 pertaining to U.S. Appl. No. 10/988,004. 6 pages.
International Search Report for PCT/US2005/022884, mailed on Jul. 8, 2008.
Written Opinion of the ISA for PCT/US2005/022884, mailed on Jul. 8, 2008.
Non Final Office Action dated Aug. 15, 2008 pertaining to U.S. Appl. No. 11/161,090 25 pages.
Notice of Allowance dated Sep. 18, 2008. USPTO U.S. Appl. No. 10/988,004 5 pgs.
Office Action dated Sep. 26, 2008 from Chinese Application No. 200480040249.X corresponding to U.S. Appl. No. 10/988,004 22 pgs.
Non Final Office Action dated Jun. 23, 2008 pertaining to U.S. Appl. No. 11/039,946. (14 pages).
Office Action dated Aug. 5, 2008. USPTO U.S. Appl. No. 11/161,091.
Non Final Office Action dated Oct. 28, 2008 pertaining to U.S. Appl. No. 11/161,656. 21 pages.
EP Communication from EP Patent Application No. 05 785 297.2, dated May 18, 2007, 2 pages.
Non Final Office Action dated Jun. 10, 2008 pertaining to U.S. Appl. No. 11/187,562. 15 pages.
International Search Report to PCT/US2005/026296, mailed on Jan. 31, 2006, 5 pgs.
Written Opinion of the International Searching Authority to PCT/US2005/026296, mailed on Jan. 31, 2006.
Written Opinion of the International Searching Authority to PCT/US04/37918, mailed on Apr. 27, 2005, 7 pages.
International Search Report to PCT/US04/37918, mailed on Apr. 27, 2008, 1 page.
International Search Report for PCT/US2005/028663, Mailing date: Nov. 16, 2005. 3 pages.
Written Opinion of the International Searching Authority to PCT/US2005/028663; Mailed on Nov. 16, 2005, 7 pages.
Written Opinion of the International Searching Authority to PCT/US2005/026300; Mailed on Dec. 16, 2005, 7 pages.
European Search Report for European Patent Application No. EP 07007414 dated Jul. 16, 2007. (2 pages).
EP Communication for EP Patent Application No. 07007414.1 dated Jun. 5, 2008. (6 pages).
EP Communication for European Patent Application No. 05776653.7 dated Oct. 5, 2007. (7 pages).
Office Action dated Aug. 20, 2008. USPTO U.S. Appl. No. 11/161,092.
Non Final Office Action dated Dec. 11, 2007 pertaining to U.S. Appl. No. 10/683,881. 10 pages.
Non Final Office Action dated Jun. 26, 2008 pertaining to U.S. Appl. No. 11/188,279. 12 pages.
Final Office Action dated Dec. 9, 2008 pertaining to U.S. Appl. No. 11/187,562. 15 pages.
Final Office Action dated Dec. 23, 2008 pertaining to U.S. Appl. No. 11/188,279. 12 pages.
Office action for U.S. Appl. No. 11/161,091 dated Feb. 18, 2009.
Office Action for U.S. Appl. No. 11/161,092 dated Feb. 12, 2009.
Office Action for U.S. Appl. No. 11/161,093 dated Jan. 2, 2009.
Office Action for U.S. Appl. No. 11/187,562 dated Apr. 27, 2009.
Office Action for U.S. Appl. No. 11/187,512 dated Mar. 3, 2009.
Advisory Action for U.S. Appl. No. 11/039,946 dated Mar. 24, 2009.
Office Action for U.S. Appl. No. 11/039,946 dated Jan. 23, 2009.
Office Action for U.S. Appl. No. 11/039,946 dated Jun. 23, 2009.
Office action for U.S. Appl. No. 11/161,091 dated Aug. 3, 2009.
Office Action for AU appl. 2005272779 dated Apr. 23, 2009.
Exam Report for EP appln 05776653.7 dated Apr. 2009.
Office Action for AU appl. 2005266943 dated May 14, 2009.
Exam Report for AU appln 2005266945 dated Jul. 21, 2009.
Advisory action for U.S. Appl. No. 11/161,091 dated May 6, 2009.
Notice of Allowance for U.S. Appl. No. 11/161,092 dated Jun. 11, 2009.
Advisory Action for U.S. Appl. No. 11/161,092 dated Apr. 24, 2009.
Office Action for U.S. Appl. No. 11/161,093 dated Jun. 19, 2009.
Office action for U.S. Appl. No. 11/161,090 dated May 28, 2009.
Advisory Action for U.S. Appl. No. 11/161,656 dated Jul. 29, 2009.
Office Action for U.S. Appl. No. 11/161,656 dated May 13, 2009.
Office Action for U.S. Appl. No. 11/187,512 dated Sep. 15, 2009.
Office Action for U.S. Appl. No. 11/161,093 dated Sep. 2, 2009.
U.S. Appl. No. 11/323,353 US Office Action Jun. 3, 2009.
U.S. Appl. No. 11/324,141 US Office Action Aug. 21, 2009.
U.S. Appl. No. 11/324,146 US Office Action Mar. 25, 2009.
U.S. Appl. No. 11/323,196 Office Action Aug. 3, 2009.
U.S. Appl. No. 11/323,196 Office Action Nov. 19, 2009.
U.S. Appl. No. 11/324,141 US Office Action Feb. 27, 2009.
U.S. Appl. No. 11/324,141 US Office Action Mar. 3, 2010.
U.S. Appl. No. 11/323,353 US Office Action Jun. 25, 2010.
U.S. Appl. No. 11/323,353 US Office Action Dec. 10, 2009.
Advisory Action for U.S. Appl. No. 11/187,512 dated Mar. 16, 2011.
Advisory Action for U.S. Appl. No. 11/187,508 dated Nov. 23, 2010.
Advisory Action for U.S. Appl. No. 11/161,093 dated Nov. 16, 2009.
Advisory Action for U.S. Appl. No. 11/161,093 dated Dec. 14, 2009.
Biagioni et al., Signature for a network Protocol Stack: A System Application of Standard ML, Jul. 1994.
Canadian Office Action for CA appl. 2545496 dated Feb. 15, 2011.
Dictionary service [online], [retrieved on Jul. 23, 2009]. Retrieved from the Internet <URL: http://dictionary.reference.com/browse/discard>.
Doug Allen, Layer-7 Load Balancers Pack New Punch, CMP Media LLC Network Magazine, Sep. 2003.
EP Search Report for EP appl. 10184310.0 dated Dec. 9, 2010.
EP Search Report for EP appl. 10184317.5 dated Dec. 7, 2010.
Exam report for EP appl. 05785297.2 dated Jun. 19, 2009.
Exam Report for EP appl. 070074141 dated Nov. 17, 2009.
International Search Report for PCT/US2007/066433. Mailing date Oct. 31, 2007, p. 1-4.
J. C. Mogul, "The Case for Persistent-Connection HTTP," 8282 Computer Communication Review 25, Oct. 1995.
Kong, et al; "Pseudo-serving: a user-responsible paradigm for internet access"; Apr. 7-11, 1997; SO Computer Networks and ISDN Systems; vol. 29; pp. 1053-1064.
Noriaki Kobayashi, "Internet VPN", N+1 Network Guide, vol. 3, No. 9, Oct. 1, 2003, pp. 44-49. (9 pages) (English Abstract).
*Notice of Reasons for Rejection, Japanese Application* No. 2007-549641, mailed May 17, 2011.

Official Notification from Israeli Patent Office, for Appl No. 184750 mailed Apr. 7, 2011.
R. Briscoe, "The Implications of Pervasive Computing on Network Design," BT Technology Journal, pp. 170-190, Jul. 2004.
Ranzau et al., "Softricity/Tacit, An Innovative Approach to Virtual Computing," http://www.daboc.com/downloadnow.aspx?file=211&is=617, Oct. 20, 2005.
Restriction Requirement for U.S. Appl. No. 11/161,093 dated Jul. 26, 2010. (9 pages).
Wang et al., Shield: Vulnerability-Driven Network Filters for Preventing Known Vulnerability Exploits, Feb. 2004, Microsoft Research, MSR-TR-2003-81.
Written Opinion of the International Searching Authority, PCT/US2007/066433, mailed Oct. 31, 2007.
Yoshikazu Kobayashi, VPN service introduction, Computer & Network LAN, vol. 21, No. 3, Mar. 1, 2003, pp. 25-40. (19 pages) (English Abstract).
Restriction Requirement for U.S. Appl. No. 11/169,002 dated Apr. 30, 2007.
International Search Report, PCT/US2005/047433, mailed Jul. 12, 2007.
Office action for U.S. Appl. No. 11/161,090 dated Feb. 4, 2009.
Office Action for U.S. Appl. No. 11/323,354 mailed Feb. 4, 2009.
Office Action for U.S. Appl. No. 11/324,140 mailed Feb. 4, 2009.
Office Action for U.S. Appl. No. 11/324,138, mailed Feb. 11, 2009.
Office Action for U.S. Appl. No. 11/323,352 mailed Mar. 9, 2009.
Office Action for U.S. Appl. No. 11/323,829 mailed Jun. 18, 2009.
Office Action for CN appln 00480040249.X dated Jun. 19, 2009.
Office Action for U.S. Appl. No. 11/323,354 mailed Aug. 4, 2009.
Office Action for U.S. Appl. No. 11/324,140 mailed Aug. 4, 2009.
Office Action for U.S. Appl. No. 11/324,138 mailed Aug. 18, 2009.
Office Action for U.S. Appl. No. 11/324,203 mailed Sep. 1, 2009.
Notice of Allowance for U.S. Appl. No. 11/161,656 dated Sep. 18, 2009.
Office Action for CN appl. 200580034849.X dated Sep. 25, 2009.
Office Action U.S. Appl. No. 11/324,146 Nov. 13, 2009.
Office Action for U.S. Appl. No. 11/187,512 dated Dec. 23, 2009.
Office action for U.S. Appl. No. 11/161,090 dated Jan. 6, 2010.
Office Action for CN appl. 200580028535 dated Jan. 15, 2010.
Office Action for JP appl. 2006-539930 dated Feb. 18, 2010.
Office Action for U.S. Appl. No. 11/161,093 dated Feb. 22, 2010.
Office action for U.S. Appl. No. 11/161,091 dated Feb. 24, 2010.
Office Action for U.S. Appl. No. 11/188,274 dated Mar. 29, 2010.
Notice of Acceptance for AU Appl. 2005272779 dated May 26, 2010.
Notice of Acceptance for AU Appl. 2005266943 dated May 28, 2010.
Office Action for U.S. Appl. No. 11/187,512 dated Jun. 22, 2010.
Office Action for JP Appl. 2007-519353 dated Jul. 12, 2010. (English Abstract).
Office Action for CN Appl. 20050034849X dated Aug. 3, 2010.
Office Action for U.S. Appl. No. 11/169,002 dated Aug. 4, 2010.
Office Action for JP Appl. 2007-525810 dated Aug. 4, 2010. (English Abstract).
Office Action for U.S. Appl. No. 12/560,154 dated Sep. 1, 2010.
Office Action for IN Appl. 1514KOLNP2006 dated Sep. 7, 2010.
Office Action for U.S. Appl. No. 11/187,508 dated Sep. 15, 2010.
Office Action for U.S. Appl. No. 11/161,093 dated Oct. 1, 2010.
Notice of Acceptance for AU 2010214746 dated Nov. 2, 2010.
Office Action for JP Appl. 2007-048002 dated Nov. 8, 2010. (English Abstract).
Notice of Allowance for U.S. Appl. No. 11/323,353 dated Nov. 15, 2010.
Office Action for U.S. Appl. No. 12/557,497 dated Nov. 19, 2010.
Office Action dated Nov. 30, 2010 pertaining to U.S. Appl. No. 11/187,512.
Office Action dated Dec. 7, 2010 pertaining to U.S. Appl. No. 11/161,091.
Office Action for U.S. Appl. No. 11/161,093 dated Feb. 3, 2011.
Office Action for U.S. Appl. No. 12/560,154 dated Feb. 4, 2011.
Official Notification, Israeli Appln 184308, mailed Feb. 7, 2011.
Office Action for U.S. Appl. No. 12/871,246 mailed Feb. 24, 2011.
Notice of Allowance for U.S. Appl. No. 12/336,795 dated Mar. 2, 2011.
Teruhara Serada, "SSL VPN", N+1 Network LAN, vol. 21, No. 3, Mar. 1, 2003, pp. 25-40. (English Abstract).
Notice of Allowance for U.S. Appl. No. 11/161,090 dated Mar. 4, 2011.
Office Action for CN Appln 200580048867.3 mailed Mar. 11, 2011.
Office Action for U.S. Appl. No. 11/161,091 dated Apr. 5, 2011.
Notice of Allowance on U.S. Appl. No. 12/560,154 dated May 2, 2011.
Notice of Allowance on U.S. Appl. No. 12/557,497 dated May 6, 2011.
Ipswitch Inc., WSFTP User's Guide, Chapter 8: Security, Jun. 25, 2003, 8 pages.
Japanese Office Action on 2007-552147 dated Jun. 30, 2011.
Pedro Hernandez, "Tacit Adds to Softricity's Spark", Nov. 18, 2005. Available online at: www.enterpriseitplant.com/networking/news/article.php/3565401.
Japanese Office Action for JP appl. 2007-522843 dated Dec. 1, 2010.
Japanese Office Action for JP appl. 2007-519353 dated Jul. 16, 2010.
Korean Office Action for KR appl. 2006-7009144 dated Jan. 14, 2011.
Office Action, Chinese Appln No. 200580048867.3, mailed Jan. 26, 2011.
Office Action, Chinese Appln 200580048867.3, mailed Sep. 26, 2010.
Office Action for JP Appl. 2007-522841 dated Sep. 10, 2010. (9 pages) (English Abstract).
Office Action for CN appln 200580034849X dated Apr. 7, 2010.
Office Action for CN Appl. 200580030928.3 dated Apr. 23, 2010.
Chinese Office Action on 201110075213.7 dated Jan. 30, 2012.
Chinese Office Action on 201110076025.6 dated Oct. 26, 2011.
European Examination Report on 05855924.6 dated Nov. 24, 2011.
Final Office Action for U.S. Appl. No. 11/169,002 dated Aug. 6, 2009.
Lazenka, M. "The Evolution of Software Distribution: Where Did We Come From and Where are We Heading?", Nov. 6-9, 2005, ACM, p. 179-183.
Hasegawa et al., "A Mechanism for TCP Performance Enhancement over Assymetrical Environment," Proceedings 8th IEEE ISCC'03, 1530-1346/03, 2003.
International Search Report for PCT/US2007/066433 dated Oct. 31, 2007.
Non-Final Office Action for U.S. Appl. No. 11/169,002 dated Dec. 23, 2008.
Non-Final Office Action for U.S. Appl. No. 11/169,002 dated Feb. 16, 2010.
Notice of Allowance on U.S. Appl. No. 12/020,649 dated Oct. 4, 2011.
Office Action on U.S. Appl. No. 11/324,141 dated Nov. 10, 2010.
Office Action on U.S. Appl. No. 11/324,141 dated Dec. 15, 2011.
Office Action on U.S. Appl. No. 11/324,141 dated Apr. 26, 2011.
Office Action on U.S. Appl. No. 11/324,146 dated Jan. 24, 2012.
Office Action on U.S. Appl. No. 11/324,146 dated Feb. 15, 2011.
Office Action on U.S. Appl. No. 11/324,146 dated Jun. 22, 2011.
Office Action on U.S. Appl. No. 12/020,649 dated Mar. 28, 2011.
Office Action on U.S. Appl. No. 12/020,963 dated Jun. 10, 2011.
U.S. Appl. No. 11/323,196 Notice of Allowance Apr. 19, 2010.
U.S. Appl. No. 11/324,146 Office Action Nov. 13, 2009.
Written Opinion for PCT/US2005/047435 dated Aug. 8, 2006.

* cited by examiner

METHOD AND DEVICE FOR PERFORMING CACHING OF DYNAMICALLY GENERATED OBJECTS IN A DATA COMMUNICATION NETWORK

RELATED APPLICATIONS

This present application claims priority as a continuation-in-part to U.S. patent application Ser. No. 11/169,002 entitled "METHOD AND DEVICE FOR PERFORMING INTEGRATED CACHING IN A DATA COMMUNICATION NETWORK," filed Jun. 29, 2005 which claims priority to U.S. provisional patent application Ser. No. 60/583,784, filed Jun. 30, 2004; and as a continuation-in-part to U.S. patent application Ser. No. 11/039,946, entitled "SYSTEM AND METHOD FOR ESTABLISHING A VIRTUAL PRIVATE NETWORK," filed Jan. 24, 2005, and issued as U.S. Pat. No. 7,757,074 on Jul. 13, 2010, which claims priority to U.S. provisional patent application Ser. No. 60/583,785, filed Jun. 30, 2004; both of which are incorporated herein by reference.

FIELD OF THE INVENTION

The present invention relates generally to caching data in a network. In particular, the present invention relates to a method and device for performing caching of dynamically generated objects in a network.

BACKGROUND

The growth rate of network traffic continues to strain the infrastructure that carries that traffic. Various solutions have arisen to permit network operators to handle this increasing problem, including the development of caching technology. With traditional caching, static content can be reused and served to multiple clients without burdening server infrastructure. Additionally, cache memories permit static content to be stored closer to the end user, thereby improving response time while at the same time reducing server infrastructure burden. Lowered response times and lowered server infrastructure load reduces bandwidth and the processing requirements of such infrastructure.

However, an increasing amount of the content delivered across networks is dynamically generated, including a large percentage of network traffic created by enterprise computing solutions and complex internet applications. Dynamically generated content is content generated by the server at the time an object is requested, and is often based on inputs received from the client. Therefore, it frequently changes both through time and with respect to inputs made to the generating system. Common examples of dynamic content include where a stock quotation request made by a client or database searches. In each instance, the response object is generated in real time following receipt of a specific, client request.

The challenges to caching dynamically generated content are manifold. For example, there are no generally-accepted standards or specifications for caching dynamically generated content. Since there exists no standard for designating whether a dynamically generated object may be cached, such objects are typically treated as non-cacheable. Another challenge is determining the validity of "freshness" of a dynamically generated object because changes to the underlying data used to generate such objects may be irregular and unpredictable.

In addition to the above difficulties, requests for dynamically generated content are also typically more complex than requests for static content. Dynamic requests often contain a string of information that needs to be processed or parsed by the destination application to identify applicable parameters that will be used by the cache to identify the appropriate object related to such request. These parameters, however, are rarely placed in the request in a logical or consistent order by the client. To determine which of the multitude of dynamically generated objects is identified by the request, each such request must be normalized (i.e., place the parameters in non-arbitrary order).

Furthermore, matching a request to a dynamically generated object becomes a much more complex task with dynamically generated content because certain processing done by the application may need to be duplicated or otherwise anticipated, by making an educated guess. This duplication or guessing is necessary to decide whether an object stored by the cache is appropriate for serving to a particular incoming request. The complexity arises as a result of the complexity of the applications themselves, and also because the contents of the response can be a function of both the contents of the request, as well as certain other external variables like the user-identity (which may or may not be present in the request), the time of the day, the current state of the user database and a myriad of other factors.

In summary, caching originally developed around the caching of static objects. As the Internet and applications becomes more and more dependent upon delivering dynamically generated content, the need has arisen for a solution that extends the benefits of caching to dynamic content, and that solves the variety of challenges such content presents for traditional caching technology.

BRIEF SUMMARY OF THE INVENTION

The solution of the present invention increases the ability of cache memories to store and serve dynamically generated data. The present invention also enables the cache to effectively deal with a variety of different application request types, thereby increasing application performance and easing the administrative complexity of preserving freshness of data served from the cache. The present invention provides an effective approach to caching dynamic content by the use of heuristics to effectively predict the behavior of such applications servers in addition to incorporating the ability to understand and process data in a way that does not duplicate processing carried out by the application server that originally generates the object. These techniques of the present invention, in turn, increase the use of dynamic caching, and thereby contribute to the improvement of the performance of both the network, as well as underlying application infrastructure.

The present invention is directed towards a method and system for caching and maintaining dynamically generated objects in a cache. The techniques of the present invention include receiving an invalidation command at the cache to invalidate an object, such as a dynamically generated object previously served from an originating server and stored in the cache. The dynamically generated object may not be identified as cacheable from the originating server. The invalidation command received by the cache identifies the cached dynamically generated object. In response to the invalidation command, the cache marks the cached dynamically generated object as invalid, and flushes the object from the cache.

The present invention also provides techniques for identifying cached dynamically generated objects using an object determinant. The cache may intercept a communication between the client and server, and parse the communication to identify an object determinant. The object determinant may identify an object previously served and stored in the cache.

The cache determines from the object determinant whether a change has occurred or will occur, in the object identified by the object determinant at the originating server. If a change has occurred or will occur, the cache marks as invalid in the cache the object identified by the object determinant. Once the object has been marked as invalid, the cache may flush the invalid object and retrieve the object from the originating server.

Further embodiments of the present invention apply the above methods to groups of dynamically generated objects. For example, a group of previously served dynamically generated objects are formed in the cache. The group of objects is associated with at least one object determinant. A record of the group is maintained in the cache and may be associated with the object determinant. The group of previously served objects is marked as invalid if the identified object determinant of a communication intercepted by the cache indicates a change has occurred or will occur in one or more objects of the group at the originating server.

In one aspect, the present invention is related to a method for caching a dynamically generated object not identified as cacheable. The method includes storing in a cache a dynamically generated object served from an originating server and not identified as cacheable, and receiving, by the cache, a request to invalidate the cached dynamically generated object. In response to the request, the cache marks the cached dynamically generated object as invalid. The cache may be operated on any device, such as an appliance, a network device or a computing device in communications between the originating server and a client.

In some embodiments, the method of the present invention includes requesting, by the originating server to invalidate the cached dynamically generated object. In a further embodiment, the originating server automatically requests to invalidate the cached dynamically generated object in response to a change to the dynamically generated object in the originating server. In another embodiment, the client is in communication with the originating server to receive the dynamically generated object, and the client requests to invalidate the cached dynamically generated object. In yet another embodiments, an external administrative control requests invalidation of the cached dynamically generated object.

In one embodiment, the method of the present invention includes flushing from the cache the cached dynamically generated object marked as invalid. In another embodiment, the cache receives the request to invalidate within a very short time period, for example, ten milliseconds or less, of caching the dynamically generated object. In some embodiments, the cache invalidates the cached dynamically generated object responsive to an expiration of a very short time expiry, such as an expiry of 10 milliseconds or less of the cached object.

In another aspect, the present invention is related to a method for caching a group of dynamically generated objects. In some embodiments, the group of objects has at least one object not identified as cacheable. The method includes identifying, in a cache, a group of dynamically generated objects previously served from an originating server. The cache associates the group with an object determinant. The method further includes intercepting, by the cache, a communication identifying the object determinant of the group and indicating a change is about to occur or has occurred on the originating server to one of the objects of the group. In one embodiment, the method of the present invention includes marking, by the cache, the group of dynamically generated objects as invalid in response to intercepting the communication or identifying the object determinant.

Furthermore, in some embodiments of the present invention, the cache may flush from the cache the group of objects marked as invalid. In other embodiments, the group of dynamically generated objects is pre-designated. In other embodiments, the method automatically identifies the group of dynamically generated objects and associates the object determinant with the group according to a rule.

In one aspect, the present invention is related to another method for maintaining a cache of dynamically generated object. This method of the present invention includes intercepting, by a cache, a communication between a client and an originating server, for example, a client's request to an originating server for a dynamically generated object. The dynamically generated object may have been previously served from the originating server and stored in the cache. The method identifies, by the cache, an object determinant in the communication indicating one of a change has occurred or will occur in a dynamically generated object at the originating server, and marks, by the cache, the cached dynamically generated object as invalid. The method then obtains the requested dynamically generated object from the originating server.

In one embodiment of the method, the cache flushes the invalid dynamically generated object. In another embodiment, the cache associates the dynamically generated object with a group of dynamically generated objects previously served from the originating server, associates the group with the object determinant, and marks the group of dynamically generated objects as invalid in response to the request. In some embodiments, the dynamically generated object is not identified as cacheable. In further embodiments, the cache flushes the group of dynamically generated objects marked as invalid. The group of dynamically generated objects may be pre-designated or other automatically identified via an object determinant according to a rule.

In some embodiments of the method, the client embeds in the communication the object determinant as a pre-defined string. In other embodiments, the cache identifies the object determinant based on a pre-defined heuristic rule associated with the dynamically generated object. In one embodiment, the cache selects the object determinant from one of the following elements of the communication: 1) USERID, 2) IP address, 3) TCP port, 4) HTTP header, 5) custom HTTP header, 6) client URL, 7) cookie header, 8) URL query string, and 9) POST body. The cache may also extract from the communication the object determinant based on a user-configured invalidation policy.

In another embodiment, the method of the present invention includes maintaining a table in the cache to associate the object determinant with one or more objects or groups of objects stored in the cache. In some embodiments, the method includes examining, by an intelligent statistical engine, communications from the client to identify a set of dynamically generated objects to associate as a group in the cache. The cache may associate objects stored in the cache into a content group. The content group may be represented by a hash table having an incarnation number as an index. In other embodiments, the cache performs a hash algorithm on the dynamically generated object identified via the request to determine a change to the dynamically generated object.

In some aspects, the present invention is related to a system for caching a dynamically generated object not identified as cacheable, the system includes means for storing in a cache a dynamically generated object not identified as cacheable, the dynamically generated object served from an originating server, and a means for receiving, by the cache, a request to invalidate the cached dynamically generated object. The system also includes means for marking, by the cache in response to the request, the cached dynamically generated object as invalid.

In other aspects, the presented is related to a system for caching a group of objects, such as dynamically generated objects. In some embodiments, the dynamically generated objects has at least one object not identified as cacheable. The system includes means for identifying, in a cache, a group of dynamically generated objects previously served from an originating server, at least one of the dynamically generated objects not identified as cacheable, and means for associating, by the cache, the group with an object determinant. The system also includes means for intercepting, by the cache, a communication identifying the object determinant of the group and indicating a change is about to occur or has occurred on the originating server to one of the objects of the group.

In one aspect, the present invention is related to a system for maintaining a cache of dynamically generated objects. The system includes means for intercepting, by a cache, a communication between a client and an originating server. The system also includes means for identifying, by the cache, an object determinant in the communication that indicates a change has occurred or will occur in a dynamically generated object at the originating server, and means for marking, by the cache, the cached dynamically generated object as invalid. In some embodiments, the system also includes means for obtaining the dynamically generated object from the originating server.

The details of various embodiments of the invention are set forth in the accompanying drawings and the description below.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the relevant art(s) to make and use the invention.

Figure 1:
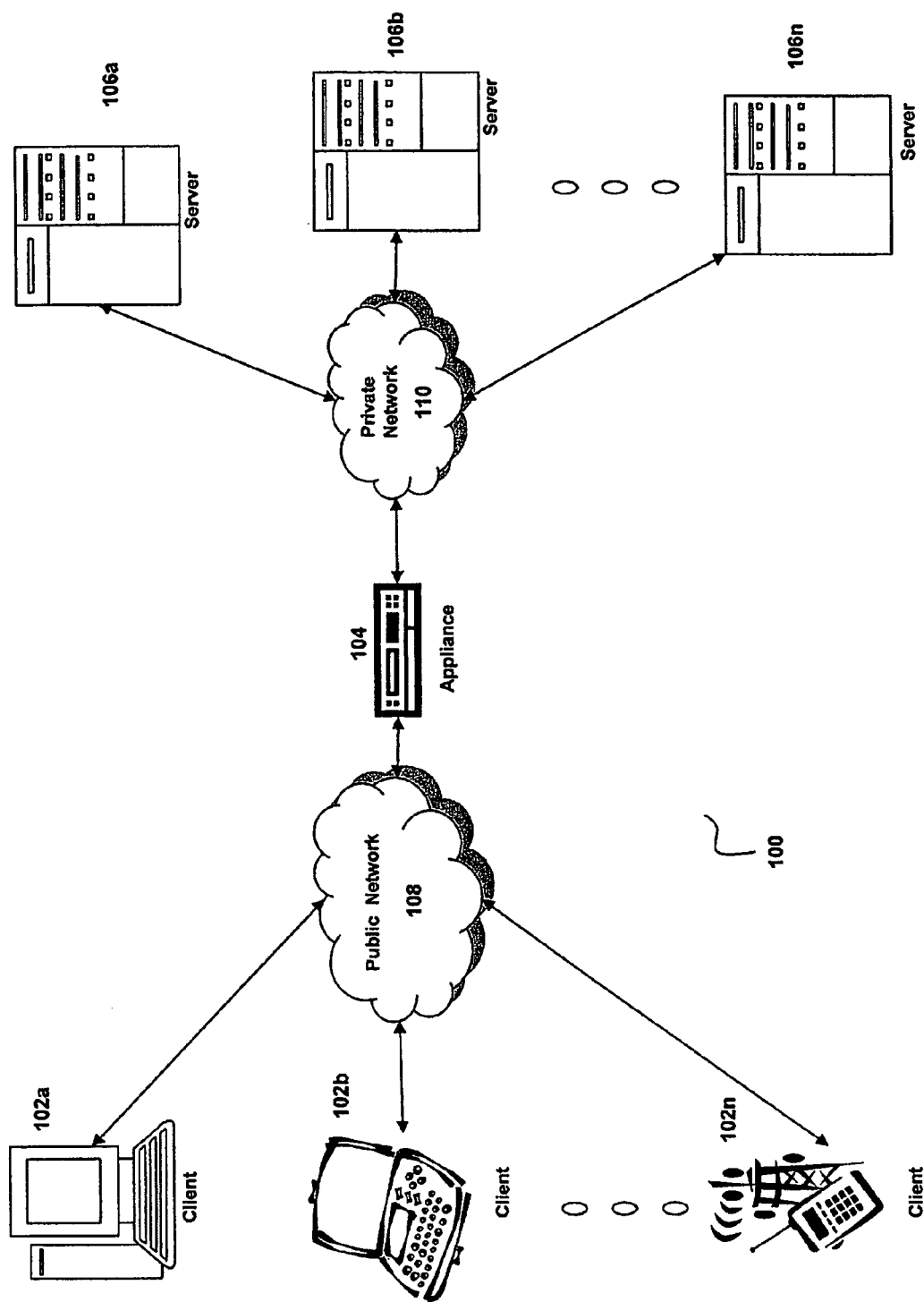
FIG. 1 is a block diagram illustrating an example network environment in which an embodiment of the present invention may be implemented.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

A. Example Network Environment

FIG. 1 illustrates an example network environment 100 in which an embodiment of the present invention may be practiced. As shown in FIG. 1, example network environment 100 includes a plurality of clients 102a-102n, a plurality of servers 106a-106n., and an appliance 104, which may also referred to as a cache appliance, device, or cache. The servers 106a-106n originate and manage databases, such as object or relational databases, that provide requested content to the clients 102a-102n. For this reason, the servers 106a-106n are sometimes referred to herein as "originating servers" because they typically, though not necessarily, originate the objects forming the requested content. Each of the clients 102a-102n and servers 106a-106n may be any type and form of computing device, such as the computing device 800 described in more detail later in conjunction with FIGS. 8A and 8B. For example, any of the client 102a-102n may be a mobile computing device, such as a telecommunication device, e.g., cellphone or personal digital assistant, or a laptop or notebook computer in addition to any type of desktop computer.

Each of the clients 102a-102n are communicatively coupled to appliance 104 via a public data communication network 108, while appliance 104 is communicatively coupled to servers 106a-106n via a private data communication network 110. In one embodiment, public data communication network 108 comprises the Internet and private data communication network 110 comprises an enterprise network. The public data communication network 108 and private data communication network 110 can be any type and form of network, public, private or otherwise, and in some cases, may be the same network.

Although FIG. 1 shows a network 108 and a network 1110 between the clients 102a-102n and the servers 106a-106n, the clients 102a-102n and the servers 106a-106n may be on the same network 108 or 110. The networks 108 and 110 can be the same type of network or different types of networks. The network 108 and/or the network 110 can be a local-area network (LAN), such as a company Intranet, a metropolitan area network (MAN), or a wide area network (WAN), such as the Internet or the World Wide Web. The network 108 and/or 110 may be any type and/or form of network and may include any of the following: a point to point network, a broadcast network, a wide area network, a local area network, a telecommunications network, a data communication network, a computer network, an ATM (Asynchronous Transfer Mode)

network, a SONET (Synchronous Optical Network) network, a SDH (Synchronous Digital Hierarchy) network, a wireless network and a wireline network. The topology of the network 108 and/or 110 may be a bus, star, or ring network topology. The network 108 and/or 110 and network topology may be of any such network or network topology as known to those ordinarily skilled in the art capable of supporting the operations of the present invention described herein.

As shown in FIG. 1, the appliance 104 is shown between the public data communication network 108 and the private data communication network 110 some In other embodiments, the appliance 104 may be located on the public data communication network 108, or on the private data communication network 110. In other embodiments, the appliance 104 could be an integral part of any individual client 102a-102n or any individual server 106a-106n on the same or different network 108, 110 as the client 102a-102n. As such, the appliance 104 may be located at any point in the network or network communications path between a client 102a-102n and a server 106a-106n.

In accordance with an embodiment of the present invention, the appliance 104 includes cache management logic and also includes or has access to a storage medium which it utilizes to implement a cache memory. Using these features, appliance 104 monitors object requests made by clients 102a-102n to any of the servers 106a-106n. Objects returned from servers 106a-106n in response to these object requests are stored in the cache memory by appliance 104. Subsequent requests for the same object from any of clients 102a-102n are intercepted by appliance 104, which attempts to deliver the object from the cache rather than passing the request on to servers 106a-106n. This provides the dual benefit of reducing both the time required to respond to requests from clients 102a-102n and the load on the infrastructure supporting servers 106a-106n.

In summary, the network environment 100 depicted in FIG. 1 is presented by way of example only and is not intended to be limiting. Based on the teachings provided herein, persons skilled in the relevant art(s) will readily appreciate that the present invention may be implemented in any network environment in which object requests and responses are transferred between nodes of one or more network(s).

B. Example Appliance or Device Architecture

As will be described in more detail herein, in an embodiment of the present invention, the appliance 104 integrates caching functionality at the kernel level of the operating system with one or more other processing tasks, including but not limited to decryption, decompression, or authentication and/or authorization. Such an implementation is illustrated in the commonly owned and co-pending U.S. patent application Ser. No. 11/169,002 entitled "Method and Device for Performing Integrated Caching in a Data Communications Network," filed Jun. 29, 2005, which is incorporated by reference herein. Such an example architecture is described herein in accordance with FIG. 2, but the present invention is not so limited and other architectures may be used in practicing the operations of the present invention described herein.

Figure 2:
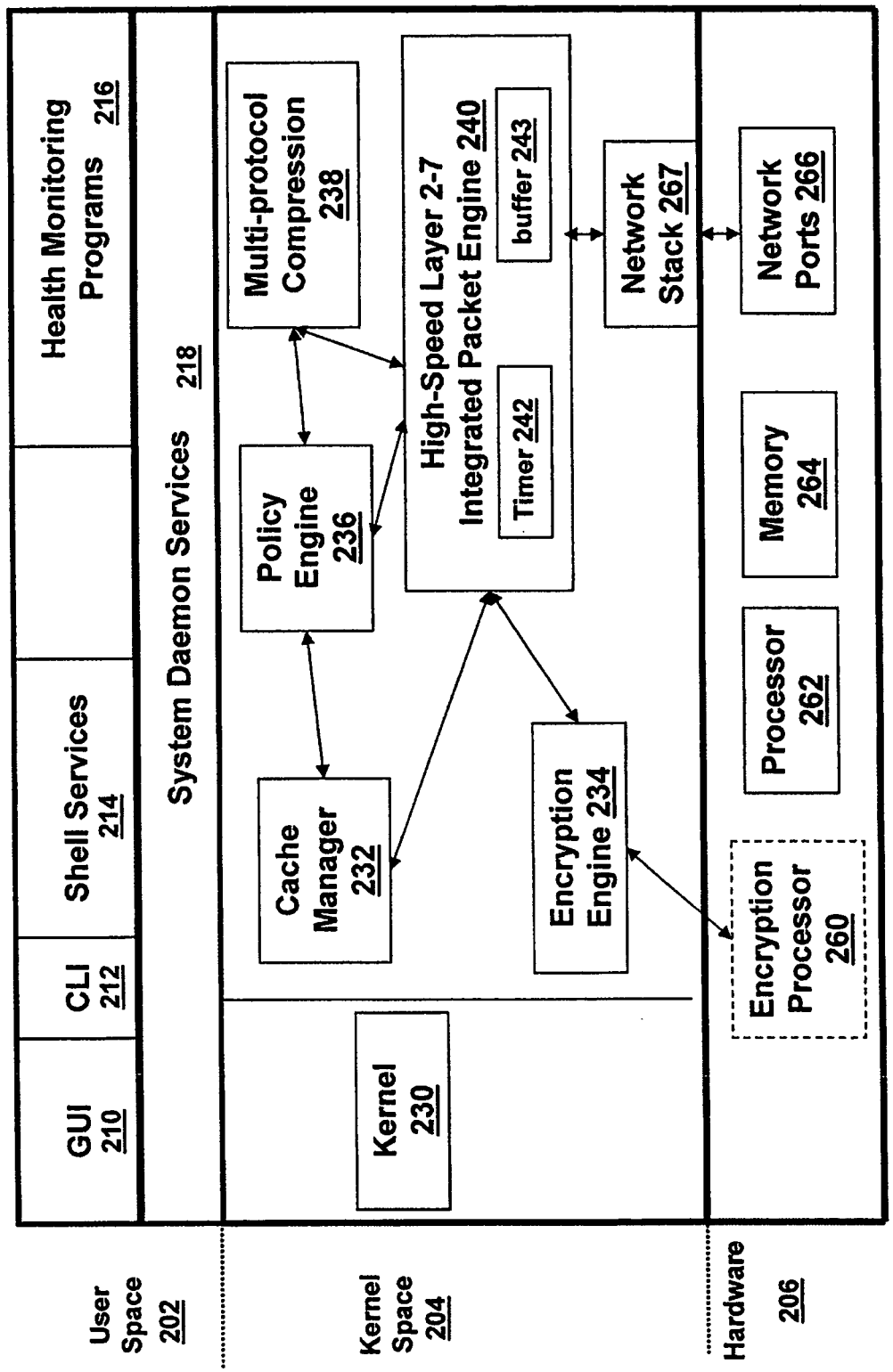
FIG. 2 is a block diagram illustrating an example architecture of an appliance that performs integrated caching in accordance with an embodiment of the present invention.

FIG. 2 illustrates an example architecture 200 of an appliance 104. As noted above, architecture 200 is provided by way of illustration only and is not intended to be limiting. As shown in FIG. 2, example architecture 200 consists of a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 104. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. Although the hardware layer 206 of appliance 104 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may be have executable instructions for performing processing of any security related protocol.

Figure 8A:
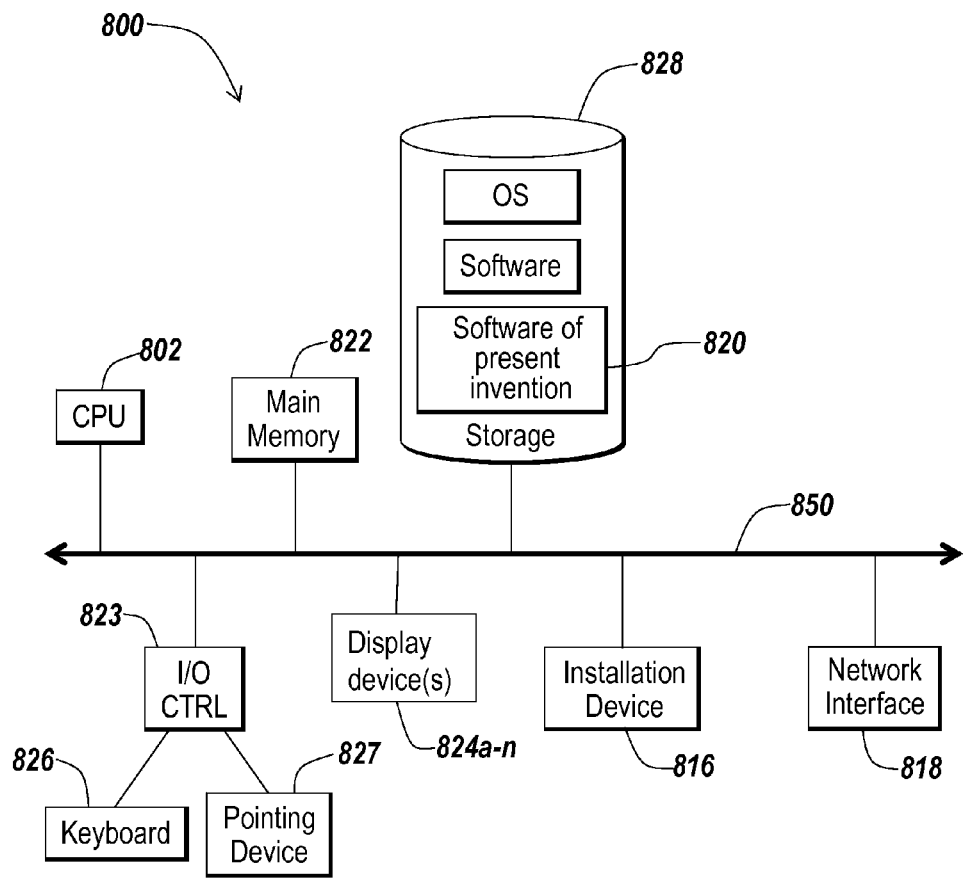
FIGS. 8A and 8B are block diagrams of embodiments of a computing device for practicing an illustrative embodiment of the present invention.
Figure 8B:
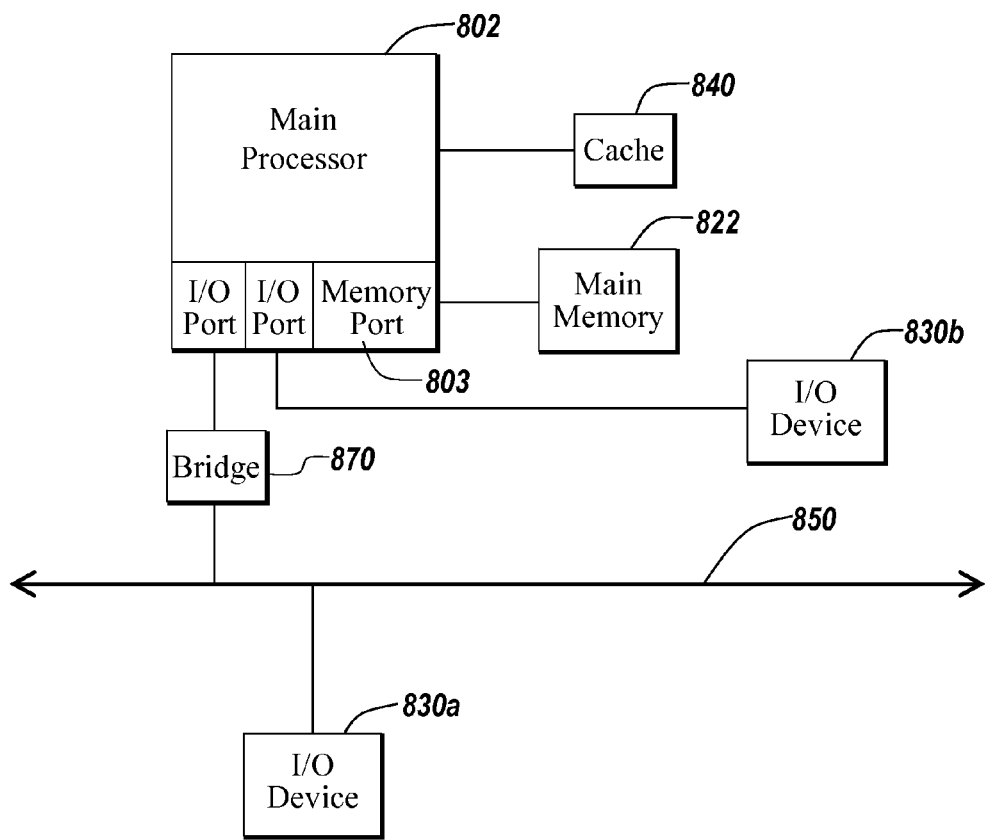

Although the hardware layer 206 of appliance 104 is illustrated with certain elements in FIG. 2, the hardware portions or components of appliance 104 may comprise any type and form of elements, hardware or software, of a computing device, such as the computing device 800 illustrated and discussed in conjunction with FIGS. 8A and 8B further herein. In some embodiments, the appliance 104 may comprise a server, gateway, router, switch, bridge or other type of computing or network device, and have any hardware and/or software elements associated therewith.

The operating system of appliance 104 allocates, manages, or otherwise segregates the available system memory into kernel space 204 and user space 204. In example software architecture 200, the operating system may be any type and/or form of Unix operating system although the invention is not so limited. As such, the appliance 104 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 104 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the present invention, the kernel space 204 also includes a number of network services or processes working in conjunction with a cache manager 232. sometimes also referred to as the integrated cache, the benefits of which are described in detail further herein. Additionally, the embodiment of the kernel 230 will depend on the embodiment of the operating system installed, configured, or otherwise used by the device 104.

In one embodiment, the device 104 comprises one network stack 267, such as a TCP/IP based stack, for communicating with the client 102a-102b and/or the server 106a-106n. In one embodiment, the network stack 267 is used to communicate with a first network, such as network 108, and a second network 110. In some embodiments, the device 104 terminates a first transport layer connection, such as a TCP connection of a client 102a-102n, and establishes a second transport layer connection to a server 106a-106n for use by the client 102a-102n, e.g., the second transport layer connection is terminated at the appliance 104 and the server 106a-106n. The first and second transport layer connections may be established via a single network stack 267. In other embodiments, the device 104 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 104.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 104. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the present invention uses a kernel-level data structure providing access to any portion of one or more network packets, for example, a network packet comprising a request from a client 102a-102n or a response from a server 106a-106n. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106a-106n. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element nat comprise a data object in memory 264 of device 104. In other embodiments, the cache memory element may comprise memory having a faster access time than memory 264. In another embodiment, the cache memory element may comprise any type and form of storage element of the device 104, such as a portion of a hard disk. In some embodiments, the processing unit 262 may provide cache memory for use by the cache manager 232 of the present invention. In yet further embodiments, the cache manager 232 may use any portion and combination of memory, storage, or the processing unit for caching data, objects, and other content.

Furthermore, the cache manager 232 of the present invention includes any logic, functions, rules, or operations to perform any embodiments of the techniques of the present invention described herein. For example, the cache manager 232 includes logic or functionality to invalidate objects based on the expiration of an invalidation time period or upon receipt of an invalidation command from a client 102a-102n or server 106a-106n. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identifying, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 104 in addition to access, control and management of security, network traffic, network access, compression or any other function or operation performed by the appliance 104. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 104. The encryption engine 234 may also setup or establish SSL or TLS connections on behalf of the client 102a-102n, server 106a-106n, or appliance 104. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 104. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 104 to appliance 104 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 of the present invention accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 104 via network ports 266. The high speed layer 2-7 integrated packet engine 240 may comprise a buffer for queuing one or more network packets during processing, such as for receipt of a network packet or transmission of a network packer. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238.

In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 104 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 104, such as via the operating system of the appliance 104 and either is user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 104 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 104. In some embodiments, the health monitoring program 216 intercepts and inspects any network traffic passed via the appliance 104. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 104. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 104.

Daemon services 218 are programs that run continuously or in the background and handle periodic service requests received by appliance 104. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

C. Caching of Dynamically Generated objects

Dynamic content, such as one or more dynamically generated objects, may be generated by servers, referred to as application or originating servers 106a-106n and/or back-end databases (not shown) that process object requests from one or more clients 102a-102n, local or remote, as depicted in FIG. 1. As those applications or databases process data, including data related to inputs received from clients, the response objects served by these databases and applications may change. Prior objects generated by those applications or databases in an originating server will no longer be fresh and therefore should no longer be stored by a cache. For example, given the same set of inputs a dynamically generated object of a first instance may be different than a dynamically generated object of a second instance. In another example, the same object may be dynamically generated with a different set of inputs such that a first instance of the object is generated differently from a second instance of the object.

In order to achieve improved network performance, the appliance 104 is designed and configured to addresses the problems that arise in caching dynamically generated content through a variety of methods, as described in detail below. In some embodiments of the present invention described herein, the appliance 104 incorporates a set of one or more techniques for making the invalidation of dynamically generated content stored in the cache more efficient and effective. Furthermore, the appliance may incorporate techniques for performing control and caching for flash crowds. Cache memories typically store every response to a request for an object as long as such response is not marked as non-cacheable. As described herein, efficient caching of dynamically generated contents requires techniques that enable the timely invalidation of objects in the cache memory that have undergone a change at the originating server. Timely invalidation allows the cache to avoid serving stale content—a task of particular concern with dynamically generated content, especially where changes to the content occur irregularly. Set forth below are a number of techniques to ensure timely invalidation of dynamically generated content.

1. Integrated Functionality

In one aspect, the present invention is related to techniques of integrating functions, logic, or operations of the cache manager 232, policy engine 236, encryption engine 234, and/or the multi-protocol compression engine 238 with packet processing operations of the high-speed layer 2-7 integrated packet engine 240 responsive to the packet processing timer 242. For example, the operations of the cache manager 232 can be performed within the time intervals of the packet processing timer 242 used for packet processing operations, such as on a receipt or transmit of a network packet. In one embodiment, by integrating with the packet processing operations and/or using the packet processing timer, the cache manager 232 of the present invention can cache objects with expiry times down to very small intervals of time, as will be described in further detail below. In other embodiments, the cache manager 232 responsive to the packet processing timer 242 can also receive an invalidation command to invalidate an object within a very short time period of caching the object.

Figure 3A:
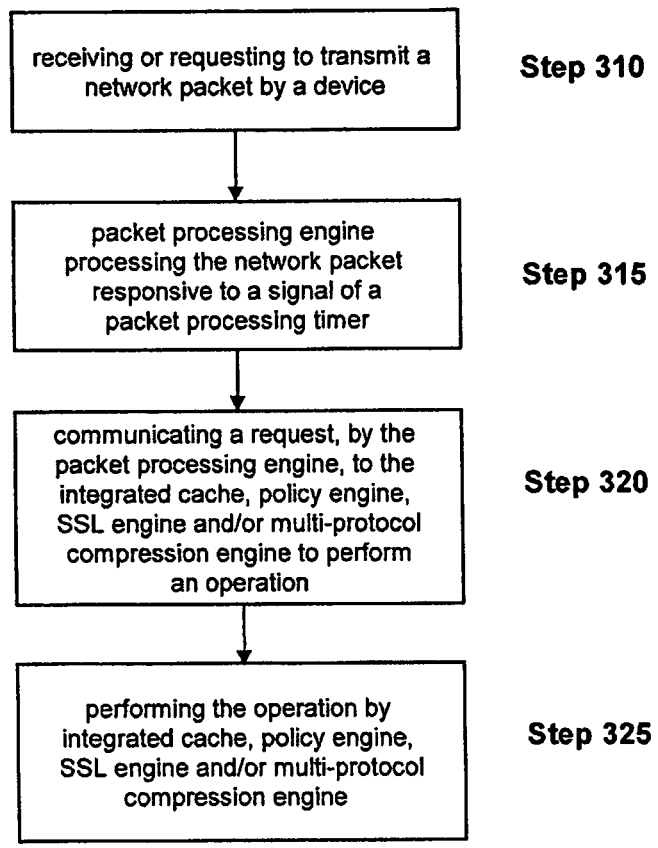
FIG. 3A is a flow diagram of steps taken in an embodiment of a method of the present invention for integrating device operations with packet processing and the packet processing timer.

The method 300 depicted in FIG. 3A illustrates one embodiment of a technique of the present invention for requesting the cache manager 232, policy engine 236, encryption engine 234, and/or the multi-protocol compression engine 238 to perform an operation during processing or in association with the time intervals for processing a network packet by the high-speed layer 2-7 integrated packet engine or packet processing engine 240. In brief overview, at step 310 of method 300, the device 104 receives a network packet or is requested to transmit a network packet. At step 315, the device 104 requests the packet processing engine 240 to process the network packet responsive to the packet processing timer 242. As part of, or associated with, packet processing operations, at step 320, the packet processing engine 240 requests the cache manager 232, policy engine 236, encryption engine 234, and/or the multi-protocol compression engine 238 to perform an operation on a cached object. At step 325, the cache manager 232, policy engine 236, encryption engine 234, and/or the multi-protocol compression engine 238 performs the requested operation, which may include any one or combination of the techniques of the present invention described herein. In one embodiment, the cache manager 232 determines invalidation of a cached object, and marks the cached object invalid. In some embodiments, the cache manager 232 flushes the invalid object in response to a request by the packet processing engine 240. As the cache manager 232 is performing these operations responsive to the packet processing timer 242, invalidation of objects can occur within time periods in the order of milliseconds and with objects having an expiry in the order of the time intervals provided by the packet processing timer 242, such as 10 ms.

In further detail of method 300 of the present invention, at step 310, the appliance 104 receives one or more network packets, and/or transmits one or more network packets. In some embodiments, the appliance 104 requests to transmit one or more network packets over the network 108 or network 110. In another embodiment, the appliance 104 receives a network packet on one port 266 and transmits a network packet on the same port 266 or a different port 266'. In some embodiments, the packet engine 240 of the appliance 104 transmits or requests to transmit one or more network packets. In one embodiment, the appliance 104 receives or transmits a packet on a first network 108, while in another embodiment, the appliance 104 receives or transmits a packet on a second network 110. In other embodiments, the appliance 104 receives and transmits packets on the same network. In some embodiments, the appliance 104 receives and/or transmits networks packets to one or more clients 102a-102n. In other embodiments, the appliance 104 receives and/or transmits networks packets to one or more servers 106a-106n.

At step 315, the device 104 may request or trigger packet processing operations of the packet processing engine 240 upon receipt of a network packet at the network port 266 of the device 104 or upon request to transmit a network packet from the device 104, or upon any combination of receipt and/or transmit of one or more network packets. In some embodiments, the packet processing operations of the packet processing engine 240 are triggered via a signal provided by a packet processing timer 242. In one embodiment, the packet processing timer 242 may provide interrupt-driven or event-driven timer functionality related to the receipt and/or transmission of one or more network packets. In some embodiments, the packet processing timer 242 is driven by a rate of receipt and/or transmit of network packets via the device 104, or by the rate by which each packet or a batch of packets are processed. As such, the packet processing timer 242 may be triggered and reset after each set of one or more packet processing operations. In another embodiment, the packet processing timer 242 provides time intervals, either equal or variable time intervals, to trigger, wake-up, or signal the packet processing engine 240 to perform a function or operation, such as handling a received packet or transmitting a submitted packet. As discussed above in connection with the device 104 of FIG. 2, the packet processing timer 242 may operate in the order of milliseconds, such as causing time intervals or triggering of packet processing operations at intervals of 10 ms or less. The granular timer functionality of the packet processing timer of the present invention may be provided in various ways and used in operations of the packet processing operations of the packet processing engine 240.

At step 320 of method 300 of the present invention, the packet processing engine 240 requests one or more of the cache manager 232, policy engine 236, encryption engine 234, and/or the multi-protocol compression engine 238 to perform an operation. In one embodiment, the packet processing engine 240 or packet processing timer 242 generates a signal or signals to one or more of the cache manager 232, policy engine 236, encryption engine 234, and/or the multi-protocol compression engine 238. The packet processing engine 240 may request or signal the operation at any point before, during, or after a packet processing operation of a network packet, or one or more packets. In one embodiment, the packet processing engine 240 makes the request upon trigger of the packet processing timer 242 or expiration of a time interval provided by the packet processing timer 242, and before performing a packet processing operation on a network packet. In another embodiment, during the course of performing one or more packet processing operations, the packet processing engine 240 makes the request. For example, during execution of an operation, such as within a function call, the packet processing engine 240 may make an application programming interface (API) call to one of the cache manager 232, policy engine 236, encryption engine 234, and/or the multi-protocol compression engine 238. In other embodiments, the packet processing engine 240 makes the request upon completion of a network packet processing operation.

At step 325, the requested operation is performed by one or more of the cache manager 232, policy engine 236, encryption engine 234, and/or the multi-protocol compression engine 238. In some embodiments, any functionality or operation provided via the kernel 204 may be requested to be executed, such as via a kernel application programming interface (API). As such, any of the functions of the device 104 may be performed in conjunction with the timing or timing intervals of packet processing via the packet processing timer 232. In some embodiments, the requested operation is performed synchronously and in conjunction with the packet processing operations of the packet processing engine 240. For example, the packet processing operations wait and continue upon a completion of, or response from, the requested operation. In other embodiments, the requested operation is performed asynchronously with the packet processing operations. For example, the packet processing engine 240 sends a request to perform the operation but does not block or wait to receive a response from the operation. As will be discussed in further detail in conjunction with method 350 of the present invention depicted in FIG. 3B, the packet processing engine 240 may request the cache manager 232 to perform any cache management function, such as checking for expiry or invalidation of objects, marking objects as invalid, or flushing invalid or expired objects.

In some embodiments, the packet processing engine 240 at step 320 sends multiple requests, such as a first request to the cache manager 232 and a second request to the encryption engine 234. In other embodiments, the packet processing engine 240, at step 320, sends a single request comprising multiple requests to be distributed by the device 104, such as via the kernel 230 to the intended component of the device 104. In one embodiment, the requests are communicated subsequent to each other. In another embodiment, requests may be dependent on the status, result, success, or completion of a previous request. For example a first request to the policy engine 236 may be used to determine a policy for processing a network packet from another device or a user associated with the network packet. Based on a policy of the policy engine 236, a second request to the cache may be made or not made depending on a result of the first request. With the cache manager 232, policy engine 236, encryption engine 234, and/or the multi-protocol compression engine 238 integrated in the kernel space 204 of the device 104 with the packet processing engine 240, there are various operations of the device 104 as described herein that may be triggered by and integrated with packet processing operations.

2. Invalidation Granularity

In another aspect, the present invention is related to and incorporates the ability to configure the expiration time of objects stored by the cache to fine granular time intervals, such as the granularity of time intervals provided by the packet processing timer. This characteristic is referred to as "invalidation granularity." As such, in one embodiment, the present invention can cache objects with expiry times down to very small intervals of time. In other embodiments, the cache manager responsive to a packet processing timer can also receive an invalidation command to invalidate an object within a very short time period of caching the object. By providing this fine granularity in expiry time, the cache of the present invention can cache and serve objects that frequently change, sometimes even many times within a second. One technique is to leverage the packet processing timer used by the device of the present invention that is able operate at time increments on the order of milliseconds to permit invalidation or expiry granularity down to 10 ms or less. Traditional caches, by contrast to the present invention, typically do not set expiry or invalidation granularity of less than one second.

Figure 3B:
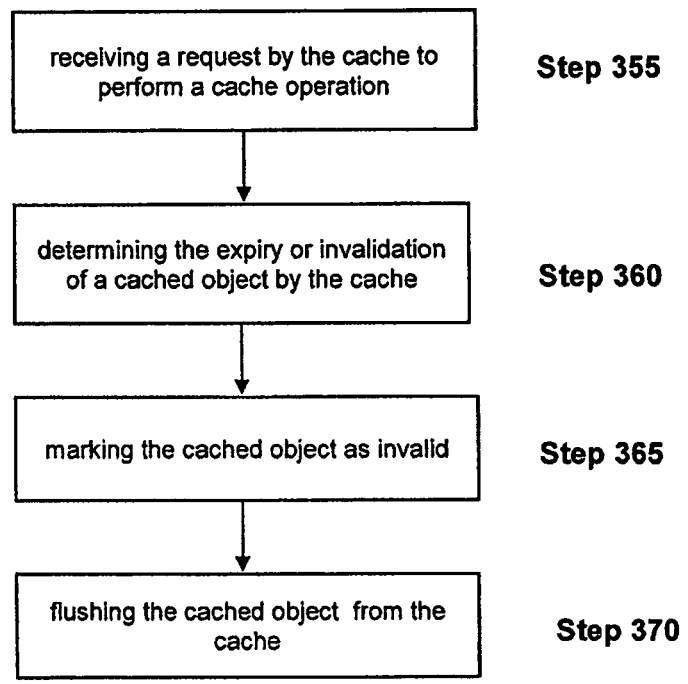
FIG. 3B is a flow diagram of steps taken in an embodiment of a method of the present invention for practicing invalidation granularity techniques in view of FIG. 3A.

Referring now to FIG. 3B, an embodiment of a method 350 of the present invention is depicted for invalidating or expiring a cached object responsive to the packet processing timer 242 and/or packet processing engine 240. As such, in some embodiments of the present invention, cached objects can be invalidated or expired in the order of milliseconds, such as 10 ms or less. In overview, at step 355 of method 350, the cache manager 232 receives a signal or request to perform an operation via the packet processing engine 240 in response to the packet processing timer 242. At step 360, the cache manager 232 determines if a cached object, such as a dynamically generated object, is invalid or expired. At step 365, if the object is invalid, the cache manager 232 marks the object as invalid, and at step 370, flushes the invalid object from the cache manager 232.

In further detail of step 355, in some embodiments, the cache manager 232 may be signaled or requested to perform a cache related operation at any point of time during network packet processing. In one embodiment, at step 355, the cache manager 232 receives an operation request prior to the processing of a network packet received or to be transmitted by the device 104. In another embodiment, the cache manager 232 receives an operation request upon the completion of processing of a network packet. For example, the packet processing engine 240 completes processing of a network packet, and before either waiting for the next time interval of the timer 242 or before processing the next packet, requests the cache to perform an operation. In other embodiments, during an operation of packet processing, the packet processing engine 240 communicates an operation request to the cache manager 232. In another embodiment, the cache manager 232 receives a signal, such as from the packet processing engine 240 or packet processing timer 242 to trigger the cache manager 232 to perform an operation. In some embodiments, the signal indicates to invalidate a cached object or to expire an expiry of a cached object.

In some embodiments, the cache manager 232 may receive a request to perform a cache operation from an entity external to the cache manager 232, such as a request to invalidate an object communicated by a server 106a-106n, and processed by the packet processing engine 240. In one embodiment, the cache manager 232 may receive an invalidation request within 10 ms or less of caching the object, while in another embodiment, as short as 5 ms, 2 ms or 1 ms. In other embodiments, the cache manager 232 may perform a cache operation responsive to the operations or functionality of the cache manager 232, such as the expiration of a timer to cause an object to be invalidated or during the processing of any cache command. In other embodiments, the cache manager 232 uses the packet processing timer 242 of the device 104 to trigger cache operations. For example, the timer 242 may trigger or signal the cache to check for invalidation or expiry of a cached object at any time interval capable of being set by the timer 242. In one embodiment, the timer 242 may be set to trigger or signal the cache within 10 ms or less of being set, or in another embodiment, as short as 5 ms, 2 ms, or 1 ms of being set. In some embodiments, the originating server 106a-106n may set the expiry time of the object. In other embodiments, the appliance 104 or client 102a-102n may set the expiry time of the object.

At step 360, the cache manager 232 determines the invalidation or expiry of an object stored in cache. In some embodiments, an object in cache is invalidated based on the expiration of a timer. In one embodiment, the cache manager 232 may issue an invalidation command on an object based on the expiration of a timer. In another embodiment, the object stored in cache is automatically invalidated by the cache manager 232 responsive to the expiration of a timer, such as a timer set with the packet processing timer 242. In some embodiments, responsive to the packet processing timer 242, the cache manager 232 checks for the expiration of any timers for cached objects. In one embodiment, the cache manager 232 determines an object timer has expired, while in another embodiment, the cache manager 232 determines the object timer has not expired. In a further embodiment, the cache manager 232 responsive to a second trigger or second timer interval of the packer processing timer 242 will check a second time if a previously checked object timer has expired.

In some embodiments, the cache manager 232 parses, interprets, accesses, reads or otherwise processes an invalidation command or request to identify the object to invalidate in the cache. In one embodiment, an entity external to the cache manager 232 issues an invalidation command to the cache manager 232 to invalidate the object. In another embodiment, the external entity may issue the invalidation command responsive to a packet processing timer 242. If the object is valid and/or has not been invalidated, the cache manager 232 invalidates the object responsive to the request. In some embodiments, the invalidation request processed by the cache manager 232 is responsive to the packet processing operations of the packet processing engine 240 processing the request, which in turn may also be responsive to the packet processing timer 242.

At step 365, the cache manager 232 marks the object as invalid. The cache manager 232 may mark each object as invalid in any suitable or desired manner. In one embodiment, an object is marked as invalid by setting a flag, attribute, or property of the stored object. For example, a flag may be set to any value identifying to the cache manager 232 the object is invalid. In another embodiment, an object may be marked as invalid by moving the object to an area or portion of the cache for storing invalid objects. In other embodiments, the cache manager 232 may identify or track the invalid and/or valid state of a stored object by a database or a linked list or any type and form of data structure. In some embodiments, the cache manager 232 uses one or more objects to identify or track the validity or invalidity of one or more objects stored in cache. In another embodiment, the object is marked as invalid by changing, modifying or altering the stored object, for example deleting or removing a portion of the object so that is may not be used, or by changing or mangling the name of the object.

At step 370, the cache manager 232, in some embodiments, flushes from the cache those objects marked as invalid. In another embodiment, the cache manager 232 flushes the invalid object from cache upon request for the object, such as by a client 102a-102n. In some embodiments, the cache manager 232 overwrites the invalid object with an updated copy or version of the object received after invalidation or expiration of the object. In another embodiment, the cache manager 232 reuses the cache memory occupied by the invalid object by storing another to the same portion of cache memory. In yet another embodiment, the cache manager 232 does not flush the object marked as invalid but keeps the object stored in memory or storage of the cache.

Although method 350 describes invalidation and flushing of cached objects responsive to a packet processing timer and/or in conjunction with packet processing operations to provide invalidation granularity, any operation of the cache and any techniques of cache management as well as any other operation of the device 104 described herein may be executed at fine granular time intervals provided by the packet processing timer. In some embodiments, the invalidation or expiration of cached objects can occur as short as a 100 ms time interval, while in another embodiment, as short as a 50 ms time interval. In some embodiments, the invalidation or expiration of cached objects can occur as short as 25 ms time interval, and in other embodiments, as short as a 10 ms time interval. While in other embodiments, the invalidation or expiration of cached objects can occur as short as a 5 ms time interval, and still yet in further embodiments, as short as a 3, 2, or 1 ms time interval.

By incorporating the capacity to invalidate objects after the elapse of very small increments of time as described in methods 300 and 350 in conjunction with FIGS. 3A and 3B above, improved caching of dynamically generated content is enabled. Some dynamic content is in fact amenable to being stored and served from a cache for very short periods of time. To successfully cache such content, however, an approach in accordance with an embodiment of the present invention provides caching objects for very short periods of time before the object is invalidated and flushed from the cache memory. For example, certain dynamically generated objects may be cacheable for as long as 1 second but anything longer is frequently unacceptable for content that is constantly changing. In an embodiment, the approach of the present invention included invalidating or expiring cached content after small fractions of a second. As an example, if an application 100 takes milliseconds to generate a dynamic response, then the cache can store and serve that response for a duration of less than or equal to the period of 100 milliseconds, without compromising the freshness of the data. There will not be a new object generated during that 100 millisecond period because it is shorter than the time it takes to generate a new object. The appliance 104 can thus be set up to serve the prior object during that duration. The ability of the appliance 104 to invalidate down to very small increments of time is frequently very useful for application environments where the database transaction isolation level is set to allow Repeatable Reads or Serialized Reads.

3. Invalidation Commands

Traditional caching technology invalidates stored content based on a pre-defined expiry time for the content, which is typically configured either by the administrator or is received from the server that served the object. Described below is another technique of the present invention for invalidating content in order to more efficiently cache dynamically generated content. The technique of the present invention includes the ability to receive at the appliance 104 an invalidation command that identifies one or more of the previously stored objects in the cache as invalid in real time. For example, the invalidation command may be communicated via a network packet transmitted to the client or an application programming interface (API) call made by a server to the appliance. This differs from the traditional approach by which the server simply sets a cache expiry time that it includes in the object header at the time the object is served.

Figure 4A:
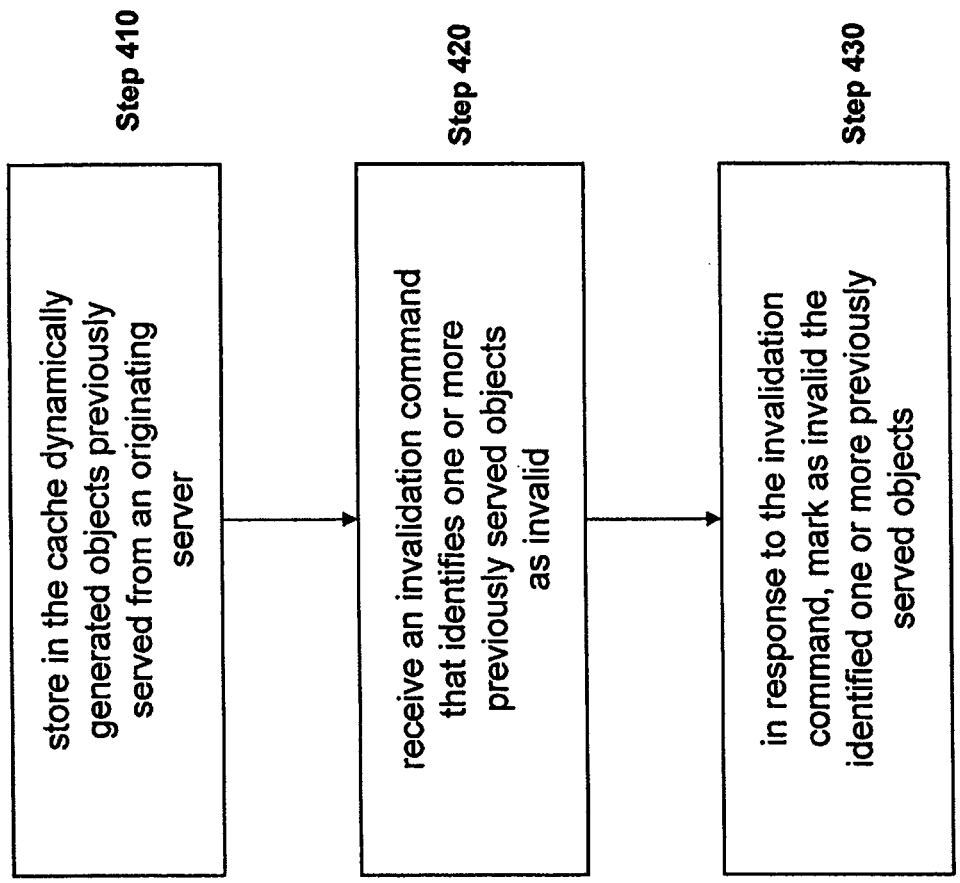
FIG. 4A is a flow diagram of steps taken in an embodiment of a method of the present invention using invalidation commands to invalidate stale objects.
Figure 4B:
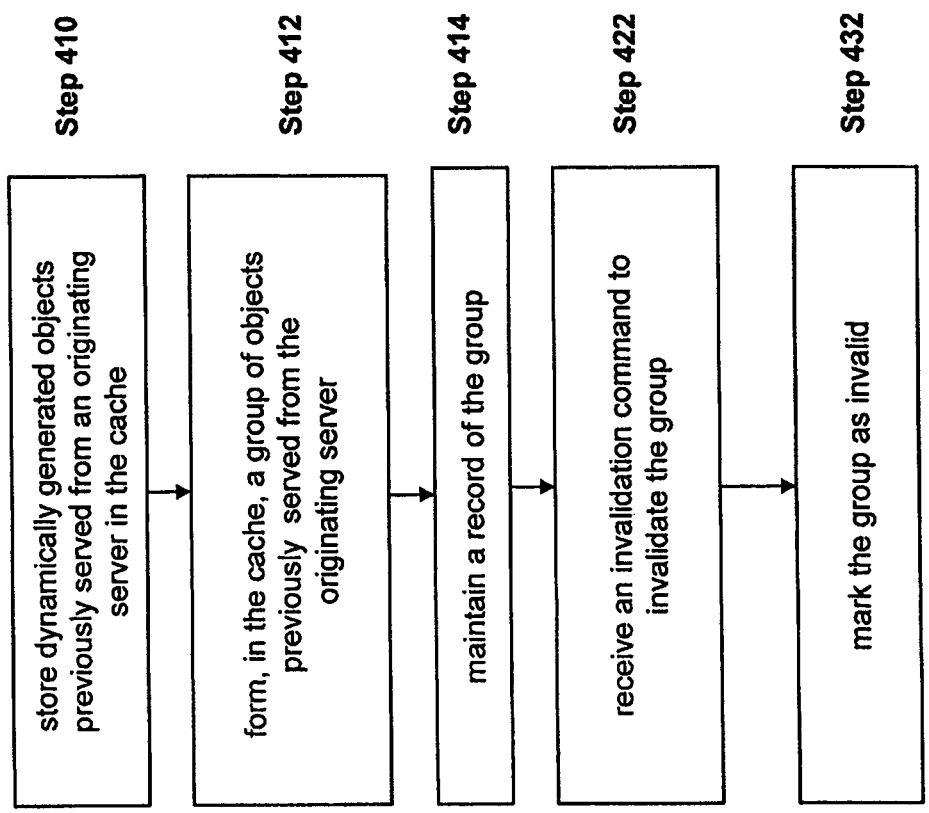
FIG. 4B is a flow diagram of steps taken in an embodiment of a method of the present invention incorporating invalidation of groups of objects.

The technique of the present invention is more specifically illustrated in FIGS. 4A and 4B. FIG. 4A is a flow chart illustrating a method for maintaining a cache, such as a computer memory cache. In brief overview and according to step 410, dynamically generated objects previously served from an originating server 106a-106n are stored in the cache. For example, the dynamically generated object may not be identified as cacheable or otherwise include any cache or cache control information. At step 420, an invalidation command is received at the cache or cache manager 232. The invalidation command identifies one or more previously served objects as invalid. As step 430, in response to the invalidation command, the cache or cache manager 232 marks the identified object as invalid.

In further detail at step 410, the cache manager 232 stores in a cache memory element a dynamically generated object received, obtained or communicate from any source. In some embodiments, the dynamically generated object may be generated and served from a server 106a-106n. In other embodiments, the dynamically generated object may be generated and communicated by a client 102a-102n. In some embodiments, another portion, component or process of the appliance 104 generates the object and stores the object in the cache. In further embodiments, the dynamically generated object may be generated by another appliance 104 or another computing device on the network and transmitted or communicated to the appliance 104. In some embodiments, the dynamically generated object is not identified as cacheable or identified as non-cacheable. In other embodiments, the dynamically generated object is identified as cacheable or is under cache control.

At step 420, the cache manager 232 receives an invalidation command identifying an object to invalidate, such a dynamically generated object stored in the cache. In one embodiment, the invalidation command may comprise any type of directive or instruction indicating to the cache that an object in invalid or otherwise may be stale. In some embodiments, the invalidation command identifies the object and may also identify the time at which the object is invalid as well as what portions of the object may be invalid. In one embodiment, the cache manager 232 provides an application programming interface (API) that may be called remotely by an originating server 106a-106n. In some embodiments, the cache manager 232 may provide any type and form of protocol for receiving commands and replying to commands via one or more network packets. In one embodiment, the cache manager 232 or device 104 provides an Extensible Markup Language (XML) API interface for receiving and processing invalidation commands. For example, the cache manager 232 may provide a web service interface. In some embodiments, the cache manager 232 replies to the invalidation command by sending an acknowledgement, status or other response to the originating server 106a-106n. In other embodiments, the cache manager 232 does not reply to the invalidation command. In one embodiment, an object is marked as invalid if an application running in an originating server 106a-106n performed an action that made the stored object stale, such as by generated a new or updated version of the object. This could occur, for example, when news editors make changes to a fast developing news story and therefore want to be assured the most recent version of the story is being served to clients.

Invalidation commands may be issued from an originating server by the application that generated the object, by another server 106a-106n or another appliance 104. In one embodiment, the originating server 106a-106n issues or communicates an invalidation command to the cache 232 automatically in response to a change to the dynamically generated object on the originating server 106a-106n. The invalidation command can also be generated by an administrative control outside or external to the server 106a-106n and the appliance 104. For example, the administrative control may be any type and form of program or application running on the network and in communication with the appliance 104, such as administrator console. Furthermore, a client 102a-102n could issue or communicate an invalidation command to the appliance 104 or cache manager 232. For example if the client were to take action that the client 102a-102n recognizes would cause a change to the requested objects at the originating server, the client may communicate the invalidation command. Any object stored in the cache can be invalidated by the transmission to the cache of a user command executed locally at the cache or invoked remotely using the XML API infrastructure.

According to step 430, an object stored in cache, e.g., a previously served dynamically generated object, that has been identified as invalid is marked as such in response to the invalidation command. An invalid object will not be provided to a requesting client from the cache, but instead would be served directly from the originating server. The cache manager 232 may mark each object as invalid in any suitable or desired manner. In one embodiment, an object is marked as invalid by setting a flag, attribute, or property of the stored object. For example, a flag may be set to any value identifying to the cache manager 232 the object is invalid. In another embodiment, an object may be marked as invalid by moving the object to an area or portion of the cache for storing invalid objects. In other embodiments, the cache manager 232 may identify or track the invalid and/or valid state of a stored object by a database or a linked list or any type and form of data structure. In some embodiments, the cache manager 232 uses one or more objects to identify or track the validity or invalidity of one or more objects stored in cache. In another embodiment, the object is marked as invalid by changing, modifying or altering the stored object, for example deleting or removing a portion of the object so that is may not be used, or by changing or mangling the name of the object.

In some embodiments, the appliance 104 subsequently flushes from the cache those objects marked as invalid. In another embodiment, the appliance 104 flushes the invalid object from cache upon request for the object, such as by a client 102a-102n. In some embodiments, the appliance 104 overwrites the invalid object with an updated copy or version of the object. In another embodiment, the appliance 104 reuses the cache memory occupied by the invalid object by storing another dynamically generated object to the same portion of cache memory.

With the command invalidation API of the cache manager 232 of the present invention, any computing device or user in communication with the appliance 104 may request to invalidate an object, such as a dynamically generated object, stored in the cache. As such, the invalidation of objects stored in cache can be controlled real-time instead of using pre-determined configuration expiry or invalidation time periods. Thus, using these techniques the longevity of the cached objects can be controlled from external application processing nodes such as databases or originating application servers. For example, the appliance 104 can be configured to work with a database such that a change to the database automatically triggers an invalidation command from the database (or application) to the appliance 104 to flush a particular object or objects.

4. Invalidation of Groups Using Invalidation Command

In a further embodiment of the present invention, the appliance 104 identifies and invalidates at the same time a group of objects stored by the cache. Objects stored in a traditional cache memory are each treated individually and separately by the cache in determining whether the object is stale. As each object reaches its specified expiry time (generally as set by the server and stored by the cache in a table) that item is flushed from cache memory. This traditional approach is inefficient and ultimately insufficient, however, to successfully handle the challenges that arise in attempting to cache dynamically generated content.

FIG. 4B illustrates another embodiment of a method of the present invention for maintaining a cache, such as a computer memory cache, wherein the appliance 104 has the ability to create, store, and invalidate groups of related objects that have been previously served from an originating server 106a-106n. In brief overview, at step 410, an object, such as a dynamically generated object served from an originating server 106a-106n is stored in the cache. At step 412, the cache manager 232 forms a group of previously served objects stored in the cache. In one embodiment, the group may be associated with or identified by one or more object determinants as will be described in further detail below. At step 414, the cache manager 232 maintains a record of the group of objects. At step 422, the cache manager 232 receives an invalidation command to invalidate the group of objects. At step 432, the cache manager 232 marks the group of objects as invalid in response to the invalidation command.

Step 410 is the same as in FIG. 4A, wherein an object is stored in the cache of the appliance 104, such as dynamically generated objects previously served from an originating server 106a-106n. In some embodiments, one or more of the objects may not be identified as cacheable, or otherwise may not have any cache or cache control information. For example, the server 106a-106n may assume the dynamically generated objects will not be cached.

According to step 412, the appliance 104 forms a group out of a set of the objects previously served from the originating server 106a-106n and stored in the cache. Any suitable or desired set of objects may be associated with each other to form a group. For example, any dynamically generated objects generated for, or associated with, serving a web page may form a group. In some embodiments, an object may be associated with multiple groups. In other embodiments, one group of objects may form a subset of another groups of objects. In some embodiments, the formed group of objects have objects served from the same server 106a-106n, while in other embodiments, the formed group of objects have objects served from different servers 106a-106n. In further embodiments, the formed group of objects may comprise objects from a client 102a-102n, objects from a server 106a-106n, or objects generated by or served from both clients 102a-102n and servers 106a-106n. In one embodiment, one object in the group is static while another object in the group is dynamically generated. In some cases, one object in the group is not identified as cacheable while another object in the group is identified as cacheable. In other cases, the objects in the group may be logically related in accordance with functionality or application provided by a server 106a-106n. In another case, the objects in the group may be related as associated with the same client 102a-102n or the same user.

In step 414, a record of the group of objects is maintained. Various techniques for recording and maintaining a record of a group of objects, or otherwise associating objects, may be used in practicing the operations of the present invention described herein. In one embodiment, the record may be maintained directly in, for example, a look-up table. In another embodiments, the records could be represented in a hash-table format. In some embodiments, the cache manager 232 maintains the association of objects in a database, or a data structure or object in memory. In further embodiments, a flag, property or attribute of each object in the group is assigned or set to a value identifying the group, such as a value equal to, identifying, or referencing the name or identifier of the group, such as a group's object determinant that will be described in more detail below. In some embodiments, a group of objects is arranged, placed or located in a portion of cache memory identified as holding the group In step 422, an invalidation command is received at the appliance 104 or cache manager 232. According to the embodiment described in FIG. 4B, the invalidation command identifies that one or more objects are invalid, or otherwise are stale. In some embodiments, the invalidation command references, identifies or specifies a name or identifier of the group of objects. In one embodiment, the invalidation command comprises a single invalidation request to invalidate all the objects in the group. In another embodiment, the invalidation command identifies one object in the group to invalidate. In other embodiments, the invalidation command comprises a plurality of invalidation request to invalidate a plurality of objects in the group According to step 432, the group of previously served objects is marked as invalid if the invalidation command references, identifies, or specifies an object of the group as invalid, each object in the group as invalid, or the group as invalid. In some embodiments, if the invalidation command identifies an object in the group as invalid, the cache manager 232 marks the object as invalid. In other embodiments, if the invalidation command identifies an object in the group as invalid, the cache manager 232 marks the group of objects as invalid or each object in the group as invalid. In yet further embodiments, the cache manager 232 may only invalidate the group of objects when a plurality of objects are identified as invalid via one or more invalidation commands. In another embodiment, the invalidation command may specify a name or identifier of the group, and the cache manager 232 marks the group as invalid, or each object in the group as invalid.

In one embodiment, the appliance 104 or cache manager 232 flushes from the cache memory a group of objects that has been marked as invalid. In some embodiments, the objects in the group may be flushed from cache memory only when each object in the group is marked as invalid. In other embodiments, if one object of the group has been marked as invalid then the entire group is flushed. In another embodiment, the group of objects, or any object in the group, marked as invalid may be flushed upon receipt of a request for the group of objects, or any object in group, by a client 102a-102n. In other embodiments, the group of objects, or any object in the group, marked as invalid may be flushed upon receipt of a response from a server 106a-106n provide one or more new objects in the group.

An example of the above described embodiments follows. Customer resource management ("CRM") applications are used by many businesses to track and evaluate all aspects of resource management. Often, CRM applications are implemented and accessed over private and public networks including the Internet. These applications, which provide access to large amounts of data that is frequently being accessed, thus benefit from caching the data generated by such applications. For example, sales reports are frequently generated and served to remotely connected users. These sales reports are built by the relevant application through compiling data from sales information that is posted to such application servers and/or their underlying databases. As many users request the same document (i.e., a certain sales report), without caching, the application server must re-generate the object for each request. If, however, such objects can be stored in the cache, then application and database processing is conserved, including potentially valuable bandwidth, as the cache is placed closer to the requesting clients.

The challenge for caching such objects arises because each time a new sale is posted to the application running at the originating server (or to its underlying database), the information in the sales report needs to be updated. As a result, all sales reports that may have been stored in any caches supporting these application servers must be invalidated and the content flushed out of cache memory. The traditional approach to caching, however, has no way of accurately determining when the change to the underlying database or application is going to occur and therefore cannot reasonably evaluate the freshness of dynamic content. Every time a change occurs in database or application or originating server, the cache has to be able to identify that the change has been made, and which group of objects should be invalidated as a consequence of such change. Generation of invalidation commands that contain object determinants linked to groups of previously served objects, as described above, can meet this need.

Multiple groups of related objects may be formed at a single hierarchical level. Alternatively, sub-groups of objects may be formed to create multiple hierarchical levels. In an embodiment, the groups or sub-groups of objects may be pre-designated by a user. In another embodiment, a user may establish rules by which the appliance 104 automatically forms groups of related objects, and associates object determinants therewith.

5. Identification of Object Determinants in a Client Request or Response

An embodiment of the present invention also addresses the need to be able to identify all objects affected by a state change at the originating application server 106a-106n (and/or underlying database) by generating groupings of objects and implementing parameterized invalidation. In this embodiment, any object or pre-defined group of objects can be invalidated by an intercepted HTTP request, for example from a client, that the cache parses in order to identify an object determinant. The term "object determinant" refers to any information, data, data structure, parameter, value, data pattern, request, reply, or command that references, identifies or specifies one object or a set of objects, uniquely or otherwise. In some embodiments, an object determination is a pattern of bytes or characters in a communication that may be associated with an object or used to uniquely identify that the communication is associated with, or referencing, the object. In one embodiment, an object determinant indicates whether change has occurred or will occur, in the originating server, to a group of previously served objects stored in the cache manager 232 with which the object determinant is associated. In some embodiments, the objects in a group of objects are related in that they are associated with at least one object determinant. Specific, non-limiting examples of object determinants and further illustrations of their use are described more fully below.

In some embodiments of the present embodiment, object determinants are certain pre-defined parameters or data structures included or embedded in a client request or response. In other embodiments, the client 102a-102n, server 106a-106n or appliance 104 embeds in a communication one or more object determinants, such as pre-defined strings or sets of characters representing the object determinant. The object determinants indicate whether such request will have the effect of causing a change in the state of objects stored in the originating server 106a-106n or databases linked thereto. In one embodiment, the existence of the object determinant in a request indicates a change has or will occur to an object. In another embodiment, the syntax, structure, parameter, or value of the object determinant indicates a change has or will occur to an object. In an embodiment, the cache receives an object request from a client 102a-102n. The request may include certain parameters or values (object determinants) that the cache recognizes will change the state of the originating server or application server which will, as a consequence, make stale certain related objects stored by the cache manager 232 that had been previously generated by such originating server or application server 106a-106n. Depending on the invalidation policy set by the user, the parameters (object determinants) may require invalidation of one or more previously served objects or group of objects, by the originating server, that have been stored by the cache. The cache is configured to identify the relevant objects that will be effected by this state change (i.e., those objects or groups of objects linked to the object determinant), and invalidate these objects via the method marking each of the objects as invalid and/or flushing such objects from the cache memory.

Figure 4C:
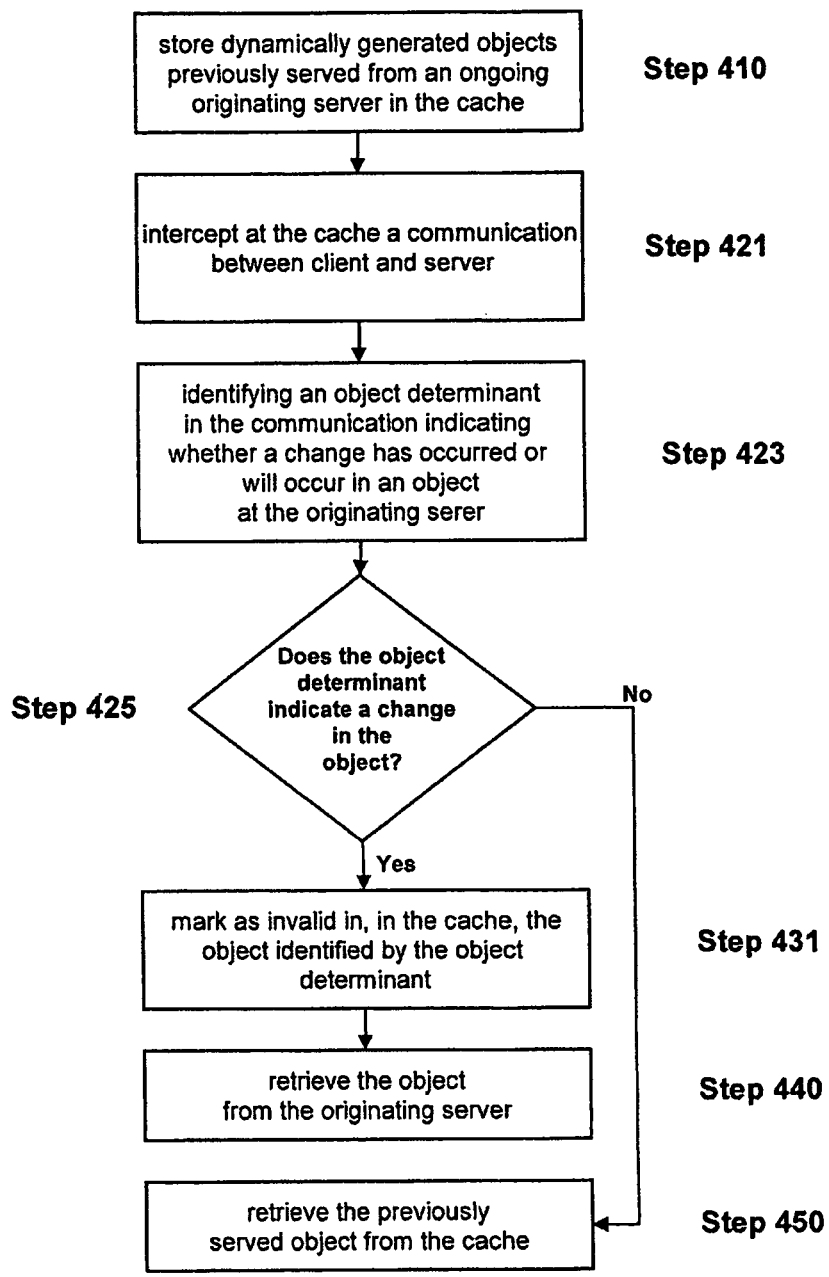
FIG. 4C is a flow diagram of steps taken in an embodiment of a method of the present invention wherein a client request is parsed for object determinants.

The above described technique is illustrated in FIG. 4C. As with other embodiments described herein, step 410 comprises storing, in the cache, objects, such as dynamically generated objects previously served from an originating server. The objects could be generated by an application running on the originating server 106a-106n, or could be drawn, for example, from a database accessed by the originating server 106a-106n. In some embodiments, the dynamically generated objects are identified as not cacheable or otherwise not identified as cacheable.

According to step 421, the cache intercepts or otherwise receives a communication between the client and the server, such as a request from a client or a response from a server. In some embodiment, the request is for a specified object, the object having been previously served and stored in the cache. In another embodiment, the communication includes a response from a server having a requested object. In one embodiment, such receipt or interception occurs according to established caching protocol and communications standards. Although the cache manager 232 or appliance 104 may be generally described as receiving a request, response or communication, in receiving such request, response or communication, the cache 232 or appliance 104 may intercept or obtain by any suitable means and/or mechanisms the request, response or communication even though not communicated directly or explicitly to the cache.

In step 423, an object determinant is identified in the intercepted communication. The cache manager 232 may extract, interpret, parse, access, read, or otherwise process the intercepted communication to determine or identify one or more objects determinants in the communications. Any parameter, value, syntax, data, structure or set of one or more characters of the communication may be used to identify an object determinant. In one embodiment, the cache manager 232 may identify the name or identifier of an object in a request from the client 102a-102n to the server 106a-106n, in which the client requests the object. In another embodiment, the cache manager 232 may identify the name or identifier of a first object in the request of the client 102a-102n or response from the server 106a-106n that indicates a change has occurred or will occur to a second object stored in the cache. In other embodiments, the cache manager 232 determines if any patterns of characters in the request match any object determinants associated with an object or group of objects in the cache. In some embodiments, an object determinant may be determined for an object not currently stored in cache. In other embodiments, an object determinant may be determined for an object currently marked as invalid. In other embodiments, an object determinant for a requested object is determined to be associated with an object determinant of a cached object. In yet another embodiment, upon the first reference, request, or response for an object in a communication, the cache manager 232 establishes the identified object determinant as the object determinant for the object.

By receiving and parsing the communication, such as a client request or server response, to identify an object determinant, the cache manager 232 or appliance 104 may effectively determine whether to mark as invalid a cached object that has been associated with the identified object determinant. Thus, according to step 425, a determination is made as to whether the object determinant indicates a change to the cached object. In some embodiments, the identified object determinant may be part of a communication that does not alter, modify or generate an object. In other embodiments, the identified object determinant is a part of a communication that indicates a change has occurred or will occur to the object associated with the object determinant. For example, the communication may be a get request for a dynamically generated object or a submit request that will change the data used for one or more dynamically generated objects. In some embodiments, the existence of the object determinant in the communication indicates a change has or will occur on one or more objects. In another embodiment, the type or name of a command, directive or instruction in the communication along with the object determinant indicates a change has or will occur on one or more objects. In yet a further embodiment, the existence, value or setting of a parameter or variable of a command, directive or instruction indicates a change has or will occur on one or more objects associated with an object determinant.

In other embodiments, the cache manager 232 performs a hash function, algorithm, or operation on the intercepted communication or object determinant to determine if a change has occurred in the object. In some embodiments, the hash value is compared with a previous stored hash value for the object and if different then the cache manager 232 recognizes the object has changed. In yet another embodiment, a hash value for the object may be included in the communication or object determinant. In one embodiment, the communication indicates the object has changed by the value or setting of a parameter, such as with a Boolean flag. In other embodiments, an entity tag control and validation mechanism as will be described in more detail below may be used to identify the object and determine if the object has changed.

If a change is indicated, then at step 431, then the object associated with or identified by the object determinant is marked as invalid. In some embodiments, an object requested by the intercepted communication is marked as invalid in accordance with step 431, and retrieved from the originating server 106a-106n in accordance with step 440. Otherwise, in other embodiments, the requested object is retrieved from the cache in accordance with step 450. In one embodiment, any object marked as invalid will be flushed from the cache.

6. Invalidation of Groups of Objects Based on Object Determinants

The above embodiment of the present invention describes the case of invalidating a previously served object in the cache manager 232 based on identification of an object determinant in the client request. This general concept may also be used, in another embodiment, to identify and invalidate a group of objects with which one or more object determinants have been associated. This embodiment is illustrated in FIG. 4D.

Figure 4D:
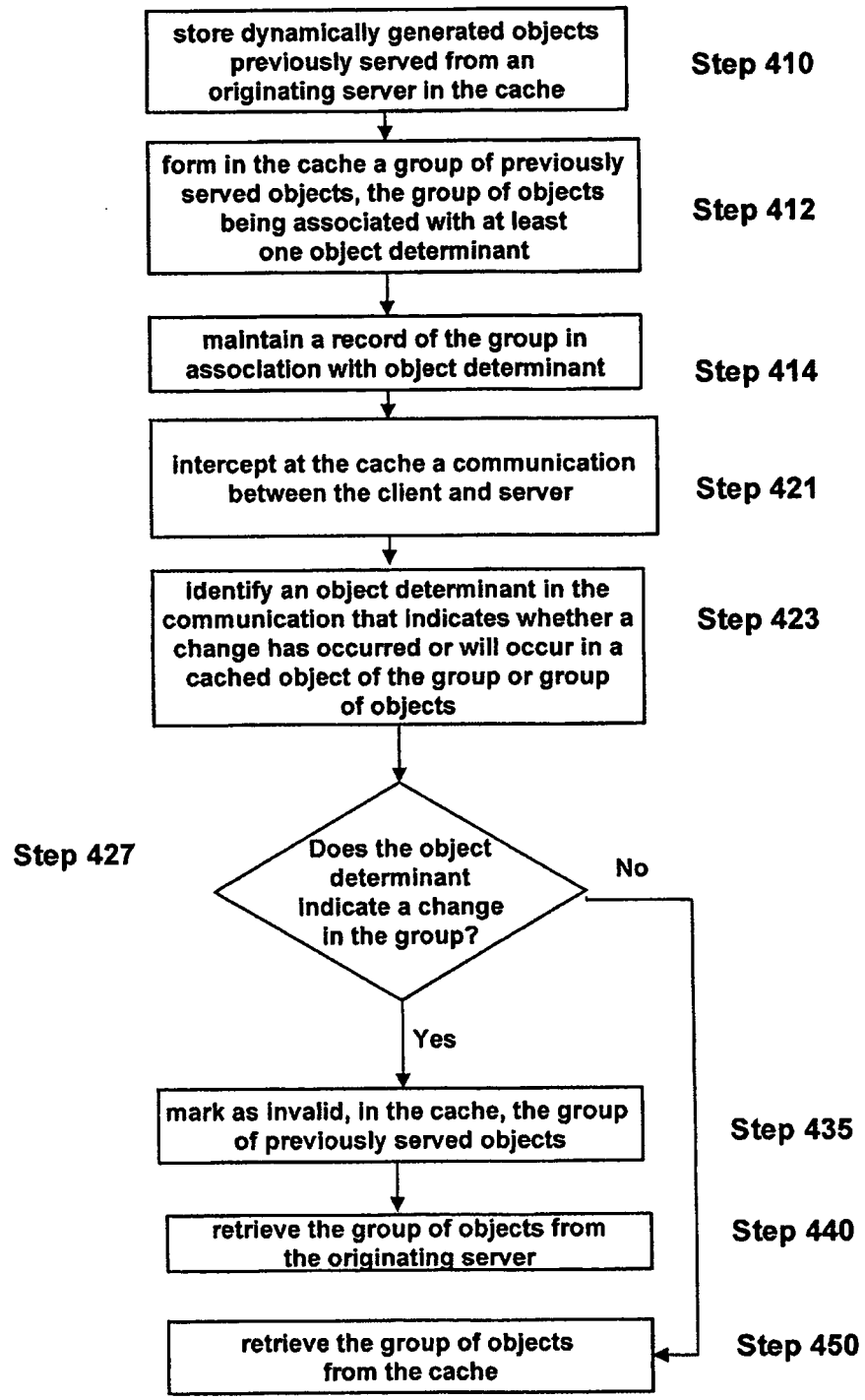
FIG. 4D is a flow diagram of steps taken in an embodiment of a method of the present invention incorporating invalidation of groups of objects using object determinants.

The method described in FIG. 4D begins in the same fashion as the method of FIG. 4C. Step 410 comprises storing, in the cache, objects, such as dynamically generated objects previously served from an originating server. In some embodiments, one or more of the objects are not identified as cacheable. According to step 412 and similar to FIG. 4B, previously served objects are formed into groups. In one embodiment and in accordance with the object determinant technique of the present invention, a group of objects is associated with or identified by at least one object determinant. As described more fully below, in some embodiments, the association of groups with object determinants depends on the nature and details of the users caching policy, such as a policy defined, controlled or used by the policy engine 236. In other embodiment, the one or more object determinant of the group comprises the one or more object determinants of the objects in the group. In another embodiment, the object determinant of the group comprises a combination of object determinants of objects in the group.

According to step 414, a record is maintained of the group, along with its associated object determinants, if applicable. This step is similar to step 414, illustrated in FIG. 4B. In one embodiment, the record and/or any object determinants of the group is maintained in a look-up table. In other embodiments, the record and/or any object determinants of the group may be maintained in a hash-table format. The hash-table may be designed to efficiently store non-contiguous keys that may have wide gaps in their alphabetic and numeric sequences. In another embodiment, an indexing system can be built on top of a hash-table. In some embodiments, the cache manager 232 maintains the association of objects as a group with one or more object determinants in a database, or a data structure or object in memory. In further embodiments, a flag, property or attribute of each object in the group is assigned or set to a value identifying the group, such as a value equal to, identifying, or referencing the name or identifier of the group, or a group's object determinant. In some embodiments, a group of objects is arranged, placed or located in a portion of cache memory identified as holding the group. In another embodiment, the one or more object determinants are stored in association with the group of objects.

Steps 421 and 423 are similar to steps 421 and 423 as illustrated in FIG. 4C. According to step 421, the cache manager 232 or appliance 104 intercepts or otherwise receives a communication between the client 102a-102n and server 106a-106n, such as a request from a client for an object previously served and stored in the cache. In one embodiment, the cache manager 232 intercepts a request from the client 102a-102n to the server 106a-106n. In some embodiments, the request is for an object stored in cache. In other embodiments, the request is an instruction, command or directive to the server 106a-106n that will cause a change to an object stored in cache, such as to cause an object to be dynamically generated. In another embodiment, the cache manager 232 intercepts a response from a server 106a-106n to the client 102a-102n comprising or identifying an object stored in cache.

In step 423, an object determinant is identified in the intercepted communication. As noted above, the object determinant indicates whether a change has occurred or will occur in the requested object, at the originating server 106a-106n. However, in the embodiment of FIG. 4D, the object determinant may be associated with a group of objects. This enables efficient invalidation of all objects stored in the cache that may be affected by a particular object determinant. In some embodiments, an object determinant of an object in the group is identified. In other embodiments, an object determinant, for example, a group object determinant, for the group of objects is identified. In another embodiment, a combination of object determinants of one or more objects in the group are identified.

Thus, according to step 427, a determination is made as to whether the object determinant indicates a change in the group of previously served objects. In some embodiments, the existence of the object determinant of the group in the intercepted communication indicates a change has occurred or will occur to one or more, or all of the objects in the group. In other embodiments, the name and type of a command, directive or instruction in the intercepted communication indicates such changes. In yet another embodiment, the existence, value or setting of any parameters or variables in the communication may also indicate such changes.

If at step 427, the object determinant indicates a change in the group, then the group of previously served objects is marked as invalid in the cache in accordance with step 435. In some embodiments, one or more, or all of the objects of the group are requested and retrieved from the originating server 106a-106n in accordance with step 440. If at step 427, the object determinant does not indicate a change in the group, then in some embodiments, any objects requested as part of intercepted communication and previously served and stored in the cache is retrieved from the cache manager 232 in accordance with step 450. In an embodiment, any object or group of objects marked as invalid may be flushed by the cache manager 232 from the cache.

7. Designation of Groups

The cache administrator may specifically designate which objects get included into a particular group. Whenever an object is stored in the cache, the administrator may make that object a member of one of the configured or implicit groups depending on the configuration. The configured groups can be based on configurations that an administrator has previously established or alternatively based on application behavior and other data related to object invalidation. An object may also be part of an implicit group if its configured group is dynamic. Objects in the implicit group are grouped by the value of the significant invalidation parameters.

By permitting very flexible grouping of objects, a cache can achieve a level of flexibility and coordination in invalidation that is necessary to effectively cache dynamically generated content. The cache can invalidate a very specific group of objects simultaneously, thereby making the cache more responsive to the frequent need to invalidate dynamically generated content. At the time the cache assigns an object to a group, the group determines a number of things relative to that object, including the invalidation parameters and the hit determinants, in order to associate one or more object determinants therewith.

In the customer resource management ("CRM") example, the cache administrator may pre-designate each of the groupings. For example, the administrator configures the cache to group each of the sales departments by name. Thus the administrator can designate an auto department, a motorcycle department, etc., and each time an object determinant is recognized in a request coming to the cache, the cache can then invalidate all objects stored in a designated group linked to an appropriate department via the object determinant.

8. Ruled-Based Grouping

Alternatively, the cache administrator may establish rules that allow the cache appliance to determine on the run which objects to include in a particular group or groups. Such rules-based groupings may rely on the designation of groups by virtue of established rules that link the object to significant object determinants that the cache utilizes to create the relevant groups. An example of this approach may involve configuring the cache with rules that the cache uses to recognize what objects to put in each group.

Again turning to the CRM example, a rule may state that each subdivision of the Sales Department that is set up on the application should be recognized by the cache as its own grouping. In this way the groupings can be created without the cache administrator having to specifically identify each grouping but allows the cache to determine based on the relevant rules. This technique creates a more flexible and often less work intensive way to designate groupings. The cache administrator could configure a rule that states that every subdivision department of Sales (i.e., sales/auto, sales/motorcycle etc.) should generated a new grouping by the cache. As a request from the Auto Sales Department is processed and returned by the application via the cache, the cache can recognize each subgrouping of sales and automatically create a grouping for it, based on the pre-configured rule.

The rule may be implemented by the cache each time it sees a new request for an object of the type report/sales/auto or report/sales/motorcycle, etc. This process can then be repeated when a Motorcycle Sales Department request showing that it is a sub-grouping of the Sales Department, then the Bicycle Sales Department and so forth, as the cache recognizes these subgroups and establishes an object grouping for each of them. When a known invalidation request comes to the cache linked to one of these groupings, or if a relevant object determinant is identified in a client request (for example a post of a sales report to the Motorcycle Sales Department sales/motorcycle found in the parsing the request), the cache knows to invalidate all the cached objects in the Motorcycle Sales Department Grouping.

In this way, when a cache recognizes that a change has occurred or will occur to data served by the application (either because the cache recognizes that contents of a request received by the cache will trigger a change at the application or because of the occurrence of some outside change), the above technique enables the cache to quickly and simply identify which objects require invalidation through the process of grouping. In this way, the cache is able to invalidate large numbers of dynamically generated objects that are no longer fresh because of changes in the application or database state.

The ability of the cache to successfully store and serve out of its cache memory dynamically generated content can also be enhanced with an intelligent statistical engine that examines the pattern of request and response traffic in order to determine, over a period of time, the set of objects that would provide the most caching benefit. The engine can either be integrated into the cache appliance itself, or run in a separate computer as a heuristic to select some subset of objects for further investigation to determine suitability for dynamic caching.

9. Further Use of Object Determinants

As described above, object determinants may be any data structure that indicates whether a change has occurred or will occur, in the originating server, to the group of previously served objects stored in the cache with which the object determinant is associated. Object determinants could be set up on the basis of predefined string values embedded in the request. For example, when a request comes in with a certain USERID, the USERID can be linked to a group of objects in the cache memory that should be invalidated each time a post or other request comes from that certain USERID. Potential candidates for object determinants could also include using service identifiers of the server that originally served the object. The service identifier contains service IP address, TCP port and service identifier present in the HTTP request.

Another potential object determinant present in the request the request uniform resource locator ("URL"). In the case of caching of static objects, the request URL is typically sufficient to uniquely identify the object. For requests for dynamically generated content, however, the information present in the URL may not be sufficient to identify the cached object. The cache must therefore inspect other information in the request to find object determinants including in HTTP headers, cookie header or in other custom HTTP headers. The cache can additionally look for a subset of relevant parameter information in a variety of other places in the client request, including, without limitation: in the URL query string, in the POST body, in a cookie header, or in any other request or response headers.

The problem in parsing a URL for object determinants is that the URL and other headers may contain a lot of information in addition to what is relevant for the cache's decision. The cache must therefore be able to parse through quite a lot of information to be able to identify the appropriate object determinants. In addition, the data in the header is often arbitrarily ordered, meaning there are no standardized ways that such data is placed into the HTTP header and therefore a simple comparison is often insufficient to locate the relevant object determinants in such string.

If there is no pre-configured policy to match a particular object determinant to a relevant object or group of objects stored in cache memory, the cache may still, in another embodiment, make such a determination. For example, the cache may examine and parse various aspects of the request to discover whether any other object determinants may be found in such request and used to link such request to particular objects stored in the cache memory that should be invalidated. Alternatively, one could also enable the cache to examine a request for certain object determinants that the cache determines, based on certain pre-defined heuristics, may meaningfully linked to particular objects or group of objects. For example, when the request comes into the cache for an update of a calendar associated with a particular USERID, an embodiment of the present invention could be set up to recognize that all cached objects with USERID equal to the USERID of the request updating the calendar, and that contains the user's calendar for any one particular day, will need to be invalidated.

The cache may also assume that the object determinants are present as a group of name=value or similar pairs in a non-specified order in the URL Stem, in the queries present in the URL, in the POST body or in a Cookie header. In an embodiment, it is assumed that the query is formatted as a list of name=value pairs. The user can therefore configure which parameter names are significant. Every cached object is keyed using first its access URL. The URL may look like /site/application/special/file.ext?p1=v1&p2=v2&p3=v3. The /site/application/special/file.ext part is the URL stem. The p1=v1&p2=v2&p3=v3 part is the URL query and contains parameter-value pairs. These parameter-value pairs may also be present in the POST body or in the Cookie headers.

In an embodiment, the user or administrator establishes that p1 and p2 shall be the invalidation parameters or object determinants. The cache will thereafter automatically group objects that have matching p1 and p2 values. One way of implementing this grouping is to map p1 and p2 to primary keys in database tables, i.e., to uniquely identifiable objects in the table that the cache will know how to reference in order to determine validation status. To update something in those database tables, in order to reflect the fact that data stored in the cache is no longer valid, the cache will specify new values for p1 and p2 and when the cache recognizes such new values the next time it goes to serve such content, it will know to invalidate the linked objects stored in its memory. The cache, when it encounters such a request, on seeing the update request knows that it has to invalidate the group with matching p1 and p2 values—because the cache understands that data in the origin will change, thereby affecting all objects that are related to those p1 and p2 object determinants.

To address the more complex case where the administrator has not pre-configured specific parameters embedded in the request as object determinants, the cache can deploy user-configured policies to extract the relevant object determinants from the request to assist in identifying when to invalidate groupings of objects. The determinant string is then used to locate the group of objects stored in the cache and invalidate such objects. These object determinants can be used to configure the cache to generate lists of significant parameter values. If an incoming write-request has matching values for the significant parameters then the objects tied to those parameter names should be invalidated. Alternatively, a user could specify the policy framework action that can extract the object determinant string from the request. The object determinant string is extracted from the write-request and all objects with matching determinant strings are invalidated. In this alternative approach, a request arrives at the cache, the cache makes a determination whether the request string matches an invalidation policy. The invalidation policy specifies objects in which content group should be invalidated.

Alternatively, the cache could use any other user information that may be present in the client request. As noted above, the authentication and authorization integration allows the cache access to the user information. The USERID or the GROUPID could be one of the determinants in the event the relevant grouping of cached objects are linked to a user or a group of users. Although user information is often an important object determinant, the user information often may not be present in the HTTP request. In a further embodiment of the present invention, the dynamic caching aspects of the invention can be combined with another of Applicant's patent applications. To accomplish this, reference is made to Applicant's above referenced copending patent application Ser. No. 11/169,002 ("the Integrated Caching patent"). That application describes a system and method for integrating the cache with a variety of other networking elements including the ability to perform certain kinds of authentication, access control and audit (AAA) infrastructure. Thus, the level of security accorded to data that is generated by the applications is applied to data that is instead served from a cache. This technique allows the applications to cache sensitive, access controlled information that could not otherwise be cached.

This approach allows the cache to identify users that do not include identifiable user information in the HTTP request but that may be identifiable via the AAA approach described in the Integrated Caching patent. Such an approach enables the cache to identify the relevant user to a particular request through examining the authorization state information that can be shared from the AAA processing. In a further embodiment, the integration enables the application of security policies to information stored in the cache to prevent unauthorized users from accessing information stored at the cache.

This approach also address the challenge posed by the fact that a significant portion of dynamically generated data requires that the client requesting such data be authorized and authenticated before the cache can respond to the relevant request from the client. The cache must have the ability to authorize requests made by authenticated users so that applications can cache access-controlled objects and by integrating such dynamic caching technology with authentication and authorization information, this security can be achieved. The USERID or the GROUPID will be one of the object determinants if the objects are personalized to a user or a group of users. Thus, the level of security accorded to data that is generated by the applications is applied to cached information as well. This technique allows the applications to cache sensitive, access controlled information that could not otherwise be cached.

Finally, other information like time of day, state of the database at the origin, etc., may be parsed from the request and used as object determinants to determine whether objects stored in the cache are still valid. The cache may take care of this situation by configuring appropriate expiration behavior in groupings of objects that are configured to be sensitive to such external variables.

To further address the challenge presented by the fact that requests for dynamic content must be parsed and interpreted by the cache, the cache in accordance with an embodiment of the present invention can limit which parameters are deemed to be relevant object determinants for the cache. In this way, the success rate for serving objects from the cache rather than forwarding such requests to the applicable application server can be enhanced. By way of example, a request query from a client may contain both a city and a state parameter. However, the cache may be configured to comply with the requirements of the application for which the cache is storing content to recognize that the response can be served to requests coming from clients that the query shows come from all clients in a given state without regard to the city value. For this purpose, the city parameter is not relevant and the cache could recognize this fact. An alternate embodiment involves configuring the cache so that a response can be served from the cache if just the city parameter makes a match regardless of what is specified for the state parameter.

In summary, the cache implements generalized parameterized object matching. In this approach, the cache is configured to recognize the subset of information in the request that will be useful as object determinants, and that are linked to a particular object so that when such object determinants are recognized, the cache can utilize the presence (or conversely the absence of such determinants) in evaluating whether the object or group of objects remains fresh and capable of being served from the cache. The cache maintains a table that it consults each time a request comes in to check against the configured parameters to determine if the requested data remains fresh, and which also allows the cache to match the relevant data to the proper object stored in the cache memory.

10. Incarnation Numbers

In yet another embodiment, the cache can utilize incarnation numbers to invalidate a group of objects. Where a cache needs to change the state of each of a group of objects at one time because of a change in the state at the origin, incarnation numbers provides a simple technique for effecting this invalidation. Whereas identifying each object and changing the state individually is an inefficient approach to assuring freshness of data stored in a cache, use of incarnation numbers enables a much more simple and effective approach to invalidating groups of objects. The present embodiment describes how each object points to a data structure that represents the group and therefore the server need only send a command that changes the state in the data structure for the group. When a subsequent request for a cached object arrives from a client, the cache must first figure out whether the state has changed. To do so it looks up the data structure to reference whether the state has changed for the group.

In order to implement the data structure effectively, the cache must be able to determine whether to look up for a state change. Therefore, the cache must be able to determine whether it has already looked at the state change in the group or not. This is where the incarnation numbers are helpful. The cache associates dynamically generated objects into content groups. Each of these content groups may be represented through a hash table look-up process with a particular index value or "incarnation number" contained in a data structure. Thereafter, whenever the cache receives a client request that the cache recognizes as causing a state change, the client parses the client request for the relevant parameters, performs the hash look-up based on the recognized object determinants, and increments the index or incarnation number in the data structure. Each time an object stored within a designated grouping is requested by a client, the cache performs the hash algorithm on the object, and compares it to the original stored value in the data structure for such content group. If the stored value is the same as the number calculated by the cache for such object, then the cache knows the content remains fresh and can be served to the requester. In the event the cache detects a discrepancy between the current incarnation number calculated for such object in and the number stored for such content group in the data structure, the cache knows that the stored object is no longer fresh. The cache then invalidates the stored object and sends the request along to the application server. When the response comes back the cache appliance will store the new response in the cache memory and link such response again to the new data structure. Thereafter, each time the cache receives a request for an object in that grouping, the cache can make the comparison and assuming no further changes have been made to the data structure, the cache can serve the newly stored object.

By utilizing invalidation of a group of objects in this fashion, the cache is able to invalidate very quickly—and the time taken is constant regardless of the number of objects invalidated. Through this faster and more efficient process of invalidation, the techniques of the present invention enables the cache to more effectively handle dynamically generated objects. The approach allows cache appliances that sit in front of applications to more aggressively store and serve dynamically generated objects without serving invalid or stale content because of rapid changes in such data. The embodiment enables the cache to serve data that frequently or unpredictably changes thereby improving the performance of the cache. The cache is also able to invalidate objects and group of objects stored in the cache memory using user commands and also by examining and grouping various kinds of web traffic.

11. Flash Cache and Flash Crowds.

Another embodiment of the present invention may also include a technique that is able to increase cache hit rates for extremely fast changing dynamically generated objects that would not otherwise be cacheable. When a cache manager 232 receives a first request from a client for a particular object, the cache manager 232 forwards that request to the originating server 106a-106n for processing because, as the first such request, the cache manager 232 cannot yet have such object stored. As the response object is generated and then returned to the requesting client via the cache manager 232, the cache manager 232 automatically stores a copy of the object. With objects that change extremely quickly, traditional caches, in contrast to the present invention, just pass all responses along to the originating server 106a-106n for processing as such content is always assumed to be not fresh, and therefore not valid for cache storage.

Figure 5:
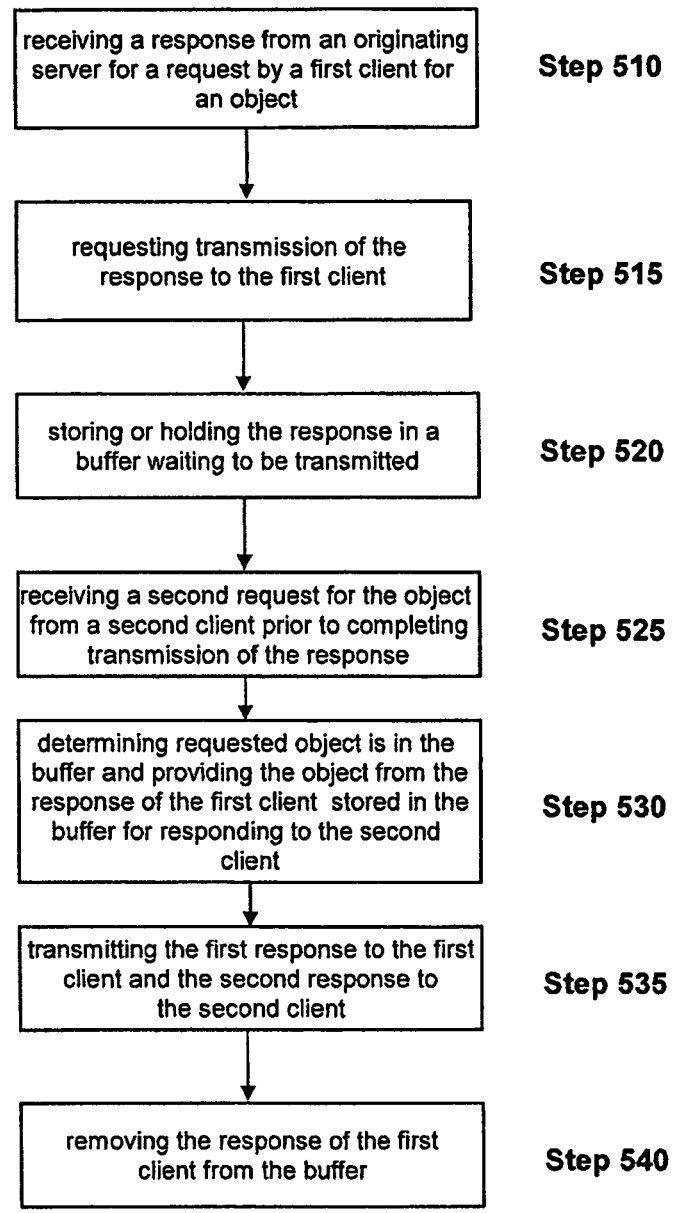
FIG. 5. is a flow diagram of steps taken in an embodiment of a method of the present invention for providing a flash cache technique.

In one aspect, the present invention is directed towards a "flash cache" technique for handling additional requests for an object received by the cache manager 232 during the time the cache manager 232 or appliance 104 is in the processing of transmitting or waiting to transmit a response for a first requester of the object. Referring now to FIG. 5, method 500 of the present invention depicts the flash cache technique of the present invention. In brief overview and in view of FIGS. 1 and 2, at step 510, the cache manager 232 of the present invention receives a response from an originating server 106a-106n for an object requested by a first client, for example client 102a illustrated in FIG. 1. The object may comprise a dynamically generated object which is generated by one of the originating servers 106a-106n, and the response from the originating server 106a-106n may include the dynamically generated object. At step 515, the cache manager 232 requests transmission of the response to the first client, such as via a network stack, for example, a TCP/IP stack of the device 104. At step 520, the response may be stored or held in a buffer while waiting to be transmitted. For example, the device 104 may throttle communications to a slow connected or low bandwidth client 102a, and therefore, the device 104 queues network packets, which represent the response.

At step 525, while the response of the first client 102a is waiting to be transmitted in the buffer or otherwise in the process of being transmitted and/or prior to completing transmission of the response to the first client 102a, the cache manager 232 receives a second request for the object from a second client 102B. At step 530, the cache manager 232 determines the object is currently in the buffer and provides the object from the buffer to response to the second request to the second client 102B. In one embodiment, as the device uses a single TCP/IP stack, the same object can be provided for transmission to the first client 102a and the second client 102B. At step 535, the first response is transmitted to the first client 102a, and a response is transmitted to the second client 102B. At step 540, the response of the first client 102B is removed from the buffer.

In further detail, at step 510, the device 104, such as by the cache manager 232, intercepts or otherwise receives a response from an originating server 106a-106n to a request from a first client 102a for an object, such as dynamically generated object. In one embodiment, the dynamically generated object is identified as non-cacheable, such as by the originating server 106a-106n, or is otherwise not identified as cacheable. In some embodiments, the cache manager 232 receives the request from the first client 102a and forwards the request to the originating server 106a-106n. In one embodiment, the cache manager 232 checks the cache manager 232 for the requested object prior to forwarding the request to the originating server 106a-106n. In some cases, the cache manager 232 determines the object is invalid or has expired. In other cases, the cache manager 232 determines the object is not stored or otherwise available in the cache manager 232. For example, the object may have been flushed for example, or this may be the first time the object has been requested from an originating server 106a-106n. In some embodiments, the response comprises the object, and in other embodiments, the response indicates a status, such as a failure or error message regarding the object.

At step 515, the response for the request by the first client 102a is provided for transmission to the first client 102a. In some embodiments, the device 104 receives the response, and requests the packet processing engine 240 to transmit the response to the client 102a. In other embodiments, the cache manager 232 receives the response and requests the packet processing engine 240 to transmit the response to the client 102a. In one embodiment, the device 104 comprises one network stack for receiving and transmitting network packets to the clients 102a-102n. In some embodiments, the network stacks comprises a TCP/IP stack. In other embodiments, the device 104 may include multiple network stacks, each associated with or used by one or more clients 102a-102n. The network stacks or stacks are associated with the kernel 204, network ports 226 and/or the packet processing engine 240 as those ordinarily skilled in the art will recognize and appreciate.

At step 520, during the course of transmitting the response to the first client 102a requested at step 515, the device 104 queues, holds, or otherwise stores the response in a buffer. In some embodiments, the buffer is a part of the network stack, such as a TCP/IP stack. For example, the buffer may comprise a data structure used in or by the TCP/IP stack or by a network driver, filter or other network related software processing or handling any portion of the network stack. In other embodiments, the buffer is part of the network port 226. In additional embodiments, the buffer is part of the packet processing engine 240, or yet in further embodiments, the kernel comprises the buffer. The buffer may be any memory or storage element located in any portion of the device 105. In many embodiments, the response is queued, held or stored in the buffer as one or more network packets, such as TCP/IP protocol based packets. In one embodiment, the response is held in one or more data structures providing the buffer for use by the present invention. As those ordinarily skilled in the art will recognize and appreciate, the response may be queued, held or stored in the buffer in any suitable form.

Furthermore, the response may be stored or queued in the buffer for any duration of time period, either arbitrary, predetermined, implicit, explicit or otherwise, and using any suitable means and/or mechanisms. In one embodiment, the response is stored in the buffer as the network packet awaits to be transmitted by the device 104 based on a rate of transmission, packet queuing rate, network traffic and congestion, or any other network characteristics and as may be determined by the device 104, such as via the packet processing engine 240 and/or the network ports 226. In another embodiment, the response is held in a buffer for a determined time period. In some embodiments, the device 104 queues, manages and transmits network packets to a client 102a based on characteristics, such as bandwidth, type of connection, etc. of the client's network connection(s), or characteristics of the client 102a. For example, for a client 102a with a slower connection to the device 104 than the device's connection to an originating server 106a-106n, the device 104 may throttle or otherwise manage the transmission of the network packets to the client 102a to provide a desired performance of or behavior for the client 102a, or the network connection of the client 102a. As such, the device 104 may queue or hold the response in a buffer for a desired time period in accordance with any queuing or buffer management logic, function, rule or operation.

At step 525, while the response of the first client 102a is held in the buffer, or is being transmitted or otherwise prior to completing transmission of the response to the first client 102a, such as a buffer of a TCP/IP stack, the device 104, such as via the cache manager 232, intercepts or otherwise receives a second request from a second client 102B for the object obtained by the cache manager 232 for the first request. That is, in one embodiment, the object requested by the second client 102B is stored in the buffer waiting to be transmitted. In some embodiments, the device 104 receives multiple requests from multiple clients 102b-102n for the same object requested by the first client 102a and is currently being held in the buffer for transmission to the first client 102a or is other currently being transmitted to the first client 102a. In some embodiments, the cache manager 232 determines the second request is requesting the same object as the first request using any suitable means and/or mechanisms, such as any of the techniques described herein for example, by using object determinants. In some embodiments, the appliance 104 or the cache manager 232 queues the second request, and any additional requests in a queue using any type and form of queuing mechanism. As such, in one embodiment, the clients 102a-102n do not need to resubmit the requests as the appliance 104 or the cache manager 232 queues and responds to the requests on behalf of the servers 106a-106n. In another embodiment, the appliance 104 or cache manager 232 queues and responds the requests transparently to the client 102a-102n without submitting the request to the server 106a-106n. The appliance 104 or cache manager 232 may use any mechanism such as a queue, object, or data structure in memory to queue the requests from the client 102a-102n to be responded to using the techniques of the present invention.

At step 530, the device 104 determines the object requested by the second client 102b is in the response stored in the buffer or is in the response currently being transmitted to the first client 102a. In some embodiments, the cache manager 232 determines the object is stored in the buffer. In some cases, the cache manager 232 first checks cache memory or storage for the object, and then checks the buffer for the object. In other cases, the buffer may be considered a storage location for cached objects to be searched or managed by the cache manager 232. In other embodiments, the cache manager 232 requests the packet processing engine 240 to check if the object is in the buffer. In additional embodiments, the cache manager 232 determines if the object is in the buffer via any application programming interface (API) of the kernel 204. In some cases, the cache manager 232 interfaces to any drivers, network handlers, filters, or other software handling or processing any portion of the network stack to determine if the object is in the buffer.

Further at step 530, the present invention provides the object stored in the buffer or being transmitted as the response to the first client 102a for use in the response to the second request from the second client 102B at step 525. In some embodiments, the device 104, such as via the packet processing engine 104, forms a response to the second request by using any portion of the buffer and related data structures of the network stack. In one embodiment, the object is stored in the buffer once, such as in a single network stack configuration, and used to form the network packets to be transmitted to the first client 102a and second client 102B respectively. In other embodiments, the copy of the object from the buffer is used to form the response to the second request. In further embodiments, the object is provided from a first network stack to a second network stack to form the response to the second request for the second client 102B. The response of the first client 102a may be maintained in the buffer, and any portion or all of the response in the buffer may be used to provide the response for the second client 102B. In one embodiment, the response of the first client stored in the buffer may be used without modification to respond to the second client 102B. In another embodiment, the data representing the object stored in the response of the first client 102a in the buffer is modified to provide the response for the second client 102B.

At step 535 of method 500 of the present invention, the first response to the first client 102a is transmitted from the device 104, and the second response in response to the second request of the second client 102B is transmitted from the device 104. The response to the first client 102a and second client 102B may be transmitted in any order from the device 104, with any time interval between each other, using the same network stack 267 or different network stacks. In some embodiments, the response for the second client 102B is also queued, held or stored in a buffer waiting to be transmitted. As such, any additional requests for the same object may also be provided via the first response or second response stored in the buffer and not yet transmitted, flushed, removed or otherwise unavailable.

At step 540, the response of the first client 102a is flushed or otherwise removed from the buffer. In some embodiments, if the response of the second client 102B was stored to the buffer, the response of the second client is also removed. In other embodiments, the response of the second client may remain in the buffer and steps 525 to 535 of method 500 are practiced again using the second client response while receiving a third request for the object from a third client.

In another aspect, the present invention is directed towards a "flash crowd" technique for handling situations where the appliance 104 or cache manager 232 receives additional requests, e.g., nearly simultaneous requests, for the same object during the time the server is processing and returning the response object for a first requester. Once all such nearly simultaneous requests are responded to by the cache, the object is immediately flushed from the cache memory, with no additional expiry time or invalidation action by application or administrator. This technique of the present invention enables data to be cached and served for very small amounts of time for objects that would otherwise be considered non-cacheable. This approach yields a significant improvement in applications that serve fast changing data to a large volume of concurrent users, such, for example, as real time stock quotes, or a fast evolving news story.

Figure 6:
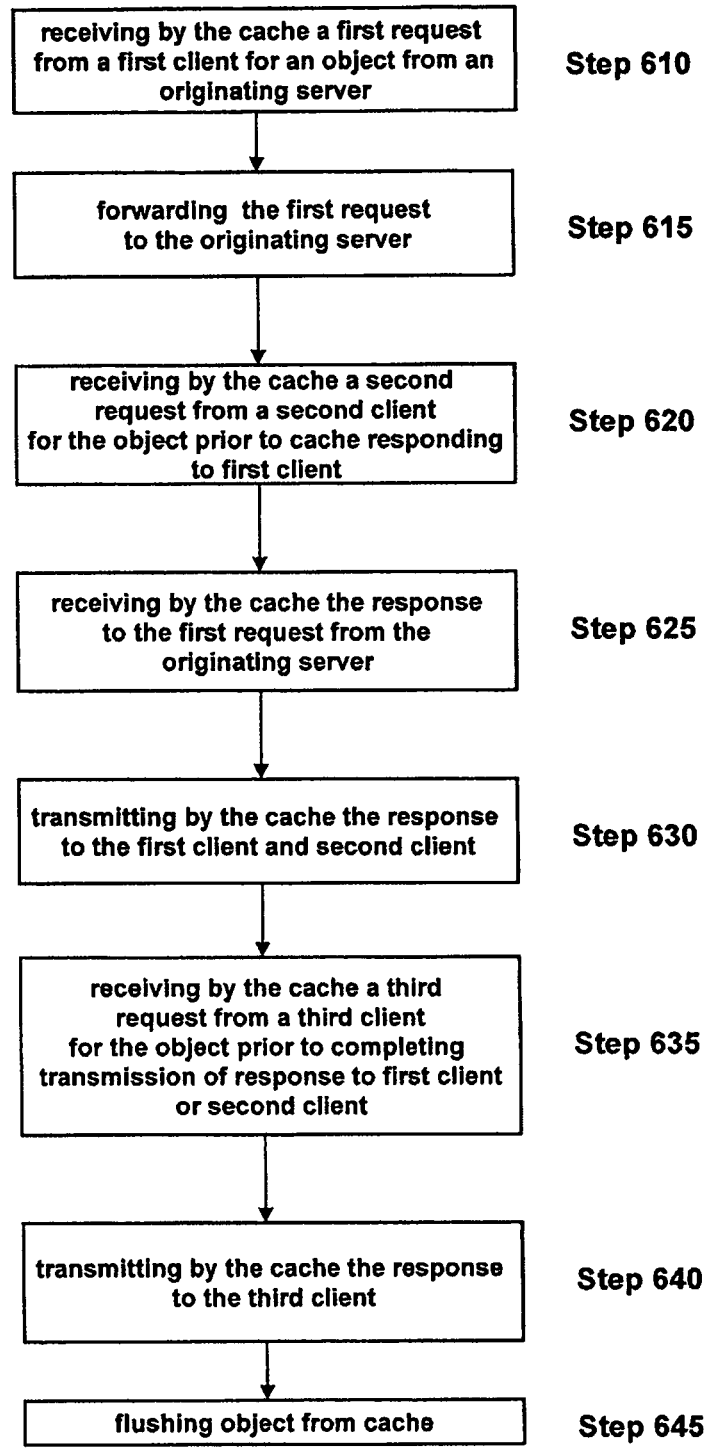
FIG. 6. is a flow diagram of steps taken in an embodiment of a method of the present invention for providing a flash crowd control technique.

FIG. 6 describes a method 600 depicting the steps taken by the cache of the present invention to serve the same content to each of the client requesters as it receives such content in response to the first request. In brief overview of method 600, at step 610, the cache manager 232 or appliance 104 receives a first request from a first client 102a for an object, such as a dynamically generated object, from an originating server 106a-106n. At step 615, the cache forwards the first request to the originating server 106a-106n. While waiting for a response to the first request or prior to responding to the first request of the first client 102a, at step 620, the cache receives a second request from a second client 102b for the object. In some embodiments, the cache does not forward the second request to the originating server but instead queues the second request. At step 625, the cache receives the response to the first request from the originating server, and at step 630, transmits the received response and/or object from the response to the first client 102a in response to the first request, and to the second client 102b in response to the second request. At step 635, the cache may receive an additional third request from a third client 102c for the object prior to completing transmission of the received response and/or object from the response to either the first client 102a or second client 102b. At step 640, the cache also transmits the received response and/or object from the response to the third client 102c. Upon responding to the requests, the cache, at step 645, flushes the object from the cache memory, for example, without any expiry time or invalidation action by the application, originating server, or administrator.

In further details and in view of FIGS. 1 and 2, step 610 of method 600 of the present invention, the cache manager 232 of appliance 104, in one embodiment, may intercept or otherwise receive a request from a client 102a-102n, for example client 102a in FIG. 1 for an object, such as a dynamically generated object, at any point in time during communications between the client 102a and the originating server, for example 106a. In one embodiment, the request from the first client 102a may be the first time the first client 102a has requested the object. In one example, the client 102a may request the object for the first time upon connection to the origination server 106a. In another example, the cache manager 232 may have not previously cached or requested the object from the originating server 106a on behalf of the client 102a or any other client 102a-102n. In other embodiments, the request from the client 102a may be a subsequent request for a previously requested object. In yet other embodiments, the cache manager 232 may have previously cached the object requested by the client 102a at step 610. As such, the techniques of the present invention as illustrated in FIG. 6 may be practiced at any point during the course of communications between the clients 102a-102n and the originating servers 106a-106B, regardless if the object is currently cached, has been previously cached or has never been cached.

At step 615, the cache manager 232 forwards the request from the client 102a to the originating server 106a. In one embodiment, the cache manager 232 forwards the request to the originating server without checking if the object is stored in the cache manager 232. In some embodiments, the cache manager 232 first checks if the object requested by the client 102a is available from the cache manager 232, and if not, then forwards the request to the originating server 106a. In other embodiments, the cache manager 232 checks if the object is stored in the cache but is either invalid or otherwise needs to be updated, or is otherwise about to be invalid or shortly need to be updated. In another embodiment, the cache manager 232 determines a dynamically generated object stored in the cache should be dynamically regenerated and served from the originating server 106a-160N. As such, if the cache manager 232 determines the object should be requested from an originating server 106a-106n, the cache manager 232 forwards the request from the client 102a to the originating server 106a-106n. In one embodiment, the cache manager 232 forwards the same or original request received from the first client 102a to the originating server 106a. In another embodiment, the cache manager 232 sends a request formed by the cache manager 232 for the object requested or identified in the request by the first client 102a.

While waiting for a response to the request of the first client 102a from the originating server 106a-160N and/or prior to responding to the request of the first client 102a, the cache manager 232, at step 620, may intercept or otherwise receive one or more additional requests for the object identified, associated with or requested by the first request of the first client 102a at step 610. For example, in one embodiment, the cache manager 232 receives a second request from a second client 102B for the object, which may be dynamically generated by the originating server 106a in response to the first request. In one embodiment, the appliance 104 or the cache manager 232 queues the second request, and any additional requests in a queue using any type and form of queuing mechanism. In some embodiments, the second and/or additional requests for the object may occur or be received by the cache manager 232 nearly simultaneously. In other embodiments, the second and/or additional requests may be intercepted or received by the cache manager 232 at any point between receiving the first request and receiving a response to the first request from the originating server 106a. In yet another embodiment, the second and/or additional requests may be received by the cache manager 232 at any point between receiving the first request and providing a response to the first request to the client 102a.

In one embodiment, prior to responding to the first request, the cache manager 232 does not forward the second request from the second client 102b for the object and/or any other additional requests for the objects from any other clients 102c-102n. In one embodiment, the cache manager 232, at step 625, queues or otherwise holds the second and additional requests, for example, at the appliance 104, until receiving the response to the first request. As such, the cache manager 232 transparently to the second client 102B does not forward the second client's request. However, in some embodiments, it appears to the second client 102B that the request is being processed, for example, by an originating server 106a-106n In some embodiments, the second request from the second client 102a may request the same object as the first request at step 610 but also include an additional request for another object or other information, static, dynamic or otherwise. For example, the request of the second client 102B may include multiple requests. In these embodiments, the cache manager 232 may identify the portion of the request related to the object already requested in connection with the first request of the first client 102a, and not process the identified portion until the response to the first request is received. For the other portions of the request from the second client 102B, the cache manager 232 may process these other requests in any suitable manner, such as by any techniques of the present invention described herein. For example, the second request may include a request for a second object, for which the cache manager 232 requests the second object from an originating server 102a-20B or obtains the second object from the cache manager 232.

At step 625, the method 600 of the present invention receives a response to the first request forwarded to the originating server 106a at step 615. In some embodiments, the response includes the object, such as an object dynamically generated by any of the servers 106a-106n. In other embodiments, the response includes a pointer to a location of the object to be fetched or otherwise obtained by the cache manager 232. In further embodiments, the response may indicate some error message or otherwise indicate the object requested cannot be provided. In one embodiment, the cache manager 232 compares the received response to the corresponding request to determine if the response is suitable or appropriate for the request. In further embodiments, the cache manager 232 obtains contents of the response, such as the dynamically generated object, and creates, modifies, or otherwise provides the response desired to be communicated to the first client 102a.

At step 630, the cache manager 232 of the present invention uses the response and/or object from the response received for the first request to respond to the first request and the second or additional requests for the same object. In one embodiment, the cache manager 232 transmits the received response to the first client 102a in response to the first request, and transmits the received response to the second client 102B in response to the second request. In another embodiment, the cache manager 232 transmits the received response to the first client 102a, but modifies the received response and transmits the modified response to the second client 102B in response to the second request. For example, the cache manager 232 may modify the response to the second client 102B to include session information or other information corresponding to the second request. In further embodiments, the cache manager 232 may obtain the object requested from the received response, and create, modify or otherwise provide a response corresponding to the first request and the second request and including the object, such as a first response and a second response, and transmit the corresponding response to the first client 102a and second client 102B. As such, the cache manager 232 may use all or any portion of the response received for the first request from an originating server 106a-106n in responding to the requests from the clients 102a-102b for the object.

In some embodiments, the cache manager 232 may intercept or otherwise receive, at step 635, additional requests for the object from other clients 102c-102n after receiving the response to the first request from the server 106a and before completing transmission of a response to the first client 102a, second client 102b or any other client 102a-102c requesting the object at step 625. For example, the cache manager 232 may receive a third request for the object from a third client 102C. In these embodiments, the cache manager 232 may use all or any portion of the response received for the first request from an originating server 106a-106n and communicated to clients 102a and/or 102b at step 630 to respond to these additional requests. In another embodiment, the cache manager 232 may have completed transmission of responses to the first client 102a and second client 102b but may still have any of the responses in memory or otherwise available to respond to the third request of the third client 102c with the object provided via the first request. As such, at step 640, the cache manager 232 of the present invention can respond to the third request or further additional requests without requesting the object again from the originating server and/or without storing the requested object in cache.

In some embodiments, the appliance 104 or the cache manager 232 queues the second request, third request or any additional requests in a queue. As such, in one embodiment, the clients 102a-102n do not need to resubmit the requests as the appliance 104 or the cache manager 232 queues and responds to the requests on behalf of the servers 106a-106n. In another embodiment, the appliance 104 or cache manager 232 queues and responds the requests transparently to the client 102a-102n without submitting the request to the server 106a-106n. The appliance 104 or cache manager 232 may use any mechanism such as a queue, object, or data structure in memory to queue the requests from the client 102a-102n to be responded to using the techniques of the present invention. Additionally, the appliance 102 or cache manager 232 may respond to the client requests in any order, and not necessarily in the order received or in a first-in first-out manner from the queue.

At step 645, the cache manager 232 flushes the received response to the first request from the originating server 106a, any responses to the client's requests, and/or the object requested by the requests from the cache manager 232. In one embodiment, the cache manager 232 immediately flushes the response and/or object from cache upon completing the transmission of the last response, such as at step 630 in one embodiment or step 640, in another embodiment. In some embodiments, the cache manager 232 maintains the object for a predetermined time period, such as in accordance with an expiry time. In other embodiments, the cache manager 232 maintains the object in cache until the originating server 106a-160N invalidates the object. In yet another embodiment, the object remains in memory or storage until the memory or storage is written over or otherwise used by the cache manager 232 for other purposes.

Although the techniques of methods 500 and 600 of the present invention are generally described above in regards to a request for a single object from multiple clients, those ordinarily skilled in the art will recognize and appreciate that the flash cache and flash crowd handling techniques of the present invention may be used to handle multiple object requests either in a single request or a series of requests from multiple clients that may occur either sequentially, concurrently, or nearly concurrently or simultaneously. As such, multiple instances of practicing methods 500 and 600 may be executing at various frequencies and at various times during the course of operation of the cache manager 232 or appliance 104 in a network environment 200. Furthermore, each request or series of requests from each client may request different sets of objects, with a common set of one or more objects requested among one or more clients.

For example in view of the flash crowd techniques of the present invention, a first client may request a first object and a second object, while a second client may request the second object and a third object, and the third client may request the first object and the third object. In some embodiments, the cache of the present invention uses multiplexing and/or demultiplexing techniques to request an object once for each object of multiple requests outstanding between multiple clients, and provide the corresponding response to each client accordingly. Further to the above example, the cache may obtain the first object from the originating server once for the first client and the third client, the second object once for the first client and second client, and the third object once for the second client and third client. In some embodiments, when all the objects for one or more requests for a client are received by the cache, the cache transmits the corresponding response or responses to the client. In other embodiments, the cache may respond to the client with each object upon receipt of the object by the cache.

Likewise, in view of the flash cache technique of method 500 of the present invention, the buffer of the appliance may comprise multiple objects waiting to be transmitted while additional requests for those objects are received by the appliance. In one embodiment, the appliance of the present invention uses a single TCP/IP stack from which multiple buffers are associated with and temporarily store multiple objects during the course of transmission. As such, a first object in the buffer may be used to respond to requests from a first client and a second client for the first object, and a second object in the buffer may be used to respond to requests from a third client and fourth client for the second object, or to respond to a request from either or both of the first client or second client for the second object.

Furthermore, the flash cache and flash crowd techniques of the present invention may be practiced in conjunction or in any combination with each other as those ordinarily skilled in the art will recognize and appreciate. For example, the appliance of the present invention may be providing responses to additional requests for an object from the buffer via the flash cache technique, but determines the object in the buffer is either invalid or otherwise needs to be requested from the originating server. At that point, the appliance may switch to the flash crowd technique by requesting the object from the originating server. The appliance then uses the object requested from the originating server to respond to additional requests for the object received and queued at the appliance while waiting for the originating server to respond.

12. Etag Insertion

In another aspect, the present invention is directed towards using techniques to increase cache hit rates by inserting information, such as entity tag and cache control information for an object, in a response to a client to enable the cache to check for a hit in a subsequent request. The present invention provides a technique for identifying a dynamically generated object as cacheable to a client when the originating server did not identify the object as cacheable. In some embodiments, such as an embodiment handling HTTP requests and responses for objects, the techniques of the present invention insert an entity tag, or "etag" into the response to provide cache control for objects provided without entity tags and/or cache control information from an originating server. In brief reference to the HTTP protocol as known to those ordinarily skilled in the art, an "etag" is the ETag header field of an HTTP based message which provides the current value of the entity tag for a requested variant, such as an object, and may be used for comparison with other entities from the same resource. The etag provides a mechanism for validation in the HTTP protocol. Also, an HTTP based message may include a Cache-Control header field to specify directives to caching mechanisms along the request/response message or communication chain. The cache-control directives specify desired caching behavior.

Figure 7A:
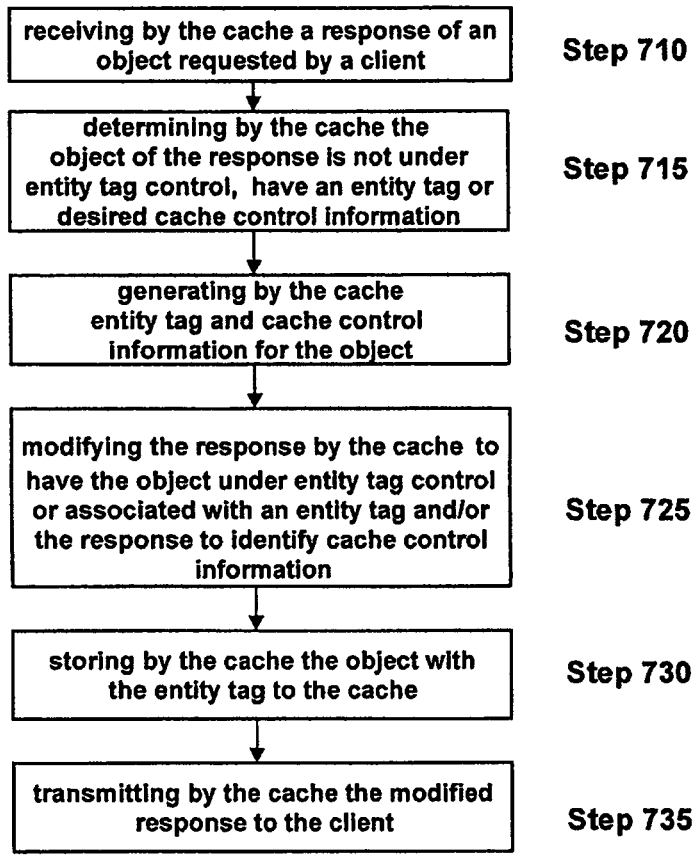
FIGS. 7A and 7B are flow diagrams of steps taken in an embodiment of a method of the present invention for providing entity tag and cache control for an object.
Figure 7B:
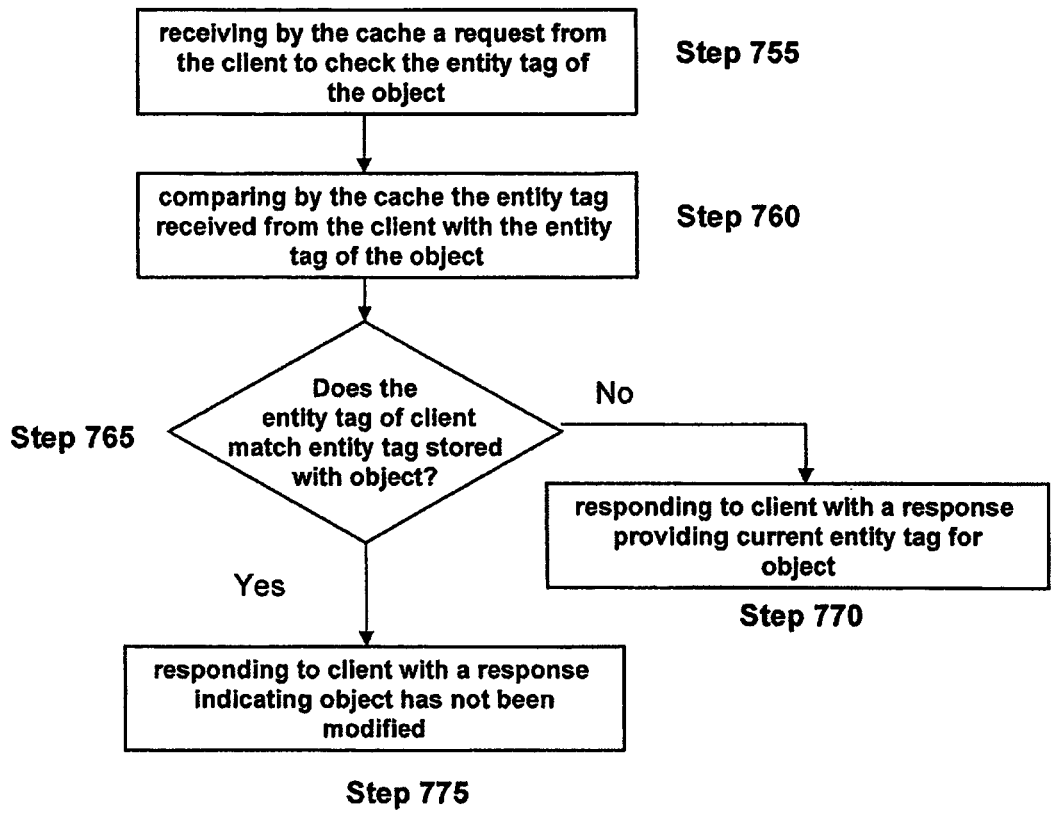

Referring now to FIGS. 7A and 7B and in view of FIGS. 1 and 2, steps are depicted for an embodiment of practicing the "etag" techniques of the present invention. In brief overview of FIG. 7A, method 700 of the present invention, step 710, receives a response having an object requested by a client 102a-102n, such as object served from an originating server 106a-106n and received by a cache manager 232 of the appliance 104. At step 715, the cache manager 232 determines if the object from the response is under tag entity control or otherwise has an entity tag. If the object does not have an entity tag, then at step 720, the cache manager 232 generates an entity tag for the object. At step 725, the cache manager 232 modifies the response to provide entity control information including the cache generated entity tag. At step 730, the cache manager 232 stores the object with the entity tag information to the cache manager 232. At step 735, the cache manager 232 responds to the client 102a-102n requesting the object with the modified response. As such, the client 102a-102n receives an entity tag controlled object from the cache manager 232 in a manner transparent to the client 102a-102n, such that the client 102a-102n is not aware that the originating server 106a-106n did not provide the object with the entity tag information.

In further detail, at step 710 of the present invention, the cache manager 232 receives a response to a request of a client 102a-102n for the object from an originating server 106a-106n. In some embodiments, the response may be received from a request sent from the client 102a-102n to the server 106a-106n, or from the cache manager 232 on behalf of the client 102a-102n to the server 106a-106n. In one embodiment, the cache manager 232 forwards the request from the client 102a-102n to the server 106a-106n after checking the cache manager 232 for a matching and/or valid object. In another embodiment, the cache manager 232 requests the object from the server 106a-106n during practicing the flashing crowd technique of the present invention described in conjunction with FIG. 6.

At step 715 of method 700, the cache manager 232 determines if the object received in the response at step 710 is under entity tag control or has an entity tag. In some embodiments, the cache manager 232 inspects, examines, checks or otherwise reads any field, header, data, or other information of the one or more packets providing the response. As those ordinarily skilled in the art will recognize and appreciate, the portion of the packet or packets to inspect or read depends on the type of one or more protocols used for the response. In one embodiment, the cache manager 232 determines the entity tag portion of the response packet is missing, empty or otherwise not provided. In another embodiment, the cache manager 232 determines the entity tag portion of the response packet is corrupted, invalid or otherwise not useable by the cache manager 232 and/or the client 102a-102B. In some embodiments, the cache manager 232 determines the response has an entity tag or is under entity control but not in the type, form or manner desired by the cache manager 232. In addition to or instead of the entity tag, the cache manager 232, in a similar manner to the entity tag, determines if there exists desired cache-control information in the response. In further embodiments, the cache manager 232 may determine via the policy engine 236 if the object should be under entity tag and/or cache control. As such, in some embodiments, the cache manager 232 may not continue performing the etag techniques of the present invention, such as steps 720 to 725, if the appliance 104 determines via the policy engine 236 the object should not be under entity tag or cache control.

At step 720, the cache manager 232 generates desired entity tag and cache control information for the object of the received response. The etag may comprise any type and/or form of entity tag representation and may comprise any numeric, alphanumeric, letters in one or more characters. In the embodiment of HTTP, the etag may comprise a string or quoted string, and may further include a prefix for indicating the etag is weak or strong in accordance with the HTTP protocol. In some embodiments, the cache manager 232 uses an entity header, or etag, counter which increments an etag counter sequentially, or in any desired increments. In some embodiments, the etag counter is global to all objects for which the cache manager 232 generates an etag. In other embodiments, the cache manager 232 may have multiple etag counters, each associated with or specific to an object or groups of objects.

In one embodiment, the etag may comprise a universal identifier (UID) or global universal identifier (GUID) associated with the object. In another embodiment, the etag may comprise an incarnation number as previously described above. In some embodiments, the cache manager 232 obtains the etag from an application, program, or other form of executable instructions running on the appliance 104 or in other embodiments, from another system or device accessible by the appliance 104 via the network. In further embodiments, the cache manager 232 may use any suitable algorithm, business rule or logic to generate a desired unique etag for the object. In one embodiment, the appliance 104 comprises a database, file, or other organized storage element for generating and maintaining etags for objects for the cache manager 232.

At step 725 of method 700, the cache manager 232 modifies the response from the originating server 106a-106n to include desired entity tag and/or cache control information, such as the entity tag generated by the cache at step 720. In one embodiment, the cache manager 232 inserts the entity tag information via an entity tag header of the protocol, such as the HTTP protocol. In another embodiment, the cache manager 232 modifies any entity tag header fields in the response to include the desired entity tag. In yet another embodiment, the cache manager 232 replaces the entity tag fields in the response with the entity tag fields desired to be used by the cache manager 232. In further embodiments, the entity tag information is inserted, modified or placed into any portion of the network packet or packets for communicating the response to the client 102a-102n.

Additionally, step 725, the cache manager 232 may insert, modify or otherwise place any desired cache-control information into any header, fields of a protocol, or any other portion of network packets for communicating the response. The cache-control information may be generated by the cache manager 232 by any suitable means and/or mechanisms. In one embodiment, the cache-control information is configured into and obtained via the policy engine 236 of the device 104. In another embodiment, the cache manager 232 determines the desired cache-control information from any algorithms, business rules, or logic of the cache manager 232. In some embodiments, the cache-control information may be based on any history of the network and caching performance between the client 102a-102n and the appliance 104 or cache manager 232.

At step 730 of the method 700 of the present invention, the cache manager 232 stores the generated entity tag with the object in any suitable or desired manner in the cache manager 232. In some embodiments, the entity tag is included in or is made a part of the stored object. In other embodiments, the entity tag is stored separately but associated with the object. In another embodiment, the entity tag and object are associated via a database, linked list, lookup table, or any other mechanism for associating one entity with another entity as known to those skilled in the art. Additionally, the cache-control information provided with the object and/or entity tag, in some embodiments, may also be stored in association with the object in the cache manager 232.

At step 735, the cache manager 232 causes the appliance 104 to transmit the modified response to the client 106a-106n. For example, the cache manager 232 requests the packet processing engine 240 to transmit the modified response to the client 102a-102n. As such, the client 102a-102n receives the object with entity tag and cache control information, even though unbeknownst to the client 102a-102n the originating server 106a-106n did not generate such information in one embodiment, or the cache manager 232 changed such information generated by the server 106a-106n. The etag technique of the present invention can ensure that every object has a validator, i.e., an etag, or has an etag controlled or otherwise desired by the cache manager 232. If an object doesn't have a validator or a desired validator, then the cache manager 232 inserts its own etag. These etag validators can avoid serving full responses on repeat requests for an object as will be discussed in connection with FIG. 7B.

FIG. 7B depicts a method 750 of the present invention for using the entity tag to check by a client 102a-102n if an object has been modified. As such, the client 102a-102n can cache the object on the client 102a-102n and check with the cache manager 232 or originating server 106a-106n if the object has changed. In brief overview of method 750, at step 775, the cache manager 232 receives a request from the client 102a-102n to check the entity tag of an object. At step 760, the cache compares the entity tag received from the request of the client 102a-102n with the entity tag of object stored in cache. At step 765, the cache manager 232 determines if the entity tag from the client matched the entity of the object in cache. If the entity tags do not match, then at step 770, the cache manager 232 responds to the client 102a-102n with a response providing the current entity tag for the object. If the entity tags do match, then at step 775, the cache manager 232 responds to the client 102a-102n with a response indicating the object has not been modified.

In further detail, at step 755, the cache manager 232 may receive a request from the client 102a-102n to check or validate the entity tag of an object by any type and/or form of communication. In one embodiment, the request comprises an HTTP message with an If-Match or If-None-Match request header field, which includes an entity tag string value provided by the client 102a-102n. For example, the client 102a-102n may have a copy of the object in a client cache or otherwise available on the client 102a-102n. The client 102a-102n uses the entity tag of the client's copy of the object in the request to determine or validate if the object is current.

At step 760, the cache manager 232 compares the entity tag value received from the client 102a-102B with the entity tag for the object to determine if the cache manager 232 has a different version of the object than the client 102a-102n. The cache manager 232 may use any suitable means and/or mechanisms to compare the entity tag value from the client 102a-102n with the entity tag value for the cached object. In one embodiment, the cache manager 232 performs a byte-compare on the etag value from the request with the etag stored with the object in the cache. In another embodiment, the cache manager 232 performs and uses hash algorithms on the entity tag and/or the cache object to determine if the object has been modified. In further embodiments, the cache manager 232 requests the object from the server 106a-106n, and compared the received object with the cached object to determine if the object has been modified.

If, at step 765, the entity tag from the client 102a-102n does not match the entity tag stored with the object in the cache manager 232 then at step 770, the cache manager 232 sends a response to the client indicating the entity tags do not match or otherwise the object has been modified. In one embodiment, the cache manager 232 sends a response to the client 102a-102n providing a new entity tag value for the object. In another embodiment, the cache manager 232 sends a response to the client 102a-102n provide a new version of the object, or the modified object, such as a modified object with a new entity tag stored in the cache manager 232. If, at step 765, the entity tag from the client 102a-102n does match the entity tag stored with the object in the cache manager 232 then at step 775, the cache manager 232 sends a response to the client indicating the entity tags do match or otherwise the object has not been modified.

Although the etag techniques of the present invention has generally been described in reference to the HTTP protocol, those ordinarily skilled in the art will recognize and appreciate the present invention may be practiced with any type and/or form of protocol to provide entity tag and cache information. In some embodiments, the protocol may not support entity tag and cache information fields, while in other embodiments, the protocol may support entity tag and cache information fields. In any of these embodiments, the techniques of the present invention provide entity tag and cache control information when the server does not provide this information in a response or when the cache decides to change or control the entity and cache control information provided by the server in a manner controlled or desired by the appliance 104.

In order to address the challenge to dynamically caching content dynamically generated by origin servers and applications the cache appliance of the present invention, can incorporate pre-packaged policies for certain commonly used applications such as Outlook® Web Access, Oracle® Configurator, and Serena® TeamTrack®. These packages are designed with an understanding of the way such applications process data thereby enabling the cache to make more intelligent decisions about which object and how long to keep objects generated by such applications stored in the cache memory.

D. Exemplary Computer System-Based Implementation

The functions of the present invention may be implemented using hardware, software, or a combination thereof and may be implemented in one or more computing devices or other processing systems. For example, FIGS. 8A AND 8B depict an example computing device 800 that may be utilized to implement any of the techniques, methods and functions of the present invention. As such, the appliance 104 of the present invention may be a computing device 800 or a specific purpose device designed and constructed to provide any of the techniques, functions and operations of the present invention described herein.

FIGS. 8A and 8B depict block diagrams of a computing device 800, and in some embodiments, also referred to as a network device 800, useful for practicing an embodiment of the present invention. As shown in FIGS. 8A and 8B, each computing device 800 includes a central processing unit 802, and a main memory unit 822. As shown in FIG. 8A, a typical computing device 800 may include a visual display device 824, a keyboard 826 and/or a pointing device 827, such as a mouse. Each computing device 800 may also include additional optional elements, such as one or more input/output devices 830a-830b (generally referred to using reference numeral 830), and a cache memory 840 in communication with the central processing unit 802.

The central processing unit 802 is any logic circuitry that responds to and processes instructions fetched from the main memory unit 822. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; those manufactured by International Business Machines of White Plains, N.Y.; or those manufactured by Advanced Micro Devices of Sunnyvale, Calif. The computing device 800 may be based on any of these processors, or any other processor capable of operating as described herein.

Main memory unit 822 may be one or more memory chips capable of storing data and allowing any storage location to be directly accessed by the microprocessor 802, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 822 may be based on any of the above described memory chips, or any other available memory chips capable of operating as described herein. In the embodiment shown in FIG. 8A, the processor 802 communicates with main memory 822 via a system bus 850 (described in more detail below). FIG. 8A depicts an embodiment of a computing device 800 in which the processor communicates directly with main memory 822 via a memory port 803. For example, in FIG. 8B the main memory 822 may be DRDRAM.

FIG. 8B depicts an embodiment in which the main processor 802 communicates directly with cache memory 840 via a secondary bus, sometimes referred to as a backside bus. In other embodiments, the main processor 802 communicates with cache memory 840 using the system bus 850. Cache memory 840 typically has a faster response time than main memory 822 and is typically provided by SRAM, BSRAM, or EDRAM.

In the embodiment shown in FIG. 8A, the processor 802 communicates with various I/O devices 830 via a local system bus 850. Various busses may be used to connect the central processing unit 802 to any of the I/O devices 830, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 824, the processor 802 may use an Advanced Graphics Port (AGP) to communicate with the display 824. FIG. 8B depicts an embodiment of a computer 800 in which the main processor 802 communicates directly with I/O device 830b via HyperTransport, Rapid I/O, or InfiniBand. FIG. 8B also depicts an embodiment in which local busses and direct communication are mixed: the processor 802 communicates with I/O device 830a using a local interconnected bus while communicating with I/O device 830b directly.

The computing device 800 may support any suitable installation device 816, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any software 820, or portion thereof, related to the present invention or otherwise providing any of the techniques of the present invention. The computing device 800 may further comprise a storage device 828, such as one or more hard disk drives or redundant arrays of independent disks, for storing an operating system and other related software, and for storing application software programs such as any program related to the software 820 of the present invention. Optionally, any of the installation devices 816 could also be used as the storage device 828.

Furthermore, the computing device 800 may include a network interface 818 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 818 may comprise a built-in network adapter, network interface card, PCMCIA network card, card bus network adapter, wireless network adapter, USB network adapter, modem or any other device suitable for interfacing the computing device 800 to any type of network capable of communication and performing the operations described herein.

A wide variety of I/O devices 830a-830n may be present in the computing device 800.

Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 823 as shown in FIG. 8A. The I/O controller may control one or more I/O devices such as a keyboard 826 and a pointing device 827, e.g., a mouse or optical pen. Furthermore, an I/O device may also provide storage 828 and/or an installation medium 816 for the computing device 800. In still other embodiments, the computing device 800 may provide USB connections to receive handheld USB storage devices such as the USB Flash Drive line of devices manufactured by Twintech Industry, Inc. of Los Alamitos, Calif.

In further embodiments, an I/O device 830 may be a bridge 870 between the system bus 850 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 800 of the sort depicted in FIGS. 8A and 8B typically operate under the control of operating systems, which control scheduling of tasks and access to system resources. The computing device 800 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 800 may have different processors, operating systems, and input devices consistent with the device. The computing device 800 can be any workstation, desktop computer, laptop or notebook computer, server, handheld computer, mobile telephone, any other computer, or other form of computing or telecommunications device that is capable of communication and that has sufficient processor power and memory capacity to perform the operations of the present invention described herein. Moreover, the computing device 800 can be any type and/or form of network device, such as a remote access device, a Virtual Private Network (VPN) device, a Secure Socket Layer (SSL) VPN device, router, switch, bridge, or other network device in any form capable of performing the operations of the present invention described herein Although the appliance of the present invention is generally discussing using or communicating via TCP/IP, the appliance may use or communicate with any modified transport control protocol, such as Transaction TCP (T/TCP), TCP with selection acknowledgements (TCP-SACK), TCP with large windows (TCP-LW), congestion prediction such as in the TCP-Vegas protocol, and TCP spoofing. Additionally, the appliance of the present invention may use any internode or high-performance protocol. Moreover, the appliance of the present invention may use or operate with any other transport and network protocols, such as Sequenced packet exchange (SPX) protocol over the Internetwork Packet Exchange (IPX) protocol.

CONCLUSION

While various embodiments of the present invention have been described above, it should be understood that they have been presented by way of example only, and not limitation. Thus, it will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

We claim:

1. A method for caching a dynamically generated object identified as not cacheable, the method comprising the steps of:

receiving, by an intermediary device located between a plurality of clients and an originating server, from the originating server, a dynamically generated object identified as not cacheable generated in response to a first request from a first client of the plurality of clients;

transmitting, by the intermediary device, the dynamically generated object to the first client, responsive to the first request;

retaining, in a cache on the intermediary device, the dynamically generated object identified as not cacheable after transmitting the dynamically generated object to the first client;

receiving, by the intermediary device, a second request from a second client of the plurality of clients for the dynamically generated object responding, by the intermediary device, to the second request with the cached dynamically generated object identified as not cacheable generated in response to the first request;

receiving, by the intermediary device, a request to invalidate the cached dynamically generated object identified as not cacheable; and marking, by the intermediary device in response to the request to invalidate the cached dynamically generated object identified as not cacheable, the cached dynamically generated object identified as not cacheable as invalid.

2. The method of claim 1, comprising requesting, by the originating server to invalidate the cached dynamically generated object identified as not cacheable.

3. The method of claim 2, comprising automatically requesting, by the originating server, to invalidate the cached dynamically generated object identified as not cacheable in response to a change to the dynamically generated object in the originating server.

4. The method of claim 1, comprising requesting, by a third client of the plurality of clients, to invalidate the cached dynamically generated object identified as not cacheable, the third client in communication with the originating server to receive the dynamically generated object.

5. The method of claim 1, comprising requesting, by an external administrative control, to invalidate the cached dynamically generated object identified as not cacheable.

6. The method of claim 1, comprising flushing from the cache the cached dynamically generated object identified as not cacheable and marked as invalid.

7. The method of claim 1, comprising receiving, by the intermediary device, the request to invalidate within at least one millisecond of caching the dynamically generated object.

8. The method of claim 1, comprising receiving, by the intermediary device, the request to invalidate responsive to expiration of an invalidation time period of the cached dynamically generated object of at least one millisecond.

9. The method of claim 1, wherein the dynamically generated object identified as not cacheable comprises a dynamically generated object not identified as cacheable.

10. The method of claim 1, further comprising:
generating, by the originating server, the dynamically generated object in response to the request from the client;
identifying, by the originating server, the dynamically generated object as not cacheable; and
marking, by the originating server, the dynamically generated object as not cacheable responsive to the identification that the dynamically generated object is not cacheable.

11. A method for caching a group of dynamically generated objects having at least one object identified as not cacheable, the method comprising the steps of:
identifying, in a cache on an intermediary device located between a client and an originating server, a group of dynamically generated objects previously generated in response to a request from the client and served from the originating server, at least one of the dynamically generated objects identified as not cacheable;
associating, by the intermediary device, the group with an object determinant, the object determinant comprising one or more parameter name-value pairs in a first communication between the client and the originating server; and
intercepting, by the intermediary device, a second communication from the client or a second client identifying the object determinant associated with the group and indicating via the object determinant in the second communication a change is one of about to occur or has occurred on the originating server to one of the objects identified as not cacheable of the group.

12. The method of claim 11, comprising marking, by the intermediary device, the group of dynamically generated objects as invalid in response to receiving the second communication.

13. The method of claim 12, comprising flushing from the cache the group of objects marked as invalid.

14. The method of claim 11, wherein the group of dynamically generated objects is pre-designated.

15. The method of claim 11, further comprising automatically identifying the group of dynamically generated objects and associating the object determinant with the group according to a rule.

16. A method for maintaining a cache of dynamically generated objects, the method comprising the steps of:
storing, by a cache on an intermediary located between a client and an originating server, a dynamically generated object identified as not cacheable and generated at the originating server in response to a request from a client;
identifying, by the intermediary, an object determinant of the cached dynamically generated object, the object determinant comprising one or more parameter name-value pairs in a first communication between the client and the originating server;
intercepting, by the cache, a second communication between the client and the originating server;
identifying, by the intermediary device, an object determinant in the second communication;
determining, by the intermediary device, responsive to the object determinant in the second communication corresponding to the identified object determinant of the cached dynamically generated object, that a change has occurred or will occur in the dynamically generated object identified as not cacheable and generated at the originating server in response to a request from a client; and
marking, by the cache, the dynamically generated object identified as not cacheable and stored in the cache as invalid.

17. The method of claim 16, comprising obtaining the dynamically generated object identified as not cacheable from the originating server.

18. The method of claim 16, comprising flushing from the cache the invalid dynamically generated object identified as not cacheable.

19. The method of claim 16, wherein the dynamically generated object identified as not cacheable comprises a dynamically generated object not identified as cacheable.

20. The method of claim 16, comprising:
associating, by the intermediary device, the dynamically generated object with a group of dynamically generated objects previously served from the originating server;

associating, by the intermediary device, the group with the object determinant of the cached dynamically generated object; and marking, by the intermediary device, the group of dynamically generated objects as invalid in response to the communication.

21. The method of claim 20, comprising flushing from the cache the group of dynamically generated objects marked as invalid.

22. The method of claim 20, wherein the group of dynamically generated objects is pre-designated.

23. The method of claim 20, further comprising automatically identifying the group of dynamically generated objects and associating the object determinant of the cached dynamically generated object with the group according to a rule.

24. The method of claim 16, comprising embedding by the client in the second communication the object determinant in the second communication as a pre-defined string.

25. The method of claim 16, comprising identifying the object determinant in the second communication based on a pre-defined heuristic rule associated with the dynamically generated object.

26. The method of claim 16, comprising selecting, by the intermediary device, the object determinant in the second communication from one of the following elements of the communication: USERID, IP address, TCP port, HTTP header, custom HTTP header, client URL, cookie header, URL query string and POST body.

27. The method of claim 16, comprising extracting, by the intermediary device, from the second communication the object determinant in the second communication based on a user-configured invalidation policy.

28. The method of claim 16, comprising maintaining a table in the cache to associate the object determinant of the cached dynamically generated object with one or more objects or groups of objects stored in the cache.

29. The method of claim 16, comprising examining, by an intelligent statistical engine, communications from the client to identify a set of dynamically generated objects to store in the cache.

30. The method of claim 16, comprising associating, by the intermediary device, objects stored in the cache into a content group, wherein the content group is represented by a hash table having an incarnation number as an index.

31. The method of claim 16, comprising performing, by the intermediary device, a hash algorithm on the dynamically generated object identified via the second communication to determine a change to the dynamically generated object.

32. A system for caching a dynamically generated object identified as not cacheable, the system comprising:

means for receiving, by an intermediary device located between a plurality of clients and an originating server, from the originating server, a dynamically generated object identified as not cacheable generated in response to a first request from a first client of the plurality of clients;

means for transmitting, by the intermediary device, the dynamically generated object to the first client, responsive to the first request;

means for retaining in a cache on the intermediary device, the dynamically generated object identified as not cacheable after transmitting the dynamically generated object to the first client;

means for receiving, by the intermediary device, a second request from a second client of the plurality of clients for the dynamically generated object;

means for responding, by the intermediary device, to the second request with the cached dynamically generated object identified as not cacheable generated in response to the first request;

means for receiving, the intermediary device, a request to invalidate the cached dynamically generated object identified as not cacheable; and means for marking, by the intermediary device in response to the request to invalidate the cached dynamically generated object identified as not cacheable, the cached dynamically generated object identified as not cacheable as invalid.

33. The system of claim 32, comprising means for requesting, by the originating server to invalidate the cached dynamically generated object identified as not cacheable.

34. The system of claim 32, comprising means for automatically requesting, by the originating server, to invalidate the cached dynamically generated object identified as not cacheable in response to a change to the dynamically generated object in the originating server.

35. The system of claim 32, comprising means for requesting, by a third client of the plurality of clients, to invalidate the cached dynamically generated object identified as not cacheable, the third client in communication with the originating server to receive the dynamically generated object.

36. The system of claim 32, comprising means for requesting, by an external administrative control, to invalidate the cached dynamically generated object identified as not cacheable.

37. The system of claim 32, comprising means for flushing from the cache the cached dynamically generated object identified as not cacheable and marked as invalid.

38. The system of claim 32, comprising means for receiving, by the intermediary device, the invalidation request within at least one millisecond of caching the dynamically generated object identified as not cacheable.

39. The system of claim 32, comprising means for receiving, by the intermediary device, the request to invalidate responsive to expiration of an invalidation time period of the cached dynamically generated object of at least one millisecond.

40. A system for caching a group of dynamically generated objects having at least one object identified as not identified as cacheable, the system comprising:

means for identifying, in a cache on an intermediary device located between a client and an originating server, a group of dynamically generated objects generated in response to a request by the client and served from the originating server, at least one of the dynamically generated objects identified as not cacheable;

means for associating, by the intermediary device, the group with an object determinant, the object determinant comprising one or more parameter name-value pairs in a first communication between the client and the originating server; and means for intercepting, by the intermediary device, a second communication from the client or a second client identifying the object determinant of the group and indicating via the object determinant in the second communication a change is one of about to occur or has occurred on the originating server to one of the objects of the group.

41. The system of claim 40, comprising means for marking, by the intermediary device, the group of dynamically generated objects as invalid in response to receiving the second communication.

42. The system of claim 41, comprising means for flushing from the cache the group of objects marked as invalid.

43. The system of claim 40, wherein the group of dynamically generated objects is pre-designated.

44. The system of claim 40, comprising means for automatically identifying the group of dynamically generated objects and associating the object determinant with the group according to a rule.

45. A system for maintaining a cache of dynamically generated objects, the system comprising:
 means for storing, by a cache on an intermediary located between a client and an originating server, a dynamically generated object identified as not cacheable and generated at the originating server in response to a request from a client;
 means for identifying, by the intermediary, an object determinant of the cached dynamically generated object, the object determinant comprising one or more parameter name-value pairs in a first communication between the client and the originating server;
 means for intercepting, by the cache on an intermediary located between a client and an originating server, a second communication between the client and the originating server;
 means for identifying, by the intermediary device, an object determinant in the second communication;
 means for determining, by the intermediary device, responsive to the object determinant in the second communication corresponding to the identified object determinant of the cached dynamically generated object that a change has occurred or will occur in the dynamically generated object identified as not cacheable and generated at the originating server in response to a request from a client; and
 means for marking, by the cache, the dynamically generated object identified as not cacheable and stored in cache as invalid.

46. The system of claim 45, comprising means for obtaining the dynamically generated object identified as not cacheable from the originating server.

47. The system of claim 45, comprising means for flushing from the cache the invalid dynamically generated object identified as not cacheable.

48. The system of claim 45, comprising:
 means for associating, by the intermediary device, the dynamically generated object with a group of dynamically generated objects previously served from the originating server;
 means for associating, by the intermediary device, the group with the object determinant of the cached dynamically generated object; and
 means for marking, by the intermediary device, the group of dynamically generated objects as invalid in response to the communication.

49. The system of claim 45, comprising means for flushing from the cache the group of dynamically generated objects marked as invalid.

50. The system of claim 45, wherein the group of dynamically generated objects is pre-designated.

51. The system of claim 45, comprising means for automatically identifying the group of dynamically generated objects and associating the object determinant of the cached dynamically generated object with the group according to a rule.

52. The system of claim 45, comprising means for embedding by the client in the second communication the object determinant in the second communication as a pre-defined string.

53. The system of claim 45, comprising means for identifying the object determinant in the second communication based on a pre-defined heuristic rule associated with the dynamically generated object.

54. The system of claim 45, comprising means for selecting, by the intermediary device, the object determinant in the second communication from one of the following elements of the second communication: USERID, IP address, TCP port, HTTP header, custom HTTP header, client URL, cookie header, URL query string and POST body.

55. The system of claim 45, comprising means for extracting, by the intermediary device, from the second communication the object determinant in the second communication based on a user-configured invalidation policy.

56. The system of claim 45, comprising means for maintaining a table in the cache to associate the object determinant of the cached dynamically generated object with to one or more objects or groups of objects stored in the cache.

57. The system of claim 45, comprising means for examining, by an intelligent statistical engine, communications from the client to identify a set of dynamically generated objects to store in the cache.

58. The system of claim 45, comprising means for associating, by the intermediary device, objects stored in cache into a content group, wherein the content group is represented by a hash table having an incarnation number as an index.

59. The system of claim 45, comprising means for performing, by the intermediary device, a hash algorithm on the dynamically generated object identified via the second communication to determine a change to the dynamically generated object.

60. A method for maintaining a cache of dynamically generated objects, the method comprising the steps of:
 storing, by a cache on an intermediary located between a client and an originating server, a dynamically generated object generated at the originating server in response to a first request from a first client;
 identifying, by the intermediary, an object determinant of the cached dynamically generated object, the object determinant comprising one or more parameter name-value pairs in a first communication between the client and the originating server used by the originating server upon receipt to change the dynamically generated object;
 intercepting, by the intermediary, a second request from a second client to the originating server for the dynamically generated object, the second request including the identified object determinant;
 determining, by the intermediary, that receipt of the identified object determinant of the second request by the originating server will not cause a change to occur in the originating server to change the dynamically generated object;
 responding to the second request, by the intermediary, with the cached dynamically generated object;
 intercepting, by the intermediary, a third request from a third client to the originating server for the dynamically generated object, the third request including the identified object determinant;
 determining, by the intermediary, that receipt of the identified object determinant of the third request by the originating server will cause the originating server to change the dynamically generated object; and
 marking, by the intermediary, the cached dynamically generated object as invalid.

* * * * *

UNITED STATES PATENT AND TRADEMARK OFFICE
CERTIFICATE OF CORRECTION

| | | Page 1 of 1 |
|---|---|---|
| PATENT NO. | : 8,495,305 B2 | |
| APPLICATION NO. | : 11/324131 | |
| DATED | : July 23, 2013 | |
| INVENTOR(S) | : Sundarrajan et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1205 days.

Signed and Sealed this
Twenty-fourth Day of February, 2015

Michelle K. Lee
*Deputy Director of the United States Patent and Trademark Office*